US012591460B2

(12) United States Patent
Cudak et al.

(10) Patent No.: US 12,591,460 B2
(45) Date of Patent: Mar. 31, 2026

(54) PARTITIONING RESPONSIVE TO PROCESSORS HAVING A DISPARATE NUMBER OF CORES

(71) Applicant: Lenovo Enterprise Solutions (Singapore) Pte Ltd., Singapore (SG)

(72) Inventors: Gary D. Cudak, Raleigh, NC (US); Pravin S. Patel, Cary, NC (US); Mehul Shah, Austin, TX (US); James Parsonese, Cary, NC (US)

( * ) Notice: Subject to any disclaimer, the term of this patent is extended or adjusted under 35 U.S.C. 154(b) by 652 days.

(21) Appl. No.: 18/087,065

(22) Filed: Dec. 22, 2022

(65) Prior Publication Data

US 2024/0211316 A1 Jun. 27, 2024

(51) Int. Cl.
| | |
|---|---|
| *G06F 9/46* | (2006.01) |
| *G06F 9/50* | (2006.01) |
| *G06F 13/42* | (2006.01) |

(52) U.S. Cl.
CPC .......... *G06F 9/5044* (2013.01); *G06F 9/5033* (2013.01); *G06F 13/4221* (2013.01)

(58) Field of Classification Search
CPC ... G06F 9/5044; G06F 9/5033; G06F 13/4221
See application file for complete search history.

*Primary Examiner* — Gregory A Kessler
(74) *Attorney, Agent, or Firm* — Jeffrey L. Streets

(57) ABSTRACT

Embodiments provide a method and a computer program product providing program instructions executable by a processor of a baseboard management controller in a multi-processor system to cause the processor to perform various operations. The operations include identifying a number of cores present in each of a plurality of central processing units in the multi-processor system, initiating operation of the multi-processor system as a single unified node in response to each of the plurality of central processing units having an equal number of cores, and initiating partitioning of the multi-processor system into first and second independent partitioned nodes in response to a first set of one or more of the central processing units each having a first number of cores and a second set of one or more of the central processing units each having a second number of cores that is different than the first number of cores.

20 Claims, 22 Drawing Sheets

180

Initiating disabling of a processor interconnect between first and second central processing units in the multi-processor system — 182

Initiating boot of the first central processing unit, wherein the first central processing unit operates in a first partition independent of the second central processing unit — 184

130

140

*180*

*190*

200

Detecting a number of memory modules connected to each of a plurality of central processing units in the multi-processor system during boot — 202

Initiating operation of the multi-processor system as a single node in response to each of the plurality of central processing units being connected to an equal number of memory modules — 204

Initiating partitioning of the multi-processor system into a first partition and a second partition in response to a first set of one or more of the central processing units each being connected to a first number of memory modules and a second set of one or more of the central processing units each being connected to a second number of memory modules that is different than the first number of memory modules — 206

Initiating partitioning of the multi-processor system into a first partition including a first central processing unit of the multi-processor system and a second partition including a second central processing unit of the multi-processor system — 212

Sending a selection signal to a first select line input to a first PCIe multiplexer and to a second select line input to a second PCIe multiplexer, wherein the first PCIe multiplexer is connected to a video controller and has a selectable PCIe connection to either the first central processing unit or the second central processing unit, and wherein the second PCIe multiplexer is connected to a USB controller and has a selectable PCIe connection to either the first central processing unit or the second central processing unit — 214

Receiving a plurality of event notifications from the partitionable multi-processor system including one or more event notifications from a first partitioned node including a first subset of hardware devices of the multi-processor system and one or more event notifications from a second partitioned node including a second subset of the hardware devices of the multi-processor system, wherein each event notification identifies an event and a specific one of the hardware devices that experienced the event — 261

Storing the plurality of the event notifications in a unified event log — 262

Receiving a request to generate an event log for the first partitioned node of the multi-processor system — 263

Determining, for each event notification stored in the unified event log, whether the specific hardware device identified in the event notification is included in the first partitioned node — 264

Generating the requested event log for the first partitioned node including only those of the plurality of event notifications that are determined to identify a specific hardware device that is included in the first partitioned node — 265

FIG. 15

270

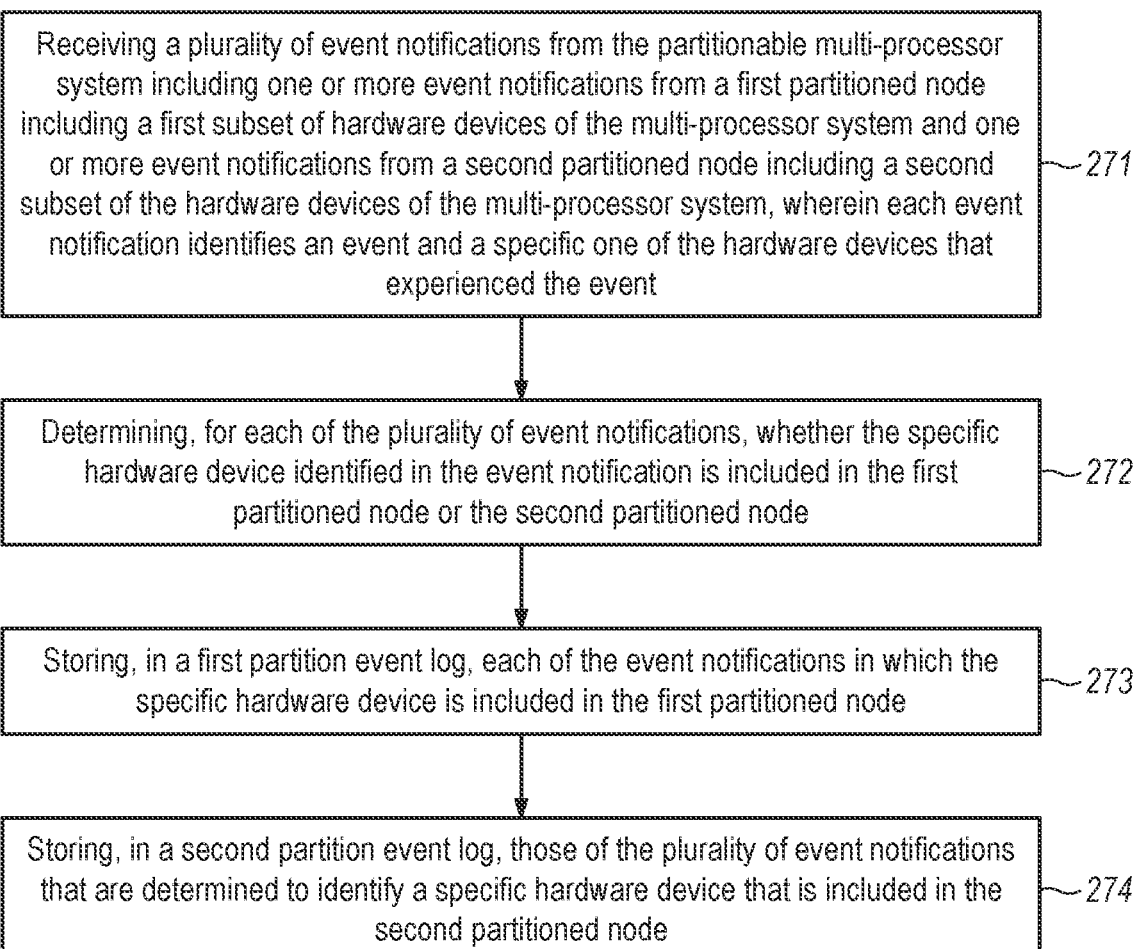

Receiving a plurality of event notifications from the partitionable multi-processor system including one or more event notifications from a first partitioned node including a first subset of hardware devices of the multi-processor system and one or more event notifications from a second partitioned node including a second subset of the hardware devices of the multi-processor system, wherein each event notification identifies an event and a specific one of the hardware devices that experienced the event ~271

Determining, for each of the plurality of event notifications, whether the specific hardware device identified in the event notification is included in the first partitioned node or the second partitioned node ~272

Storing, in a first partition event log, each of the event notifications in which the specific hardware device is included in the first partitioned node ~273

Storing, in a second partition event log, those of the plurality of event notifications that are determined to identify a specific hardware device that is included in the second partitioned node ~274

FIG. 16

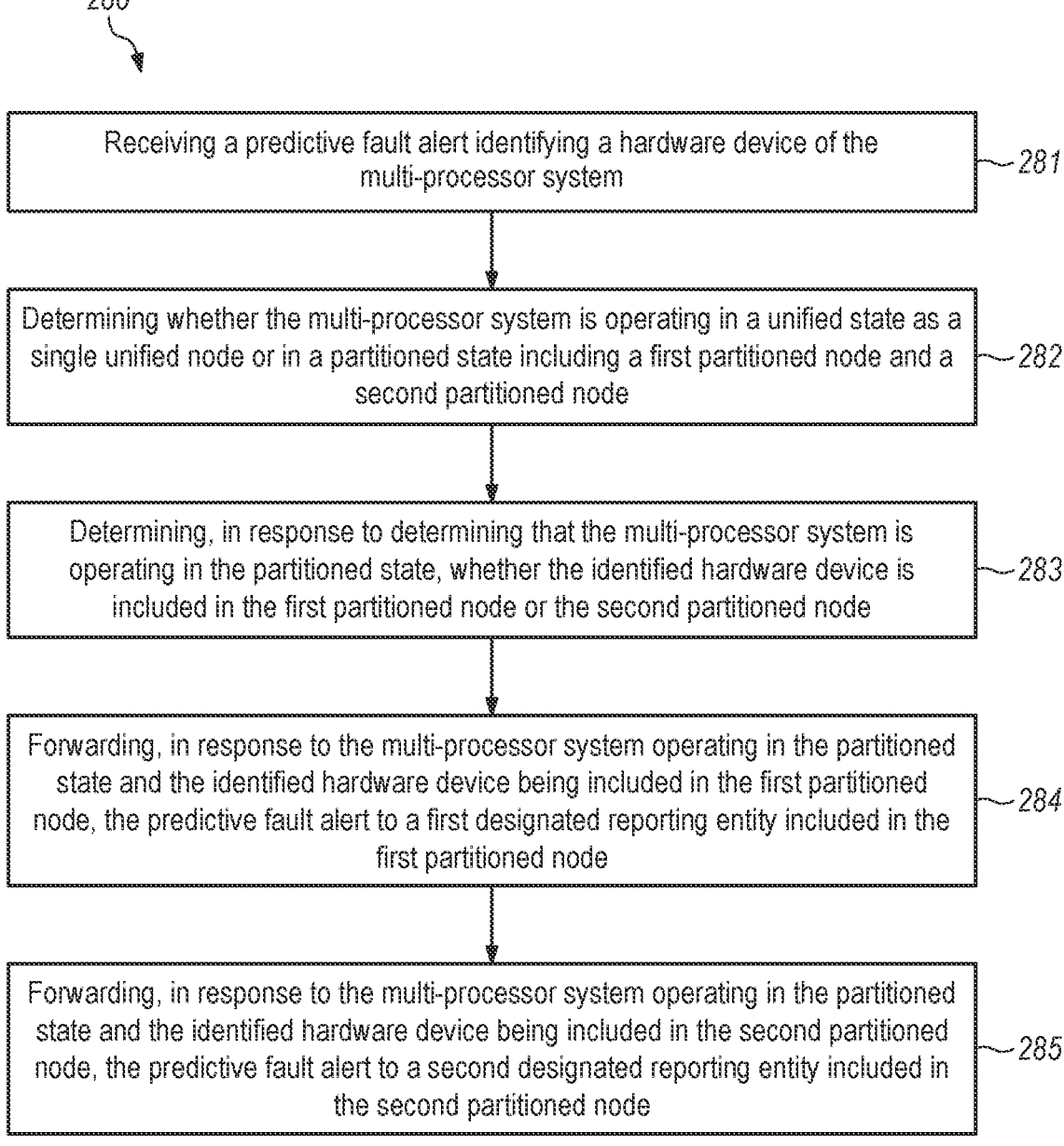

*280*

Receiving a predictive fault alert identifying a hardware device of the multi-processor system          ~*281*

Determining whether the multi-processor system is operating in a unified state as a single unified node or in a partitioned state including a first partitioned node and a second partitioned node          ~*282*

Determining, in response to determining that the multi-processor system is operating in the partitioned state, whether the identified hardware device is included in the first partitioned node or the second partitioned node          ~*283*

Forwarding, in response to the multi-processor system operating in the partitioned state and the identified hardware device being included in the first partitioned node, the predictive fault alert to a first designated reporting entity included in the first partitioned node          ~*284*

Forwarding, in response to the multi-processor system operating in the partitioned state and the identified hardware device being included in the second partitioned node, the predictive fault alert to a second designated reporting entity included in the second partitioned node          ~*285*

*FIG. 18*

PARTITIONING RESPONSIVE TO PROCESSORS HAVING A DISPARATE NUMBER OF CORES

BACKGROUND

The present disclosure relates to computing system configurations and methods for changing a configuration of a computing system.

BACKGROUND OF THE RELATED ART

A computer cluster is a set of individual computing nodes or systems that are connected and caused to work together in some coordinated manner. However, each individual computing node or system has an architecture that was designed allow the individual computing node to operate independently of any other individual computing node in the computer cluster. In fact, each individual computing node will typically have its own system management entity, such as a baseboard management controller, that manages the operation of the individual computing node and reports on the status and operation of the individual computing node and its components.

In a virtualized environment, one or more computing nodes may support virtual machines that provide the functionality needed to execute an independent operating system. Hypervisor software running on the one or more computing nodes enables sharing of the hardware resources of the one or more computing nodes to allow for the operation of multiple environments that are isolated from one another yet are executed on the same computing node. Still, the virtual machines are supported by the hypervisor and this virtual environment does not alter the underlying operation of the computing node.

These and other computer architectures and configurations may be used to accomplish a particular objective or workload type. However, despite the availability of these and other architectures, end users of computing systems still seek more flexibility in configuring and using a computing system.

BRIEF SUMMARY

Some embodiments provide a computer program product comprising a non-volatile computer readable medium and non-transitory program instructions embodied therein, the program instructions being configured to be executable by a processor of a baseboard management controller in a multi-processor system to cause the processor to perform various operations. The operations may comprise identifying a number of cores present in each of a plurality of central processing units in the multi-processor system, initiating operation of the multi-processor system as a single unified node in response to each of the plurality of central processing units having an equal number of cores, and initiating partitioning of the multi-processor system into first and second independent partitioned nodes in response to a first set of one or more of the central processing units each having a first number of cores and a second set of one or more of the central processing units each having a second number of cores that is different than the first number of cores.

Some embodiments provide a method comprising identifying a number of cores present in each of a plurality of central processing units in a multi-processor system, initiating operation of the multi-processor system as a single unified node in response to each of the plurality of central processing units having an equal number of cores, and automatically initiating partitioning of the multi-processor system into first and second independent partitioned nodes in response to a first set of one or more of the central processing units each having a first number of cores and a second set of one or more of the central processing units each having a second number of cores that is different than the first number of cores.

BRIEF DESCRIPTION OF THE SEVERAL VIEWS OF THE DRAWINGS

FIGS. 9-12 are flowcharts of operations for a baseboard management controller according to various embodiments.

FIG. 15 is a flowchart of operations for generating an event log for a particular partitioned node according to a first embodiment.

FIG. 16 is a flowchart of operations for generating an event log for a particular partitioned node according to a first embodiment.

FIG. 18 is a flowchart of a process for receiving and forwarding predictive fault alerts in a partitionable multi-processor system.

DETAILED DESCRIPTION

Figure 1:
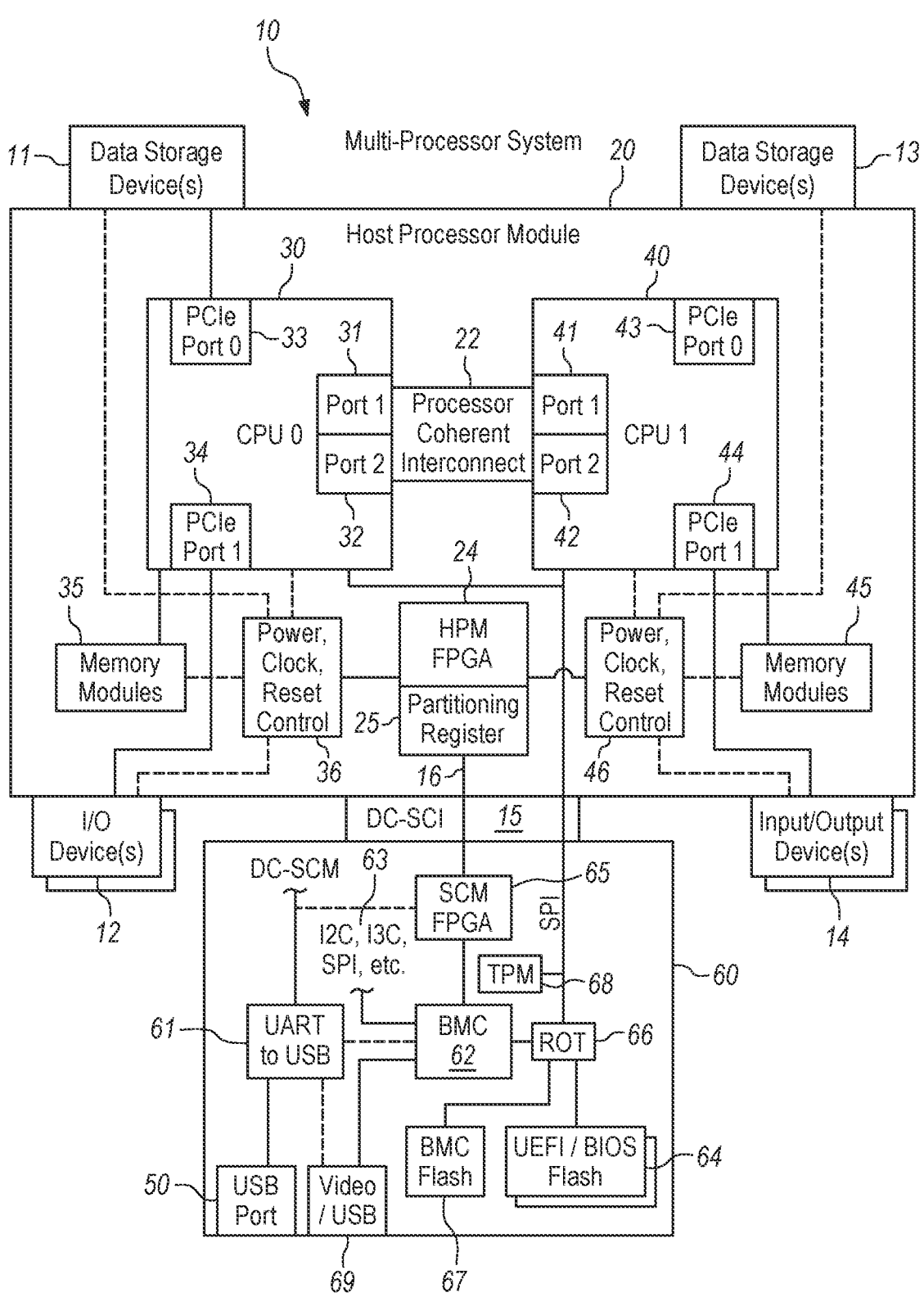
FIG. 1 is a diagram of a partitionable multi-processor system or node having a baseboard management controller on a control module consistent with some embodiments.

Some embodiments provide a computer program product comprising a non-volatile computer readable medium and non-transitory program instructions embodied therein, the program instructions being configured to be executable by a processor of a baseboard management controller in a multi-processor system to cause the processor to perform various operations. The operations comprise initiating disabling of a processor interconnect between first and second central processing units in the multi-processor system and initiating boot of the first central processing unit, wherein the first central processing unit operates in a first partitioned node independent of the second central processing unit, and wherein the baseboard management controller is configured to provide systems management to both of the first partitioned node and a second partitioned node that includes the second central processing unit.

"Partitioning", as used herein, refers to an action of controllably and reversibly dividing a multi-processor system into parts or sections of the whole system. The parts or sections that result from the action of partitioning may be referred to as "partitions" or "partitioned nodes." For example, a multi-processor system may be operated as a single unified node or divided into two or more partitioned nodes, where each partition includes at least one central processing unit and operates independent of any other partitioned node within the same multi-processor system. Furthermore, partitioning a single multi-processor system into exactly two partitions may be referred as "bifurcating" the system. Embodiments may also include partitioning of other resources of the multi-processor system beside the central processing units, such as the data storage devices, memory devices and/or input/output devices.

In some embodiments, partitioning of a multi-processor system may result in a number of partitions that is less than or equal to "n", wherein "n" is the number of central processing unit sockets in a multi-processor system. In other words, a system that would normally boot as a single "n"-socket multi-processor system may be divided up (partitioned) into some number of single-socket or multi-socket systems (partitions) that does not exceed the number "n" of sockets. Once the central processing units have been partitioned or separated into two or more partitions, embodiments may further assign one or more additional resource type, such as data storage devices, memory modules and/or input/output devices, to the partitions. However, the multi-processor system will have a single baseboard management controller, whether the baseboard management controller is installed on a motherboard along with the central processing units or installed on a separate system management system, such as a Datacenter-ready Secure Control Module DC-SCM.

In some embodiments, the processor interconnect is a processor coherent interconnect. Without limitation, the processor interconnect may be a Cache Coherent Interconnect for Accelerators (CCIX), Ultra Path Interconnect (UPI), or Inter-Chip Global Memory Interconnect (XGMI).

In some embodiments, the operations may further comprise initiating independent control of power to the first and second central processing units in the multi-processor system. For example, the first central processing unit may be turned on while the second central processing unit may be turned off, the second central processing unit may be turned on while the first central processing unit is turned off, both the first and second central processing units may be turned on, and/or both the first and second central processing units may be turned off. Similarly, other functionality of the multi-processor system, such as the operation of clocks, reset and error reporting, may be independently controlled for the first and second central processing units and/or for first and second partitioned nodes in which the first and second central processing units operate, respectively.

In some embodiments, the operations may further comprise initiating boot of the second central processing unit, wherein the second central processing unit operates in a second partitioned node independent of the first partitioned node. Following boot of both the first and second central processing units, the first and second partitioned nodes may operate independently as separate nodes. Optionally, the operations may further comprise independently monitoring or managing the operation of the first partitioned node and the second partitioned node. For example, the baseboard management controller for the multi-processor system may independently monitor and manage each partitioned node in the same manner that the baseboard management controller would monitor and manage the multi-processor system operating as a single unified node. In one specific example, the baseboard management controller may keep track of the components assigned to each partitioned node and any input that the baseboard management controller receives from one of the components of the system may be attributed to the partitioned node to which the component is assigned. Conversely, the baseboard management controller may send output to any one or more of the components of the system in consideration of the partitioned node to which the component has been assigned.

In some embodiments, the operation of initiating disabling of the processor interconnect between the first and second central processing units in the multi-processor system may include instructing a firmware interface for the multi-processor system to not initialize the processor interconnect during boot. Accordingly, when either of the first and/or second central processing units are booted, the firmware interface will not initialize the ports that connect that central processing unit to the processor interconnect, essentially disabling the processor interconnect. However, at some later time, the same processor interconnect may be enabled by instructing the firmware interface to initialize the processor interconnect during a subsequent boot of the first and second central processing units. By initializing the ports that connect each of the first and second central processing units to the processor interconnect, the processor interconnect may be enabled so that the first and second central processing units may then operate as a single unified node. In one option, the firmware interface may be a unified extensible firmware interface (UEFI) or a basic input output system (BIOS). In another option, the baseboard management controller may communicate with the firmware interface over various channels to instruct the firmware interface to enable/disable a processor interconnect between two central processing units or to instruct the firmware interface to enable/disable a CPU-PCIe port. Non-limiting examples of the channels of communication between the baseboard management controller and the firmware interface may include an Intelligent Platform Management Interface (IPMI), a mailbox, and a General Purpose Input Output (GPIO). In other embodiments, the processor interconnect may have a direct disable input. If a direct disable input is available, then the baseboard management controller may cause, with or without use of an integrated circuit, the processor interconnect to the directly disabled.

In some embodiments, the operations may further comprise assigning a first group of one or more endpoint devices of the multi-processor system to the first partition. In one example, the first group of one or more endpoint devices may include one or more memory modules, one or more data storage devices and/or one or more input/output devices. Other endpoint devices may be similarly assigned to the first partition. Optionally, the operation of assigning the first group of one or more endpoint devices of the multi-processor system to the first partition may include instructing a firmware interface for the multi-processor system to not initialize a port connecting the second central processing unit to the one or more endpoint devices during boot. Accordingly, during a subsequent boot of the second central processing unit, the firmware interface will not initialize a port that would otherwise connect the second central processing unit to the endpoint device. Optionally, the port may be a serial port, such as a peripheral component interconnect express (PCIe) port.

Similarly, the operations of some embodiments may further comprise assigning a second group of one or more endpoint devices of the multi-processor system to the second partition. In one example, the second group of one or more endpoint devices may include one or more memory modules, one or more data storage devices and/or one or more input/output devices, such as those endpoint devices that are not assigned to the first partition and/or those endpoint devices that support multiple hosts. Other endpoint devices may be similarly assigned to the second partition. Optionally, the operation of assigning the second group of one or more endpoint devices of the multi-processor system to the second partition may include instructing a firmware interface for the multi-processor system to not initialize a port connecting the first central processing unit to the one or more endpoint devices during boot. Accordingly, during a subsequent boot of the first central processing unit, the firmware interface will not initialize a port that would otherwise connect the first central processing unit to the endpoint device. Optionally, the port may be a serial port, such as a peripheral component interconnect express (PCIe) port.

In some embodiments, the multi-processor system may include various types of endpoint devices, such as memory modules, input/output devices and data storage devices, where the endpoint devices remain physically connected to the central processing units of multiple partitions even after the processor interconnect has been disable. These endpoint devices may have a multi-host controller that allows the endpoint device to support communication with multiple hosts, such as multiple central processing units or multiple partitions. For example, an input/output device with a multi-host controller may support multiple PCIe links, where a first PCIe link connects the multi-host controller of the input/output device to a first central processing unit in a first partitioned node and where a second PCIe link connects the multi-host controller of the input/output device to a second central processing unit in a second partitioned node. Embodiments may cause one of the PCIe links, such as the first PCIe link or the second PCIe link, to be disabled so that the input/output device is isolated to a particular partitioned node where the other of the PCIe links remains enabled. For example, disabling the first PCIe link from the input/output device to a first central processing unit in a first partitioned node will cause the input/output device to be isolated (partitioned) to a second partitioned node because the multi-host controller of the input/output device still has an enabled PCIe link to a second central processing unit in the second partitioned node.

In some embodiments, the operations may further comprise dividing a first serial communication bus into multiple segments, wherein each of the multiple segments may include one or more serial communication lanes of the first serial communication bus, and wherein a first segment of the multiple segments connects the first central processing unit to a first endpoint device and a second segment of the multiple segments connects the first central processing unit to a second endpoint device. Similarly, the operations may further comprise dividing a second serial communication bus into multiple segments, wherein each of the multiple segments may include one or more serial communication lanes of the second serial communication bus, and wherein a first segment of the multiple segments connects the second central processing unit to a third endpoint device and a second segment of the multiple segments connects the second central processing unit to a fourth endpoint device. For example, the serial communication bus may be a PCIe bus with a given number of PCIe lanes. The PCIe bus may be partitioned to divide up the PCIe lanes to support multiple devices under a single host bus. In one example, a central processing unit might have 4 sixteen-lane PCIe busses. One or more sixteen-lane PCIe bus may be divided into 4 separate four-lane segments, where each four-lane segment may then be connected to a separate endpoint device. Accordingly, the CPU may be connected to up to 4 PCIe devices using the one sixteen-lane PCIe bus. Optionally, one or more of the individual PCIe links may extend entirely within a given partitioned node from a CPU PCIe port to an endpoint device or, alternatively, one or more of the individual PCIe links may extend between partitioned nodes from a CPU PCIe port in one partitioned node to an endpoint in another partitioned node within the same multi-processor system.

In some embodiments, the operations may further comprise sending a reset signal to one or more endpoint devices in the multi-processor system to prevent the one or more endpoint devices from becoming active.

In some embodiments, the operations may further comprise initiating independent control of power to the first and second central processing units in the multi-processor system. For example, initiating independent control of power to the first and second central processing units in the multi-processor system may include instructing an integrated circuit in the multi-processor system to independently control a first power regulator connected to the first central processing unit and a second power regulator connected to the second central processing unit. The integrated circuit may take any suitable form, such as a field-programmable gate array (FPGA), complex programmable logic device (CPLD), application-specification integrated circuit (ASIC), an embedded microprocessor and the like. Optionally, the first power regulator may supply power to additional components of the multi-processor system that will operate in the first partitioned node along with the first central processing unit. Similarly, the second power regulator may supply power to additional components of the multi-processor system that will operate in the second partitioned node along with the second central processing unit. In a further option, the integrated circuit may control additional power regulators connected to any one or more components of the multi-processor system, thereby enabling power to the one or more components to be controlled with any desired granularity as the baseboard management controller may instruct the integrated circuit.

In some embodiments, instructing an integrated circuit in the multi-processor system to independently control a first power regulator connected to the first central processing unit and a second power regulator connected to the second central processing unit includes instructing the integrated circuit to enforce one of a plurality of predetermined partitioning modes, wherein each partitioning mode causes the multi-processor system to operate with a different configuration of one or more partitioned node. In one option, the integrated circuit may be designed or programmed with multiple predetermined partitioning modes, where each predetermined partitioning mode defines the one or more components (hardware devices) of the multi-processor system that should operate in each partition. The number of partitions in a predetermined partitioning mode may vary and the number of central processing units and other components in a partition may also vary, although the number of partitions may be limited by the number of central processing units that are in the multi-processor system. For example, a multi-processor system with exactly two central processing units (i.e., first and second central processing units) may be either partitioned (a partitioned state) or not partitioned (a single unified state), and any partitioning will separate the first central processing unit from the second central processing unit into first and second partitioned nodes. However, the predetermined partitioning modes may further define which components are to be assigned to which partition, such that there can be more partitioning modes (more ways of dividing up the resources of the multi-processor system) than the maximum number of partitioned nodes that may operate simultaneously.

In some embodiments, the multi-processor system may include a motherboard having the baseboard management controller installed directed on the motherboard that supports the central processing units. However, in some embodiments, the multi-processor system may include a host processor module (HPM) and a system management module (also referred to as a control module, secure control module or datacenter-ready secure control module (DC-SCM)), where the first and second central processing units are installed on the host processor module and the baseboard management controller is installed on the system management module connected to the host processor module. In the latter embodiments, the baseboard management module is still able to manage operation of the host processor module via a control interface, such as a card edge connector. Whether the baseboard management controller is integrated on the motherboard or provided by a control module connected to a host processor module, the baseboard management controller may still communicate with an integrated circuit on the multi-processor system to implement certain aspects of partitioning, such as power sequencing, enabling/disabling clocks, asserting/releasing resets, responding to throttling requests (thermal and power), and device error reporting/responses, and the baseboard management controller may also communicate with a firmware interface, such as a unified extensible firmware interface (UEFI), to implement certain other aspects of partitioning, such as enabling/disabling of CPU-CPU interconnects and configuring CPU-PCIE endpoint interconnects.

In some embodiments having a host processor module and a system management module connected to the host processor module, the system management module may further include a Root of Trust (ROT) device that supports first and second firmware interface flash devices and a baseboard management controller flash device. For example, the first firmware interface flash device may be loaded and executed by the first central processing unit to support operation of the first partitioned node, and the second firmware interface flash device may be loaded and executed by the second central processing unit to support operation of the second partitioned node. To implement more than two partitions, the Root of Trust (ROT) may support one firmware interface flash devices for each of the more than two partitions. For example, the ROT may have one firmware flash device for each potential partition as well as the one BMC flash. Each firmware interface flash device may store an independently selected level of a firmware interface and/or independently selected firmware settings to be used by the firmware interface, wherein a central processing unit will load the firmware and settings during boot. Optionally, the baseboard management controller may perform a management thread that runs a duplicated subset of management code for a subsequent partition with a shim to parse the monitored data for each thread and a collector shim from the threads for any control/reporting that is done. In a further option, one of the two firmware flash devices used by first and second partitioned nodes may be selected and used for a single unified node or, alternatively, a further (third) separate firmware flash device may be dedicated to use when the multi-processor system is being operated in the unified state as a single unified node. In the former case of using one of the firmware flash devices used for a specific partition to also implement the unified state, the baseboard management controller may read and store multiple firmware images, such as one firmware image and associated firmware settings for a single unified node and one firmware image and associated firmware settings for one of the partitions in a partitioned configuration. The baseboard management controller may then reflash the one firmware flash device with either the image and settings for the single unified node or the firmware image and settings for the partitioned node depending upon the partitioning mode or state.

In some embodiments having a host processor module and a system management module connected to the host processor module, the system management module may further include a first PCIe-to-USB controller for use by the first central processing unit in the first partitioned node and a second PCIe-to-USB controller for use by the second central processing unit in the second partitioned node. The system management module, such as a DC-SCM, may include a PCIe to USB controller for each partitioned node. When the multi-processor system is being operated as a single unified node without partitioning, the one or more additional PCIe to USB controllers may be used as additional USB ports for the multi-processor system.

In some embodiments having a host processor module and a system management module connected to the host processor module, the host processor module (HPM) may include a first integrated circuit (or HPM integrated circuit) that is coupled to a first power regulator for power sequencing of the first central processing unit and coupled to a second power regulator for power sequencing of the second central processing unit independent of the first central processing unit. Accordingly, the baseboard management controller on the system management module may execute the further operation of initiating independent control of power to the first and second central processing units in the multi-processor system. Specifically, the baseboard management controller may provide a control signal or message to the first integrated circuit instructing the integrated circuit to control power to the first and/or second central processing units. Optionally, the first integrated circuit may be instructed to perform clock enablement for the first central processing unit and/or to perform clock enablement for the second central processing unit independent of clock enablement for the first central processing unit. The integrated circuit may be responsible for implementing various levels of system partitioning, power sequencing, power fault surveillance, reset fanout, clock enablement, and/or CPU/DIMM/IO error surveillance. The integrated circuit should be designed or programmed to understand the partitioning architecture, such as the components assigned to each partition, so that any or all of these functions (i.e., system partitioning, power sequencing, power fault surveillance, reset fanout, clock enablement, and/or error surveillance) can operate upon the components that are to function as a partitioned node and not impact other partitions.

In some embodiments having a host processor module and a system management module connected to the host processor module, the system management module may include a second integrated circuit (or control module integrated circuit) that is capable of partitioning one or more resources of the system management module to be included in the first partition, capable of partitioning one or more resources of the system management module to be include in the second partition, and capable of not partitioning any of the resources of the system management module for operation of the multi-processor system as a single unified node. The second integrated circuit may perform similar roles for the system management system (or control module) as the first integrated circuit performs for the host processor module. Furthermore, the first and second integrated circuits may be in communication such that they share instructions from the baseboard management controller and always operate to implement consistent partitions and/or the same predetermined partitioning mode.

In some embodiments, the operations of the baseboard management controller may further comprise instructing a firmware interface for the multi-processor system to not initialize one or more serial ports of the second central processing unit that form serial connections to one or more endpoint devices during boot, wherein the firmware interface initializes one or more serial ports of the first central processing unit that form serial connections to one or more endpoint devices during boot so that the one or more endpoint devices operate in the first partition with the first central processing unit. For example, the first group of one or more endpoint devices may include one or more memory modules, one or more data storage devices and/or one or more input/output devices.

Some embodiments provide a multi-processor system comprising a host processor module (HPM) including multiple central processing units and a first integrated circuit. The multi-processor system further comprises a control module having a card edge interface selectively connectable to the host processor module, wherein the control module includes a single baseboard management controller, one or more flash devices storing baseboard management controller firmware images, two or more flash devices storing firmware interface images, a root of trust security processor, and a second integrated circuit. The baseboard management controller is in communication with the first integrated circuit, such as via a serial peripheral interface, to pass partitioning instructions to the first integrated circuit. Optionally, the first integrated circuit may include a register set for receiving and storing partitioning information.

Some embodiments may be implemented regardless of the formfactor of the multi-processor system. Non-limiting examples of the multi-processor system may occupy two rack units (2U) and have two CPU sockets (2S) or may occupy one rack unit (1U) and having two CPU sockets (2S). A multi-processor system may also occupy more than 2 rack units or a fractional rack unit and may have any number of two or more CPU sockets.

Some embodiments may be designed and implemented consistent with the Datacenter-ready Secure Control Module (DC-SCM) specification established by the Open Compute Project, which specification provides details for the design features needed to create a DC-SCM with a standardized Datacenter-ready Secure Control Interface (DC-SCI). The DC-SCM specification moves common server management, security, and control features from a typical processor motherboard architecture onto a smaller common form factor module. This module contains all the firmware states previously housed on a typical processor motherboard.

In some embodiments, the system management system, such as a DC-SCM, may include a universal asynchronous receiver-transmitter (UART) to USB connection to each partition through the BMC for Serial over LAN (Local Area Network). There is a UART from the CPU itself and a selector may be provided to route the UART signals to a UART to USB device or bridge. For example, the UART to USB bridge may have multiple serial ports that allow for multiple concurrent serials connections, such as two serial connections including one serial connection to each of two partitioned nodes. These two serial connections may, without limitation, support concurrent connections to additional consoles.

In some embodiments, the system management system, such as a DC-SCM, may support multiple consoles, such as a console for each partition. Each console may provide a connection for a display monitor and an input device such as a keyboard and mouse. For example, serial over LAN may be implemented over multiple TCP/IP ports (one network port for each partition). However, a serial connection to a console may also be requested during an initialization sequence or as a function of a particular user identifier when establishing a connection to the baseboard management controller. In some embodiments, one of the partitions may use a video controller on the BMC of the DC-SCM and any other partition may use a serial console. The BMC of the DC-SCM only has a single video controller and only one of the partitions may be connected to that video controller in the BMC. However, the BMC may provide remote KVM, such that the serial console may be assigned to any other of the partitions to be run headless.

In some embodiments, a system management interface may include a menu system for orchestration of partitioning for a system. For example, the system management interface may be a baseboard management controller web interface or a console interface. The system management interface may provide the user with various options for controlling or configuration partitioning of the multi-processor system. Without limitation, the system management interface may provide a menu or controls that allows a user to select: a CPU partition control mode, such as automatic CPU partition control; create a CPU partition control; or configure a custom CPU partition control. Furthermore, the system management interface may provide a menu or controls that allow a user to force and/or undo a standalone boot of the single unified node and/or an individual partitioned node. Still further, the system management interface may provide a menu or controls that allow a user to: configure a CPU partition, such as enabling automatic CPU partition configuration; create a CPU partition configuration; customize a CPU partition configuration; and delete a CPU partition configuration. The system management interface may also provide a menu option or button for resetting CPU partitioning to certain default settings.

Some embodiments implement partitioning of a multi-processor system by controlling the use of an integrated circuit to implement certain aspects of the partitioning and controlling the use of a firmware interface to implement certain other aspects of the partitioning. In some embodiments, the integrated circuit may be instructed to take responsibility for power sequencing, enabling/disabling clocks, asserting/releasing resets, responding to throttling requests (thermal and power), and device error reporting/responses. Embodiments of the integrated circuit may include a field-programmable gate array (FPGA), a complex programmable logic device (CPLD), application-specific integrated circuit (ASIC) or an embedded microprocessor. The integrated circuit may have awareness of a partitioning mode and the ability to enable/disable a different set of one or more components under each partitioning mode. A FPGA may be highly parallel and may respond to simultaneous hardware stimulus inputs and provide simultaneous control outputs. In addition, a FPGA may be updated whenever hardware issues are identified. In some embodiments, the firmware interface may be responsible for enabling/disabling of CPU-CPU interconnects and configuring CPU-PCIE endpoint interconnects. The firmware interface is an interface between an operating system and platform firmware. In one example, the firmware interface may be a unified extensible firmware interface (UEFI).

Some embodiments may provide a first integrated circuit on a host processor module (system board), wherein the first integrated circuit independently controls power sequencing, enabling/disabling clocks, asserting/releasing resets, responding to throttling requests (thermal and power), and device error reporting/responses for each partition on the host processor module. Furthermore, some embodiments may provide a second integrated circuit on the control module, such as a DC-SCM, wherein the second integrated circuit is aware of any partitioning that is being implemented in the multi-processor system and independently controls resources in the DC-SCM that are dedicated to a particular partition. Accordingly, the baseboard management controller may control both the first and second integrated circuits, such as first and second FPGAs, with the same or similar partitioning signals to cause resources on both the HPM and the DC-SCM to be partitioned and controlled consistently. For example, a FPGA-FPGA connection may be used to independently manage reboot and power down/up of each partition, and/or may be used to independently manage a reference clock of each partition. Furthermore, independent management of the reference clock of each partition may include enabling the reference clock for a partition that is being turned on and/or disabling the reference clock for any partition that is being turned off without regard to whether or not the reference clock for any other partition is enabled or disabled. Optionally, the first integrated circuit on the host processor module may control a clocking device that has group output enable connections that allow for one or more reference clocks to be enabled or disabled for a partitioned node. In a further option, the first and second integrated circuits may also perform serializing and de-serializing of one or more connections between the HPM (i.e., via the first integrated circuit) and the BMC (i.e., via the second integrated circuit.

In some embodiments, first power/clock/reset device(s) may control power, clock and reset to various devices in a first partition, such as a central processing unit, memory modules, data storage devices and/or input/output devices. Similarly, second power/clock/reset device(s) may control power, clock and reset to various devices in a second partition, such as a central processing unit, memory modules, data storage devices and/or input/output devices. The first and second power/clock/reset devices are preferably located on the host processor module or motherboard.

In some embodiments, the baseboard management controller may detect one or more aspect of the system configuration for the multi-processor system and use the detected system configuration to determine a partitioning mode or configuration. For example, the baseboard management controller may collect a system inventory through various types of connections, such as an Inter-Integrated Circuit (I2C) bus, Improved Inter-Integrated Circuit (I3C) bus, Serial peripheral Interface (SPI) communication interfaces, and other available connections. The baseboard management controller may execute logic for determining a partitioning mode or configuration to be implemented as previously described.

Partitioning Responsive to Processors Having a Disparate Number of Cores

Some embodiments provide a computer program product comprising a non-volatile computer readable medium and non-transitory program instructions embodied therein, the program instructions being configured to be executable by a processor of a baseboard management controller in a multi-processor system to cause the processor to perform various operations. The operations may comprise identifying a number of cores present in each of a plurality of central processing units in the multi-processor system, initiating operation of the multi-processor system as a single unified node in response to each of the plurality of central processing units having an equal number of cores, and initiating partitioning of the multi-processor system into first and second independent partitioned nodes in response to a first set of one or more of the central processing units each having a first number of cores and a second set of one or more of the central processing units each having a second number of cores that is different than the first number of cores. Preferably, the first partitioned node may include the first set of one or more central processing units and the second partitioned node may include the second set of one or other central processing units.

In some embodiments, the operations may further comprise obtaining an inventory of one or more resource types in the multi-processor system before a firmware interface boots, wherein the one or more resource types includes memory modules, data storage devices and/or input/output devices and initiating partitioning of resources of the one or more resource type between the first and second independent partitioned nodes. In one option, the operations may further comprise identifying, for the one or more resource types, an amount of the resources within the multi-processor system that are of the same resource type, determining a processor ratio that is a ratio of a number of the central processing units in the first partition to a number of the central processing units in the second partition, and assigning, for the one or more resource types, the identified amount of the resources between the first partitioned node and the second partitioned node to approximate the processor ratio. For any one resource type, the multi-processor system may have an amount of the resources that cannot be assigned to the first and second partitioned nodes in amounts that will exactly equal the processor ratio. Accordingly, the amount of the resources of the same resource type may be assigned to the first and second partitioned nodes so that the resource ratio (the ratio of (i) the amount of the resource type assigned to the first partitioned node to (ii) the amount of resource type assigned to the second partitioned node) approximates the processor ratio. "Approximating" may, for example, include minimizing the difference between the resource ratio and the processor ratio or include other standards for reducing the difference between the resource ratio and the processor ratio. In a further option, the operation of assigning, for the one or more resource types, the identified amount of the resources between the first partitioned node and the second partitioned node to approximate the processor ratio may include assigning a first group of resources of the multi-processor system to the first partitioned node and assigning a second group of resources of the multi-processor system to the second partitioned node. For example, the first and second groups may each include at least one data storage device and at least one input/output device.

In some embodiments, initiating partitioning of the multi-processor system into first and second independent partitioned nodes may include instructing a firmware interface to disable one or more processor interconnects between the first set of central processing units and the second set of central processing units. In this manner, the first set of central processing units may be operable as a first independent partitioned node and the second set of central processing units may be operable as a second independent partitioned node. In a first option, the one or more processor interconnects may be coherent processor interconnects. In a second option, the firmware interface may be a unified extensible firmware interface. In a third option, the number of cores present in each of the plurality of central processing units may be identified before booting the firmware interface. In a fourth option, the operation of instructing the firmware interface to disable the one or more processor interconnects between the first set of central processing units and the second set of central processing units includes instructing the firmware interface to not initialize the one or more processor interconnects between the first set of central processing units and the second set of central processing units during boot.

In some embodiments, the operations may further comprise initiating independent control of power to the first and second central processing units in the multi-processor system or initiating independent control of power to the first and second partitioned nodes in the multi-processor system. For example, independent control of power to the first and second central processing units in the multi-processor system may be initiated by instructing an integrated circuit in the multi-processor system to independently control a first power regulator connected to the first central processing unit and a second power regulator connected to the second central processing unit. In a further example, the operation of instructing the integrated circuit in the multi-processor system to independently control the first power regulator connected to the first central processing unit and the second power regulator connected to the second central processing unit may include instructing the integrated circuit to enforce one of a plurality of predetermined partitioning modes, wherein each partitioning mode causes the multi-processor system to operate with a different configuration of one or more partitions, including no partitions.

In some embodiments, the multi-processor system may include a host processor module and a system management module. In this embodiment, the first set of central processing units and the second set of central processing units are installed on the host processor module, and the baseboard management controller is installed on a system management module that is connected to the host processor module. Still, the baseboard management controller may manage operation of the host processor module by communication through an interface, such as a card edge connector.

Some embodiments provide a method comprising identifying a number of cores present in each of a plurality of central processing units in a multi-processor system, initiating operation of the multi-processor system as a single unified node in response to each of the plurality of central processing units having an equal number of cores, and automatically initiating partitioning of the multi-processor system into first and second independent partitioned nodes in response to a first set of one or more of the central processing units each having a first number of cores and a second set of one or more of the central processing units each having a second number of cores that is different than the first number of cores. In one option, the method may further comprise obtaining an inventory of one or more resource types in the multi-processor system before the firmware interface boots, wherein the one or more resource types includes memory modules, data storage devices and/or input/output devices and initiating partitioning of resources of the one or more resource type between the first and second independent nodes. In a further option, the method may further comprise identifying, for the one or more resource types, an amount of resources within the multi-processor system that are of the same resource type, determining a processor ratio that is a ratio of a number of central processing units in the first partitioned node to a number of central processing units in the second partitioned node, and assigning, for the one or more resource types, the identified amount of the resource between the first partitioned node and the second partitioned node to approximate the processor ratio.

Embodiments of the foregoing computer program product and/or method may be implemented using any of the operations of other embodiments disclosed herein. For example, an operation of initiating partitioning may include any of the disclosed operations for initiating partitioning, such as instructing a Unified Extensible Firmware Interface (UEFI) that is part of the system to disable a processor interconnect between the central processing units. Other and further operations may be included or combined from other embodiments disclosed herein.

Partitioning Responsive to Processors Having a
Disparate Number of Memory Modules Some embodiments provide a computer program product comprising a non-volatile computer readable medium and non-transitory program instructions embodied therein, the program instructions being configured to be executable by a processor of a baseboard management controller in a multi-processor system to cause the processor to perform various operations. The operations may comprise detecting a number of memory modules connected to each of a plurality of central processing units in the multi-processor system during boot, initiating operation of the multi-processor system as a single unified node in response to each of the plurality of central processing units being connected to an equal number of memory modules, and initiating partitioning of the multi-processor system into a first partitioned node and a second partitioned node in response to a first set of one or more of the central processing units each being connected to a first number of memory modules and a second set of one or more of the central processing units each being connected to a second number of memory modules that is different than the first number of memory modules.

In some embodiments, detecting the number of memory modules connected to each of the plurality of central processing units may include the baseboard management controller, integrated circuit and/or firmware interface querying the memory module population data over the I2C and/or I3C interfaces on the memory modules, such as dual in-line memory modules (DIMM). The memory module I2C and/or I3C interface can be queried in the system to determine presence (either directly reading the memory module Serial Presence Detect (SPD) data or from the fact that the SPD device or memory module thermal device respond to the I2C/I3C address or the particular address for a given memory module slot. The baseboard management controller, integrated circuit and/or firmware interface may be involved in detecting or collecting the number of memory modules. For example, in some cases the integrated circuit and/or firmware interface performs the inventory collection data, such that the baseboard management controller may then retrieve the memory module population data from the integrated circuit and/or firmware interface. In another example, the baseboard management controller may directly perform the inventory query of the memory modules. Regardless of the exact inventory mechanism utilized, the baseboard management controller can detect or collect the number of memory modules or other information regarding memory module population that is used for determining the partitioning mode and/or configuration. Similar inventory mechanism may be used in other embodiments, such as those detecting disparate central processing units.

In some embodiments, the first partitioned node may include the one or more central processing units that are connected to the first number of memory modules, and the second partitioned node may include the one or more central processing units that are connected to the second number of memory modules. Optionally, the operations may further comprise determining that the first number of memory modules in the first partitioned node is greater than the second number of memory modules in the second partitioned node and initiating configuration of one or more of the memory modules in the first partitioned node that support multiple hosts, such as memory modules that are connected through a Compute Express Link device, to be shared by the one or more central processing units of the first partitioned node and the one or more central processing units of the second partitioned node.

In some embodiments, the operation of initiating partitioning of the multi-processor system into the first partitioned node and the second partitioned node may include sending an instruction to disable one or more processor interconnects between the first set of central processing units and the second set of central processing units, wherein the first set of central processing units is operable as a first independent partitioned node and the second set of central processing units is operable as a second independent partitioned node. The instruction may be sent to a firmware interface, such as a unified extensible firmware interface. In one specific example, the number of memory modules connected to each of the plurality of central processing units is identified before booting the firmware interface. Optionally, the instruction to disable one or more processor interconnects between the first set of central processing units and the second set of central processing units may be an instruction to prevent initialization of the one or more processor interconnects between the first set of central processing units and the second set of central processing units during boot.

In some embodiments, the operations may further comprise identifying a number of memory modules that are connected to the central processing units within the first partition and a number of memory modules that are connected to the central processing units within the second partition and determining a processor ratio that is a ratio of a number of central processing units in the first partition to a number of central processing units in the second partition. The operations may then further comprise assigning, to the first partition, one or more of the memory modules connected to the central processing units within the second partition or assigning, to the second partition, one or more of the memory modules connected to the central processing units within the first partition so that a ratio (memory module ratio) of a first number of memory modules that are directly connected to the central processing units within the first partition or assigned to the first partition and a second number of memory modules that are directly connected to the central processing units within the second partition or assigned to the second partition approximates the processor ratio or is closer to the processor ratio than without assigning the one or more memory modules.

In some embodiments, the operations may further comprise identifying a number of memory modules that are directly connected to the central processing units within the first partition and a number of memory modules that are connected to the central processing units within the first partition through a Compute Express Link device and also identifying a number of memory modules that are directly connected to the central processing units within the second partition and a number of memory modules that are connected to the central processing units within the second partition through a Compute Express Link device. Still further, the operations may comprise determining a processor ratio that is a ratio of a number of central processing units in the first partition to a number of central processing units in the second partition and assigning, to the first partition, one or more memory modules that are connected to the central processing units within the second partition through a Compute Express Link device or assigning, to the second partition, one or more memory modules that are connected to the central processing units within the first partition through a Compute Express Link device so that a ratio (memory module ratio) of a first number of memory modules that are directly connected to the central processing units within the first partition or assigned to the first partition and a second number of memory modules that are directly connected to the central processing units within the second partition or assigned to the second partition approximates the processor ratio or is closer to the processor ratio than without assigning the one or more memory modules. In one option, the Compute Express Link device in the first partition may support fractional assignment of the memory modules connected through the Compute Express Link device. In another option, the Compute Express Link device in the first partition may require that all of the memory modules connected through the Compute Express Link device be assigned to the same partition.

In some embodiments, the multi-processor system is a host processor module, and the baseboard management controller is installed on a system management module that is selectively connectable to the host processor module. The system management module may still manage operation of the host processor module via an interface.

In some embodiments, the baseboard management controller may send a partitioning instruction to an integrated circuit, such as a field-programmable gate array, on the host processor module. The instruction that is sent to the integrated circuit on the host processor module may instruct the integrated circuit to enter a first mode (a unified state) for operating all resources as a single unified node with the one or more processor interconnects enabled or may instruct the integrated circuit to enter a second mode (a partitioned state) for operating the system as a partitioned system including the first and second independent partitioned nodes with the one or more processor interconnects disabled.

In some embodiments, the operations of the baseboard management controller may further comprise obtaining an inventory of one or more resource types in the multi-processor system before the firmware interface boots, wherein the one or more resource types include data storage devices and/or input/output devices and initiating partitioning of resources of the one or more resource type between the first and second independent partitioned nodes. In one option, the operations may further comprise identifying, for the one or more resource types, an amount of resources within the multi-processor system that are of the same resource type, determining a ratio of a number of central processing units in the first partitioned node to a number of central processing units in the second partitioned node, and assigning, for the one or more resource types, the identified amount of the resource between the first partitioned node and the second partitioned node to approximate the ratio. In another option, the operation of assigning, for the one or more resource types, the identified amount of the resource between the first partitioned node and the second partitioned node to approximate the ratio may include assigning a first group of resources of the multi-processor system to the first partitioned node and assigning a second group of resources of the multi-processor system to the second partitioned node, wherein the first and second groups include at least one data storage device and/or at least one input/output device.

Some embodiments provide a method comprising detecting a number of memory modules connected to each of a plurality of central processing units in the multi-processor system during a boot process, initiating operation of the multi-processor system as a single unified node in response to each of the plurality of central processing units being connected to an equal number of memory modules, and initiating partitioning of the multi-processor system into a first partitioned node and a second partitioned node in response to a first set of one or more of the central processing units each being connected to a first number of memory modules and a second set of one or more of the central processing units each being connected to a second number of memory modules that is different than the first number of memory modules. The first partitioned node may include the one or more central processing units that are connected to the first number of memory modules, and the second partitioned node may include the one or more central processing units that are connected to the second number of memory modules. Optionally, the method may further comprise determining that the first number of memory modules in the first partitioned node is greater than the second number of memory modules in the second partitioned node and initiating configuration of one or more of the memory modules in the first partitioned node that are connected through a Compute Express Link device to be shared by the one or more central processing units of the first partitioned node and the one or more central processing units of the second partitioned node.

In some embodiments, the operation of initiating partitioning of the multi-processor system into the first partitioned node and the second partitioned node may include sending an instruction to disable one or more processor interconnects between the first set of central processing units and the second set of central processing units, wherein the first set of central processing units is operable as a first independent partitioned node and the second set of central processing units is operable as a second independent partitioned node. The instruction may be sent to a firmware interface. Furthermore, the number of memory modules connected to each of the plurality of central processing units may be identified before booting the firmware interface.

Multiplexers for Selectively Connecting a Single KVM Connection to Multiple Central Processing Units Some embodiments provide a multi-processor system comprising first and second central processing units connected by a processor interconnect, a single baseboard management controller for managing operation of the first and second central processing units, wherein the first and second central processing units are operable as a single unified node, and a single keyboard, video and mouse connection, wherein the single keyboard, video and mouse connection includes a video controller and a USB controller. The multi-processor system may further comprise a multiplexer circuit connected to the video controller and the USB controller, wherein the multiplexer circuit has a selectable PCIe connection to either the first central processing unit or the second central processing unit.

In some embodiments of the system, the baseboard management controller may execute program instructions to initiate partitioning of the multi-processor system into a first partitioned node including the first central processing unit and a second partitioned node including the second central processing unit. The baseboard management controller may execute further program instructions to control the selection signal to the first and second select line inputs to provide the first central processing unit with access to the single keyboard, video and mouse connection or to provide the second central processing unit with access to the single keyboard, video and mouse connection.

In some embodiments, the multiplexer circuit may include a first PCIe multiplexer connected to the video controller and having a selectable PCIe connection to either the first central processing unit or the second central processing unit, and a second PCIe multiplexer connected to the USB controller and having a selectable PCIe connection to either the first central processing unit or the second central processing unit, wherein the first PCIe multiplexer has a first select line input and the second PCIe multiplexer has a second select line input.

In some embodiments, the first PCIe multiplexer may have a first select line input and the second PCIe multiplexer may have a second select line input. The first and second select line inputs preferably receive the same selection signal to cause the selectable PCIe connections of the first and second PCIe multiplexers to both connect to a selected one of the first and second central processing units. The video controller and the USB controller may be hot swapped between the first and the second central processing units in response to a change in the selection signal received by the first and second select line inputs. In one option, the baseboard management controller may be connected to the first and second select line inputs for communication of the selection signal to the PCIe multiplexers. Therefore, the baseboard management controller may provide the selection signal to the first and second select line inputs in response to user input to a user interface for the baseboard management controller. Furthermore, the baseboard management controller may automatically provide the selection signal to the first and second select line inputs in response to detecting a predetermined operating condition of the multi-processor system, such as an error condition requiring user attention.

In some embodiments, the first and second central processing units are located on a host processor module, and both the single keyboard, video and mouse connection and the single baseboard management controller are located on a control module that is connected to the host processor module. The first and second PCIe multiplexers may both be located either on the control module or on the host processor module. However, the two PCIe multiplexers are preferably located on the host processor module because this location reduces the amount of input/output driven through the DC-SCM connector interface. In one option, an existing DC-SCM may be used in a system having the two PCIe multiplexers on the host processor module.

Some embodiments provide a computer program product comprising a non-volatile computer readable medium and non-transitory program instructions embodied therein, the program instructions being configured to be executable by a processor of a baseboard management controller in a multi-processor system to cause the processor to perform various operations. The operations may comprise initiating partitioning of the multi-processor system into a first partitioned node including a first central processing unit of the multi-processor system and a second partitioned node including a second central processing unit of the multi-processor system, and sending a selection signal to a PCIe multiplexer connected to a video controller and a USB controller, wherein the PCIe multiplexer has a selectable PCIe connection to either the first central processing unit or the second central processing unit.

In some embodiments, the PCIe multiplexer includes a first PCIe multiplexer connected to the video controller and having a selectable PCIe connection to either the first central processing unit or the second central processing unit, wherein the first PCIe multiplexer has a first select line input for receiving the selection signal and selecting the selectable connection. The PCIe multiplexer may further include a second PCIe multiplexer connected to the USB controller and having a selectable PCIe connection to either the first central processing unit or the second central processing unit, wherein the second PCIe multiplexer has a second select line input for receiving the selection signal and selecting the selectable connection, and wherein the selection signal is sent to the first and second select line inputs.

In some embodiments, the operations may further comprise initiating boot of the first central processing unit and the second central processing unit, wherein the first central processing unit in the first partitioned node operates independent of the second central processing unit in the second partitioned node. Subsequently, the video controller and the USB controller may be hot swapped between the first and the second central processing units in response to a change in the selection signal received by the first and second select line inputs. In one option, the selection signal may be sent to the first and second select line inputs in response to user input to a user interface for the baseboard management controller. In another option, the baseboard management controller may automatically send the selection signal to the first and second select line inputs in response to detecting a predetermined operating condition of the first partitioned node and/or the second partitioned node.

In some embodiments, the operation of initiating partitioning of the multi-processor system into the first partitioned node including the first central processing unit and the second partitioned node including the second central processing unit may include initiating disablement of a processor interconnect between the first central processing unit and the second central processing unit. In one option, the operation of initiating disablement of the processor interconnect between the first central processing unit and the second central processing unit may include instructing a firmware interface for the multi-processor system to prevent initialization of the processor interconnect during boot. In another option, the operation of initiating disablement of the processor interconnect between the first central processing unit and the second central processing unit may include causing a field-programmable gate array in the multi-processor system to disable the processor interconnect between the first and second processors.

The multi-processor system may include a single KVM (keyboard, video and mouse) connection. However, when the system is being operated with first and second partitioned nodes, each of the resulting partitioned nodes must share the single KVM connection, which may for example be located on a system management system or control module, such as a DC-SCM. A video controller and a USB controller may collectively provide the KVM connection, where a display device may be connected to the video controller and a keyboard and/or a mouse may be connected to the USB controller. The PCIe multiplexers are connected to the video and USB controllers to make it possible for both of the first and second partitioned nodes to utilize the KVM connection, albeit not at the same time, by controlling the PCIe multiplexers to be directed at either partition. It is beneficial that the multi-processor system is not required to have two/dual video controllers and/or two/dual USB controllers.

The computer program products described herein may further include program instructions for implementing or initiating any one or more steps or operations of the methods described herein. Furthermore, the methods described herein may include steps or operations for implementing or initiating any one or more operations of the computer program products described herein.

FIG. 1 is a diagram of a multi-processor system 10 including a host processor module 20 and a control module 60. The host processor module 20 includes a first central processing unit ("CPU 0") 30, a second central processing unit ("CPU 1") 40, and a processor interconnect 22 connecting the first and second central processing units 30, 40. The representative processor interconnect 22 connects first and second ports (Port 1 and Port 2) 31, 32 of the first central processing unit 30 to first and second ports (Port 1 and Port 2) 41, 42 of the second central processing unit 40. The processor interconnect 22 may be, without limitation, a Cache Coherent Interconnect for Accelerators (CCIX), Ultra Path Interconnect (UPI), or Inter-Chip Global Memory Interconnect (XGMI).

The first central processing unit 30 further includes a first Peripheral Component Interconnect Express (PCIe) port ("PCIe Port 0") 33 connected to a data storage device(s) 11 and a second PCIe port ("PCIe Port 1") 34 connected to an input/output device(s) 12. Similarly, the second central processing unit 40 further includes a first PCIe port ("PCIe Port 0") 43 connected to a data storage device(s) 13 and a second PCIe port ("PCIe Port 1") 44 connected to an input/output device(s) 14. Still further, the first central processing unit 30 is connected to the memory modules 35 and the second central processing unit 40 is connected to the memory modules 45. The data storage device(s) 11, 13, input/output device(s) 12, 14, and memory modules 35, 45 are representative of devices connected to the first and second central processing units 30, 40 and should not be taken to be limiting as to the types and numbers of devices and/or ports available to the central processing units. Similarly, the multi-processor system 10 is not limited to having only two central processing units.

The control module 60, also referred to herein as a system management system, is illustrated as a DataCenter-ready Secure Control Module (DC-SCM). The control module 60 is connected to the host processor module 20 by a control module interface 15, such as a DataCenter-ready Secure Control Interface (DC-SCI). A baseboard management controller 62 is located on the control module 60 but is able to communicate with various components on the host processor module 20 through the control module interface 15. For example, the baseboard management controller 62 may detect one or more aspect of the system configuration for the multi-processor system 20 and/or may collect a system inventory through various types of connections 63 extending through the control module interface 15, such as an Inter-Integrated Circuit (I2C) bus, Improved Inter-Integrated Circuit (I3C) bus, Serial peripheral Interface (SPI) communication interfaces, and other available connections.

In accordance with various embodiments, the baseboard management controller 62 may also execute logic for determining a partitioning mode or configuration to be implemented in the host processor module 20. The baseboard management controller 62 may use the inventory or other detected aspect of the system configuration to inform a partitioning decision or selection, and/or may use the inventory or other detected aspect of the system configuration to adapt how resources may be divided or shared between partitioned nodes. A partitioning decision or partitioning mode selection for the multi-processor system may be based on a workload type or quantity, a utilization level, a targeted performance parameter, a system inventory or configuration, a user instruction, one or more error conditions, one or more failed or missing components, and the like.

The baseboard management controller 62 may implement a partitioning decision by initiating partitioning. For example, baseboard management controller 62 may instruct a Unified Extensible Firmware Interface (UEFI) 64 to disable the processor interconnect 22 between the central processing units 30, 40, or any other processor interconnect that may exist between any two central processing units in the multi-processor system 10. In one option, the UEFI 64 may be instructed to not initialize the ports 31, 32 that allow the first central processing unit 30 to access the processor interconnect 22 and/or may be instructed to not initialize the ports 41, 42 that allow the second central processing unit 40 to access the processor interconnect 22. Accordingly, during boot, the respective ports will not be initialized and the processor interconnect 22 will be effectively disabled. The baseboard management controller 62 may similarly instruct the UEFI 64 to disable one or more PCIe port 33, 34 of the first central processing unit 30 and/or instruct the UEFI 64 to disable one or more PCIe port 43, 44 of the second central processing unit 40. Although the data storage device(s) 11, 13, input/output device(s) 12, 14, and memory modules 35 are illustrated here as being connected to only one of the central processing units, some of these devices may support multiple host connections and may be connected to multiple central processing units, as discussed further in reference to other Figures.

Still further, the baseboard management controller 62 may send a partitioning instruction to an integrated circuit 24, such as a field-programmable gate array located on the host processor module 20. The instruction that is sent to the integrated circuit 24 on the host processor module 20 may instruct the integrated circuit 24 to enter a first mode for operating all resources of the system 10 as a single unified node with the processor interconnect 22 enabled or may instruct the integrated circuit 24 to enter a second mode for operating the system 10 as a partitioned system including a first partitioned node and a second partitioned node with the processor interconnect 22 disabled. The first integrated circuit 24 may independently control power sequencing, enabling/disabling clocks, asserting/releasing resets, responding to throttling requests (thermal and power), and device error reporting/responses for each partitioned node on the host processor module. For these purposes, a first power, clock, reset control device 36, which may be representative of multiple dedicated devices, and a second power, clock, reset control device 46, which may also be representative of multiple dedicated devices. Therefore, the integrated circuit 24 may control these and other functions of the host processor module 20 independently for each of the first and second central processing units 30, 40 and their respective first and second partitioned nodes. Namely, the integrated circuit 24 may control the power, clock, reset, throttling, and error reporting (via the representative device 36) for any number of components in a first partitioned node that includes the first central processing unit 30 independent of its control over the power, clock, reset, throttling, and error reporting (via the representative device 46) for any number of other components in a second partitioned node that includes the second central processing unit 40. Power, clock, reset control and other lines (see the dashed lines) are illustrated extending from the first power, clock, reset control device 36 to the first central processing unit 30, the data storage device(s) 11, the memory modules 35, and the input/output device(s) 12. Additional power, clock, reset control and other lines (see the dashed lines) are illustrated extending from the second power, clock, reset control device 46 to the second central processing unit 40, the data storage device(s) 13, the memory modules 45, and the input/output device(s) 14. Optionally, the integrated circuit 24 may have group output enable connections that allow for one or more power regulations, reference clocks and the like to be enabled or disabled for a partitioned node. It is a technological advantage that the illustrated embodiment may independently control any/all aspects of operation of the components with a respective partitioned node.

Furthermore, a second integrated circuit 65, such as a secure control module field-programmable gate array (SCM FPGA), is located on the control module 60, such as a DC-SCM. The second integrated circuit 65 may be aware of any partitioning that is being implemented in the multi-processor system 10 and may independently control resources in the control module 60 that are dedicated to a particular partition. Accordingly, the baseboard management controller 62 may control both the first and second integrated circuits 24, 65, such as first and second FPGAs, with the same or similar partitioning signals or instructions to cause resources on both the host processor module 20 and the control module 60 to be partitioned and controlled consistently. For example, a connection 16 between the integrated circuits 24, 65 may be used to share the partitioning instruction or enforce consistency in the partitioning. For example, the first integrated circuit 24 may include a partitioning register 25 that may store the partitioning instruction or a partitioning mode identifier. In a further option, the first and second integrated circuits 24, 65 may also perform serializing and de-serializing for one or more connections between the host processor module 20 (i.e., via the first integrated circuit 24) and the control module 60 (i.e., via the second integrated circuit 65). The partitioning instruction provided to the first integrated circuit 24, the second integrated circuit 65 and the UEFI 64 should be consistent and complimentary to each other partitioning instruction. Collectively, the baseboard management controller 62 implements a partitioned node via control over the firmware interface and the first and second integrated circuits 24, 65.

The control module 60 has additional components and architecture to support the foregoing functionality. For example, the control module 60 is shown to include a Root of Trust (RoT) device 66 that supports first and second firmware interface flash devices 64 and a baseboard management controller flash device 67. For example, a first firmware interface flash device and a first baseboard management controller flash device may support operation of the first partitioned node including the first central processing unit 30, and a second firmware interface flash device and a second baseboard management controller flash device may support operation of the second partitioned node including the second central processing unit 40. The control module 60 further includes a Trusted Platform Module (TPM) 68 and a video/USB device 69 (a video controller and a USB controller) for connection to a console (a display monitor and a keyboard/mouse).

The control module 60 may further include a PCIe to USB controller for each CPU. Where each central processing unit has a PCIe bus for connecting to a PCIe to USB controller, each PCIe bus may be multiplexed to a single PCIe to USB controller or there may be two PCIe to USB controllers, either on the system board or the control module depending upon the availability of I/O pins for the control module interface. For example, each of the central processing units 30, 40 may have an additional PCIe port (i.e., PCIe Port 2) that is connected to a multiplexer that selects, based on input from the baseboard management controller 62, which of the central processing units will be connected to the USB ports on the back end of the control module 60, such as the Video/USB 69. This latter configuration is discussed further in reference to FIG. 7. It should be understood that the components and connections of FIG. 7 may be implemented in the system of FIG. 1.

When a serial over local area network ("Serial over LAN") is selected, then the serial communication may be routed to the baseboard management controller. For example, Serial over LAN may be utilized to support the use of multiple consoles, such as first and second central processing units of separate partitioned nodes each having access to a Video/USB console.

In some architectures, the central processing units 30, 40 may have serial ports that can be directed to the control module 60 on spare I/O connections such that a device 61 for adapting a universal asynchronous receiver-transmitter to a universal serial bus (a "UART-to-USB device" 61) may be located on the control module 60 with egress of the UART-to-USB device 61 from the control module 60 to an endpoint USB device via a USB port 50 and/or the video/USB 69. However, in other architectures where the central processing units lack spare I/O connections, the serial communication may be directed from the central processing units 30, 40 to the HPM FPGA 24, forwarded via the FPGA-FPGA link 16 to the SCM FPGA 65, then delivered from the SCM FPGA 65 to the UART-to-USB device 61.

Still further, in architectures that don't have a central processing unit serial port, the FPGAs 24, 65 or BMC 62 may use a connection to the central processing units, such as an eSPI or PCIe connection, to serve as an endpoint UART device that may then forward serial communications to the UART-to-USB device. Serial over LAN is a function within the baseboard management controller and the serial connections from the central processing units may pass through a multiplexer or selector to the BMC in order to access the Serial over LAN function. Thus, if Serial over Lan is selected then the path to the BMC is selected else the connection is switched to the UART to USB device.

Figure 2:
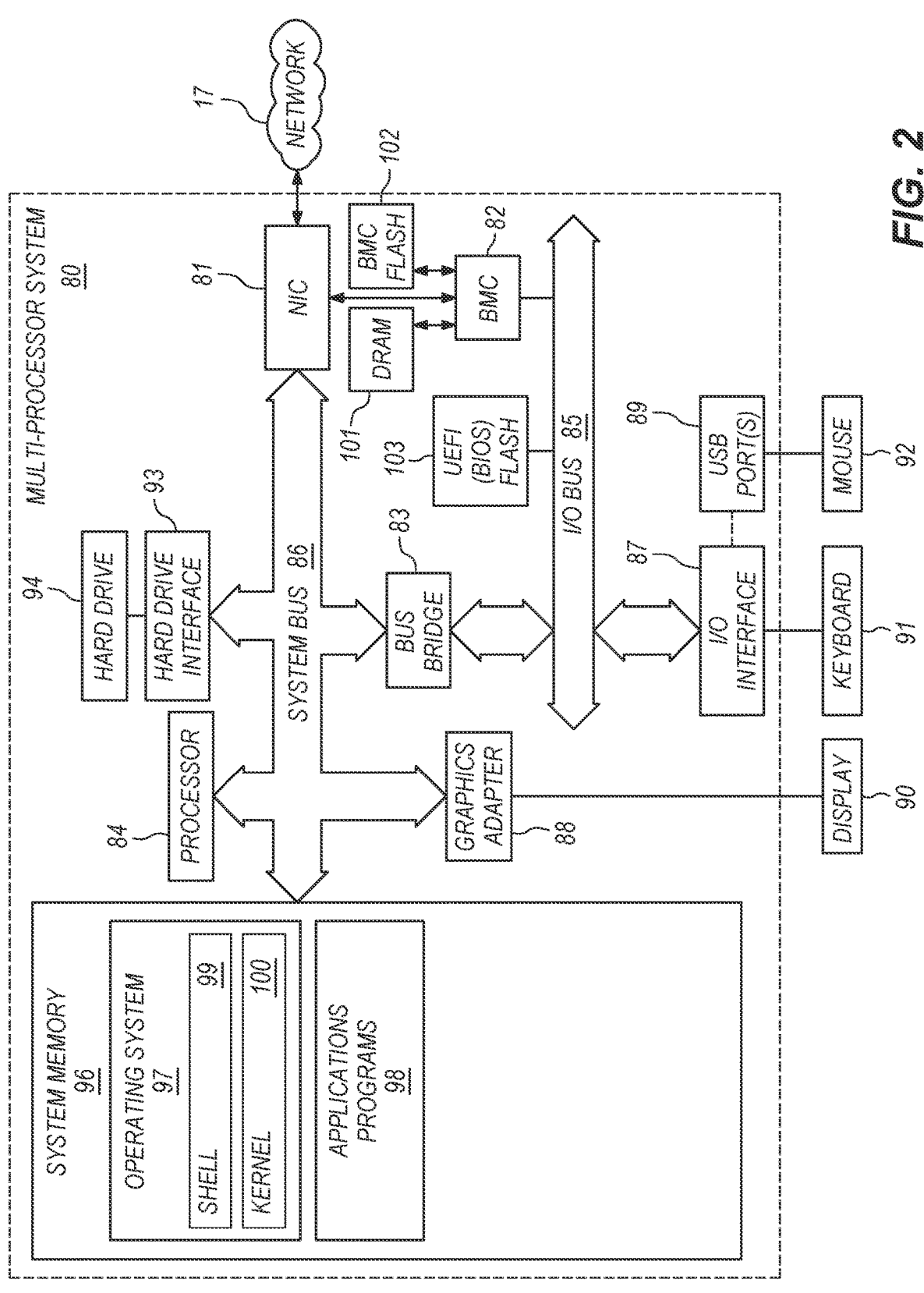
FIG. 2 is a diagram of another partitionable multi-processor system or node having a baseboard management controller on the system board consistent with some embodiments.

FIG. 2 is a diagram of another multi-processor system 80 having a baseboard management controller 82 on the system board consistent with some embodiments. The system 80 includes a processor unit 84 that is coupled to a system bus 86. The processor unit 84 may include two or more central processing units, each of which has one or more cores. A graphics adapter 88, which may drive/support a display 90, is also coupled to system bus 86. The graphics adapter 88 may, for example, include a graphics processing unit (GPU). The system bus 86 is coupled via a bus bridge 83 to an input/output (I/O) bus 85. An I/O interface 87 is coupled to the I/O bus 85. The I/O interface 87 affords communication with various I/O devices, such as a keyboard 91 (perhaps as a touch screen virtual keyboard), and a USB mouse 92 via USB port(s) 89 (or other type of pointing device, such as a trackpad). As depicted, the system 80 may communicate with other devices over the network 17 using a network adapter or network interface controller (NIC) 81, which may be a Smart NIC. The hardware elements depicted in the system 80 are not intended to be exhaustive, but rather are representative. For instance, the system 80 may further include non-volatile memory and the like.

A hard drive interface 93 is also coupled to the system bus 86. The hard drive interface 93 interfaces with a hard drive 94. In a preferred embodiment, the hard drive 94 communicates with system memory 96, which is also coupled to the system bus 86. System memory is defined as the lowest level of volatile memory in the system 80. This volatile memory may include additional higher levels of volatile memory (not shown), including, but not limited to, cache memory, registers and buffers. Data that populates the system memory 96 may include an operating system (OS) 97 and application programs 98.

The operating system 97 includes a shell 99 for providing transparent user access to resources such as application programs 98. Generally, the shell 99 is a program that provides an interpreter and an interface between the user and the operating system. More specifically, the shell 99 executes commands that are entered into a command line user interface or from a file. Thus, the shell 99, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 100) for processing. Note that while the shell 99 may be a text-based, line-oriented user interface, embodiments may support other user interface modes, such as graphical, voice, gestural, etc.

As depicted, the operating system 97 also includes the kernel 100, which may include lower levels of functionality for the operating system 97, including providing essential services required by other parts of the operating system 97 and application programs 98. Such essential services may include memory management, process and task management, disk management, and mouse and keyboard management. As shown, the system 80 includes application programs 98 in the system memory of the system 80.

The system 80 further includes the baseboard management controller (BMC) 82, which may be located on a motherboard along with the processors 84. The BMC may be used to perform out-of-band processing and may monitor and manage various features of the hardware components of the server. Furthermore, the BMC 82 may detect a configuration of the system 80 or obtain an inventory of the system 90, as well as initiate partitioning of the system 80 and performing other operations described herein. In support of the BMC's operations, the BMC 82 may have access to Dynamic Random-Access Memory 101 and BMC Flash 102. Still further, the system 80 includes a Unified Extensible Firmware Interface (UEFI) Basic Input Output System (BIOS) flash 103. The illustrated components of the system 80 are representative and should not be interpreted as limiting.

Figure 3:
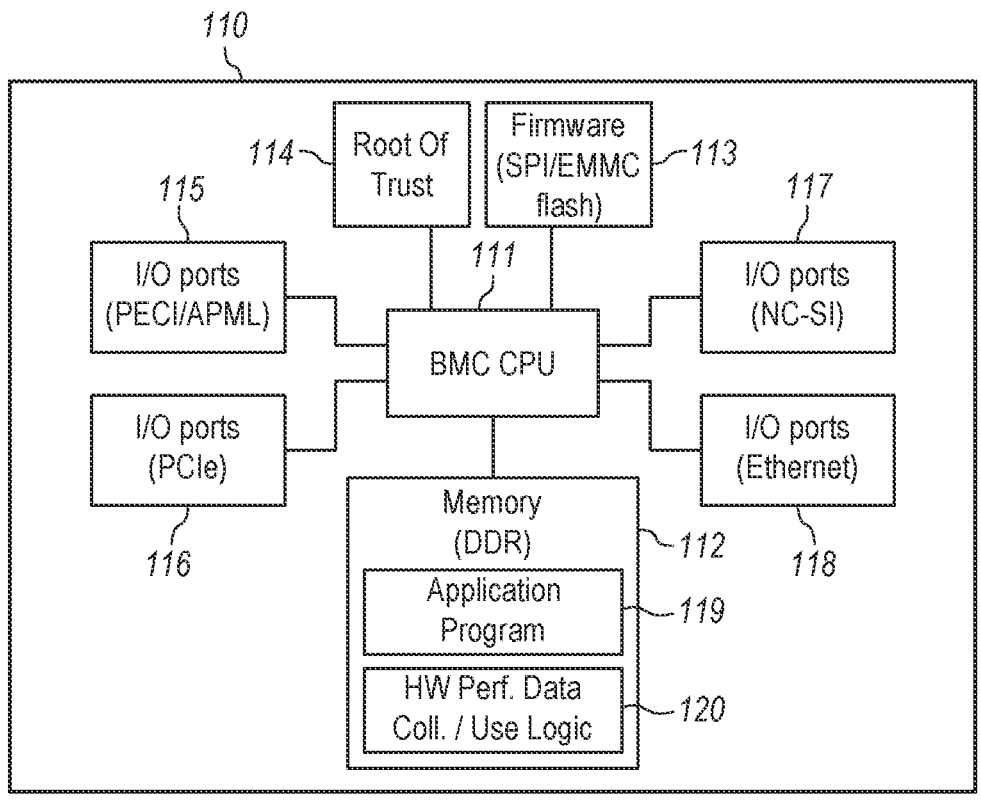
FIG. 3 is a diagram of a baseboard management controller according to some embodiments.

FIG. 3 is a diagram of a system management system 110 including a baseboard management controller central processing unit (BMC CPU) 111 according to some embodiments. The system management system 110 is includes some of the components shown in FIGS. 1 and 2 and is intended to be representative of a management system that could be incorporated either on a control module (as in FIG. 1) or on motherboard (as in FIG. 2). The system management system 110 is similar to a small computer or system on a chip (SoC), including a central processing unit (CPU) 111, memory 112 (such as random-access memory (RAM) on a double data rate (DDR) bus), firmware 113 on a flash memory (such as an embedded multi-media card (eMMC) flash memory or a serial peripheral interface (SPI) flash memory), and a Root of Trust (RoT) chip 114. The system management system 110 further includes a wide variety of input/output ports. For example, the input/output (I/O) ports may include I/O ports 115 to the hardware components of the server, such as a Platform Environment Control Interface (PECI) port and/or an Advanced Platform Management Link (APML) port; I/O ports 116 to the hardware components of the servers and/or a network interface controller (NIC), such as a Peripheral Component Interconnect Express (PCIe) port; I/O ports 117 to the NIC, such as a network controller sideband interface (NC-SI) port; and I/O ports 118 to a network that accessible to an external user, such as an Ethernet port. The BMC CPU 111 of the system management system 110 may execute an application program 119 causing the BMC CPU 111 to use any one or more of these I/O ports to interact with hardware devices installed on the multi-processor system to detect a system configuration or inventory data 120 for the multi-processor system. Optionally, the output from the BMC CPU 111 to a BMC web or Redfish interface may be routed through the I/O ports 118 to either directly to the network 17 (see FIG. 2) or to a network interface controller (NIC) 81 (see FIG. 2) and ultimately to the network 17 that is accessible through the NIC 81.

Figure 4:
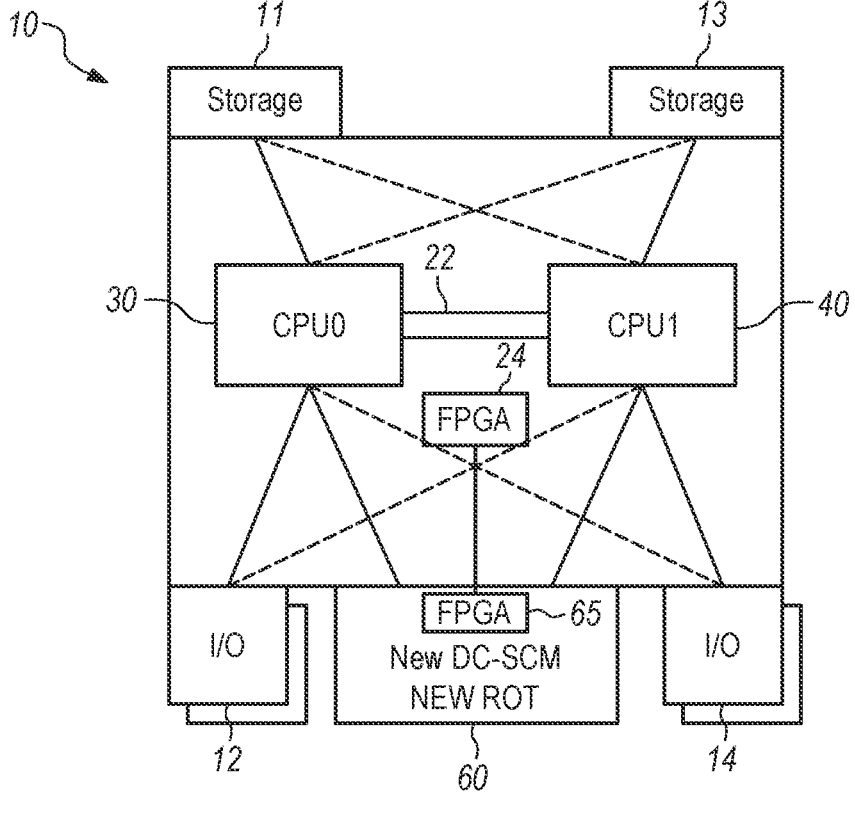
FIG. 4 is a schematic diagram of a partitionable multi-processor system illustrating various possible connections of data storage devices and input/output devices with the central processing units.

FIG. 4 is a schematic diagram of the multi-processor system 10 illustrating various possible connections of the data storage devices 11, 13 and the input/output devices 12, 14 with one or more of the central processing units 30, 40. While the first central processing unit (CPU 0) 30 may be independently controlled in a first partitioned node and the second central processing unit (CPU1) 40 may be independently controlled in a second partitioned node, each of the input/output devices 12, 14 and data storage devices 11, 13 may be independently assigned to, and operated as part of, the first partitioned node, the second partitioned node, or both the first and second partitioned nodes.

As described in reference to FIG. 1, a baseboard management controller in the control module 60 may control the firmware interface and the integrated circuit (HPM FPGA) 24 to assign the input/output devices, data storage devices and perhaps other resources to a particular partitioned node. The first central processing unit 30 and the second central processing unit 40 may each have a first connection to a/each first data storage device 11, a second connection to a/each second data storage device 13, a first connection to an/each first input/output device 12, and a second connection to an/each second input/output device 14. Note that the solid lines in FIG. 4 represent a connection that does not cross between two partitioned nodes and a dashed line represents a connection that does cross between two partitioned nodes. As described further elsewhere, the baseboard management controller may instruct the firmware interface to enable/disable any of these connections (solid or dashed) to assign one of the devices to a particular partition or to multiple partitions if the resource is capable of multi-host connectivity.

The firmware interface may receive a partitioning instruction, perhaps in the form of a partitioning mode to be implemented, from the BMC and may subsequently disable the processor interconnect (link) 22 to form a first partitioned node including the first central processing unit 30 and a second partitioned node including the second central processing unit 40. For example, the firmware interface may either perform the link initialization steps to enable the ports to the processor interconnect or not perform the link initialization steps so as to not enable the processor interconnect (i.e., disable the processor interconnect). In the same manner, the firmware interface may assign the data storage devices and/or input/output devices either perform link initialization (enable) or not perform link initialization (disable) to enable/disable the PCIe ports that connect the first central processing unit 30 to any one or more of the storage or I/O devices and to enable/disable the PCIe ports that connect the second central processing unit 40 to any one or more of the storage or I/O devices. Accordingly, the firmware interface can be instructed to implement a desired set of one of more storage and/or I/O devices to the first partitioned node and a desired set of one or more storage and/or I/O device to the second partitioned node. The FPGA 24 may receive the same instruction or at least a consistent instruction to provide independent control over power, clock, reset, error handling and the like for each partitioned node.

The FPGA (integrated circuit) 24 on the system 10 may receive the same instruction as the firmware interface or at least a consistent instruction identifying the partitioned node to be implemented and may control the power, clocks and resets, etc. for each partitioned node. For example, if the BMC instructs the integrated circuit to power on the first partitioned node, then the integrated circuit will control or sequence the power, clock and reset in the first partitioned node. Alternatively, if the BMC instructs the integrated circuit to power on the second partitioned node, then the integrated circuit will control or sequence the power, clock and reset in the second partition node. Furthermore, if the baseboard management controller instructs the integrated circuit (labeled "FPGA") that the system is to be powered on with no partitioning so that all components operate as a single unified node, then the integrated circuit will control or sequence power, clock and reset for the entire multi-processor system. In addition, the integrated circuit may control the power, clock and reset to various components other than the central processing units, such as the input/output devices and the data storage devices, based upon either a configuration instruction from the BMC or a predetermined configuration for each partitioned node. For components that have a multi-host controller, it is possible to separately assign portions of a resource/device to multiple partitioned nodes.

Figure 5A:
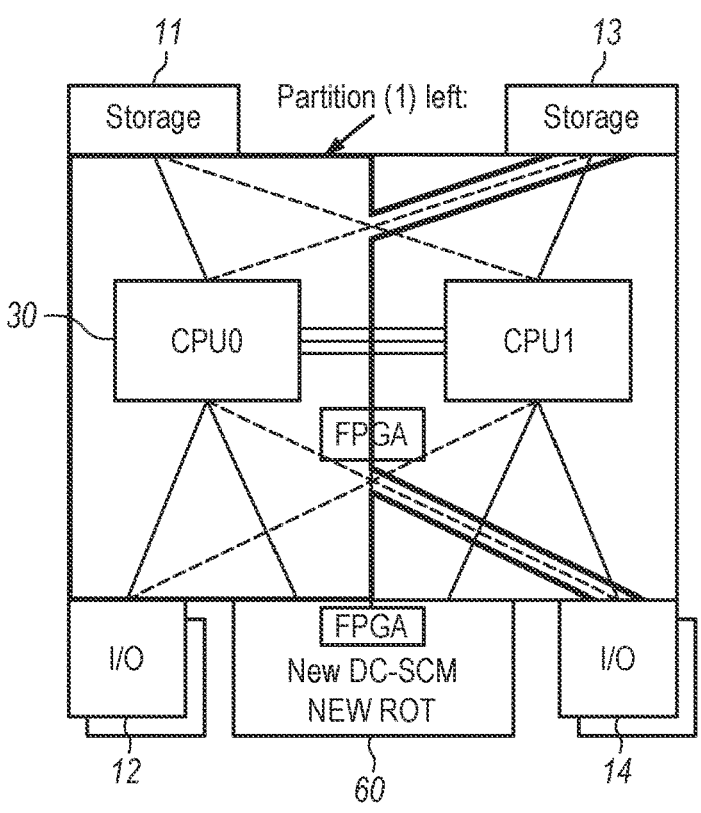
FIGS. 5A-5B are schematic diagrams highlighting various data storage devices and input/output devices that are assigned to first and second partitioned nodes of the multi-processor system, respectively.
Figure 5B:
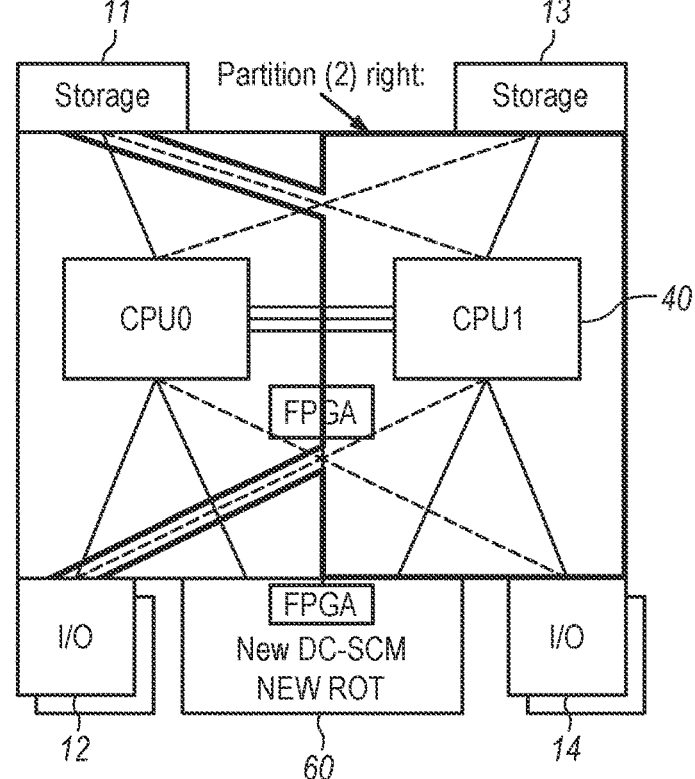

FIGS. 5A-5B are schematic diagrams highlighting various data storage devices 11, 13 and input/output devices 12, 14 that are assigned to a first partitioned node (see FIG. 5A) of the multi-processor system 10 along with the first central processing unit 30 and assigned to a second partitioned node (see FIG. 5B) of the multi-processor system 10 along with the second central processing unit 40. Other partitioned nodes may be created, but this example is provided for purposes of illustration.

FIG. 5A outlines those components/portions of the multi-processor system 10 that are assigned or configured to operation in the first partitioned node. As illustrated, the first partitioned node has been configured to include the first central processing unit 30, at least some portion of the first data storage device(s) 11, at least some portion of the second data storage device(s) 13, at least some portion of the first input/output device(s) 12, and at least some portion of the first input/output device(s) 14. In addition, some portion of the resources of the control module 60 will be assigned to manage the first partitioned node.

FIG. 5B outlines those components/portions of the multi-processor system 10 that are assigned or configured to operation in the second partitioned node. As illustrated, the second partitioned node has been configured to include the second central processing unit 40, at least some portion of the first data storage device(s) 11, at least some portion of the second data storage device(s) 13, at least some portion of the first input/output device(s) 12, and at least some portion of the first input/output device(s) 14. In addition, some portion of the resources of the control module 60 will be assigned to manage the second partitioned node.

Figure 6A:
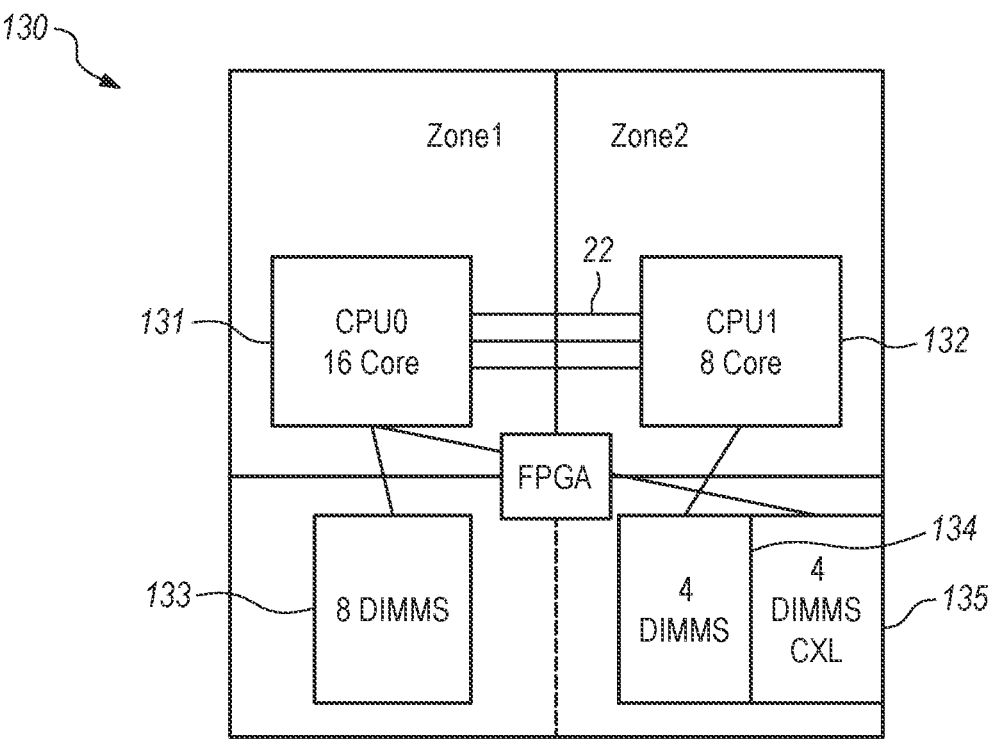
FIGS. 6A-6B are a schematic diagrams of multi-processor systems having central processing units with a disparate number of cores and disparate memory configurations.

FIG. 6A is a schematic diagram of a multi-processor system 130 having first and second central processing units 131, 132 having a disparate (not equal) number of cores. Specifically, the first central processing unit ("CPU0") has 16 cores and the second central processing unit ("CPU1") has 8 cores. Accordingly, the first central processing unit 131 is disparate from the second central processing unit 132 because of the difference in the number of cores. So, a first partitioned node ("Zone 1") is formed with the first central processing unit 131 and a second partitioned node ("Zone 2") is formed with the second central processing unit 132. In order to assign the memory resources of the system 130 among the first and second partitioned nodes, the relative number of cores within each partitioned node may be considered. In this illustration, the first central processing unit 131 is directly connected to 8 DIMMs 133 and the second central processing unit 132 is directly connected to 4 DIMMs 134 and connected to 4 more DIMMs 135 through a CXL device.

The only DIMMs that can be assigned from one partitioned node to another partitioned node are those DIMMs that are connected via a multi-host controller, such as a controller according to the Compute Express Link (CXL) device/standard. Optionally, one or more of the DIMMs 135 behind CXL may be assigned to another partitioned node so that the ratio of DIMMs in each partitioned node match or approximate the ratio of CPU cores in each partition. However, a particular CXL device may or may not support fractional assignment of the DIMMs, such that some implementations may require all of the DIMMs 135 behind the CXL device to be assigned to the same partitioned node.

In reference to FIG. 6A, the ratio of cores in the first partition to cores in the second partition is 2:1 (i.e., 16 cores in Zone 1 to 8 cores in Zone 2). Therefore, the 4 DIMMs behind CXL device in the second partitioned node may or may not be assigned to the first partitioned node to achieve a ratio of DIMMs that approximates, or moves closer to, the 2:1 ratio of cores. Optionally, one or more of the DIMMs 135 behind the CXL device may be assigned from the second partitioned node to the first partitioned node if the assignment will result in the ratio of DIMMs being closer to the ratio of cores with the assignment than without the assignment.

If the CXL device connected to the 4 DIMMs 135 does not support subdivision or mixed assignment of DIMMs, then a determination is made whether or not to leave the 4 DIMMs behind the CXL device in the second partitioned node or assign the 4 DIMMs behind the CXL device to the first partitioned node. If the 4 DIMMS 135 behind the CXL device are left in the second partitioned node, then the ratio of DIMMs becomes 1:1 (i.e., 8 DIMMs to 8 DIMMs) compared to a 2:1 ratio of cores. On the other hand, if the 4 DIMMS 135 behind the CXL device are assigned to the first partitioned node, then the ratio of DIMMs becomes 3:1 (i.e., 12 DIMMs to 4 DIMMs) compared to a 2:1 ratio of cores. Since there is a 100% difference between a 1:1 DIMM ratio and a 2:1 core ratio without assignment but only a 50% difference between a 3:1 DIMM ratio and a 2:1 core ratio with assignment. So, at least according to this method or ruleset for determining assignment of the CXL DIMMs 135, the assignment should be implemented. However, another ruleset or method might reach a different result.

If the CXL device connected to the 4 DIMMs 135 does support subdivision or mixed assignment of DIMMs, then a determination is made as to an optimal number, if any, of the 4 DIMMs 135 behind the CXL device in the second partitioned node that should be assigned to the first partitioned node. The achievable DIMM ratios include 1:1 (8:8; no assignment), 9:7 (one DIMM 135 assigned from the second partitioned node to the first partitioned node), 5:3 (10:6; two DIMMs 135 assigned from the second partitioned node to the first partitioned node), 11:5 (11:5; three DIMMs 135 assigned from the second partitioned node to the first partition node), and 3:1 (12:4; four DIMMs 135 assigned from the second partitioned node to the first partitioned node). Since the 11:5 DIMM ratio is the closest achievable DIMM ratio to the 2:1 processor core ratio, then three DIMMs 135 may be assigned from the second partitioned node to the first partitioned node. Alternatively, other rules may be used to select the number of DIMMs in each partitioned node. Optionally, input/output (I/O) devices and/or data storage devices within the system 130 (not shown; but see FIG. 1) may be similarly assigned to each partitioned node based on the relative difference in the number of cores in each partitioned node.

Figure 6B:
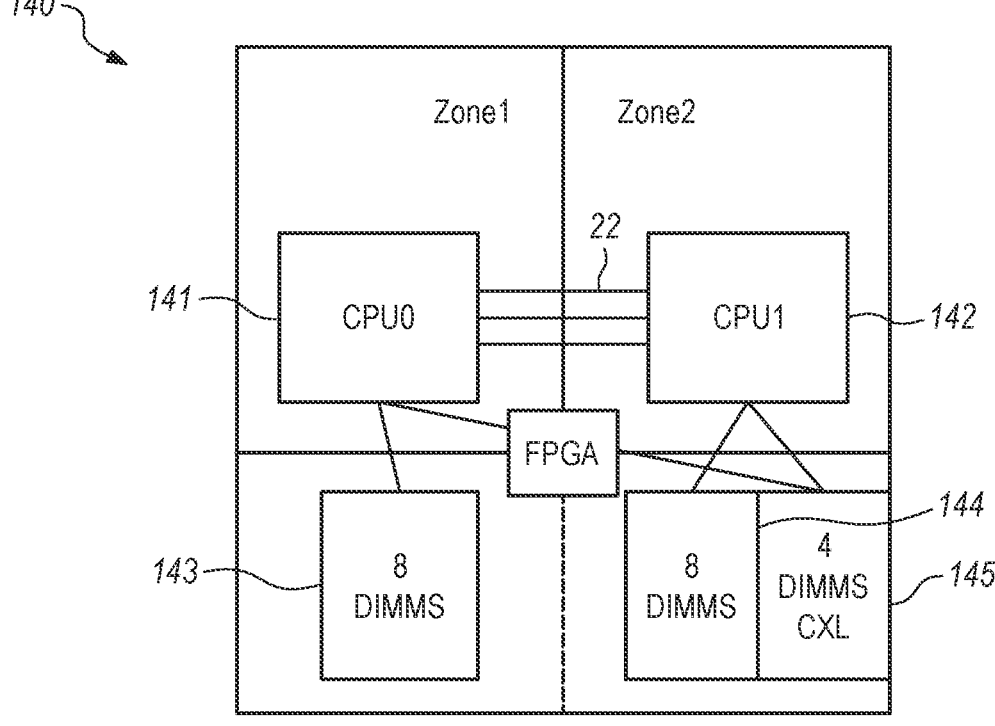

FIG. 6B is a schematic diagram of a multi-processor system 130 having first and second central processing units 131, 132 with a disparate (not equal) number of memory modules. Specifically, the first central processing unit ("CPU0") 141 has 8 DIMMs 143 and the second central processing unit ("CPU1") 142 also has 8 DIMMs 144 plus an additional 4 DIMMs 145 behind a CXL device. Accordingly, the first central processing unit 131 has a disparate number of memory modules relative to the number of memory modules connected to the second central processing unit 132. So, a first partition ("Zone 1") is formed with the first central processing unit 141 and a second partition ("Zone 2") is formed with the second central processing unit 142.

According to one embodiment, since the first Zone 1 has the lowest memory configuration (i.e., 8 DIMMs vs. 12 DIMMs), the baseboard management controller may automatically instruct the UEFI to disable the processor interconnect 22 so that, upon boot, the system 140 will operation as two independent partitioned nodes. In one option, the additional DIMMs 145 may be assigned as CXL shared by the two partitioned nodes.

Figure 7:
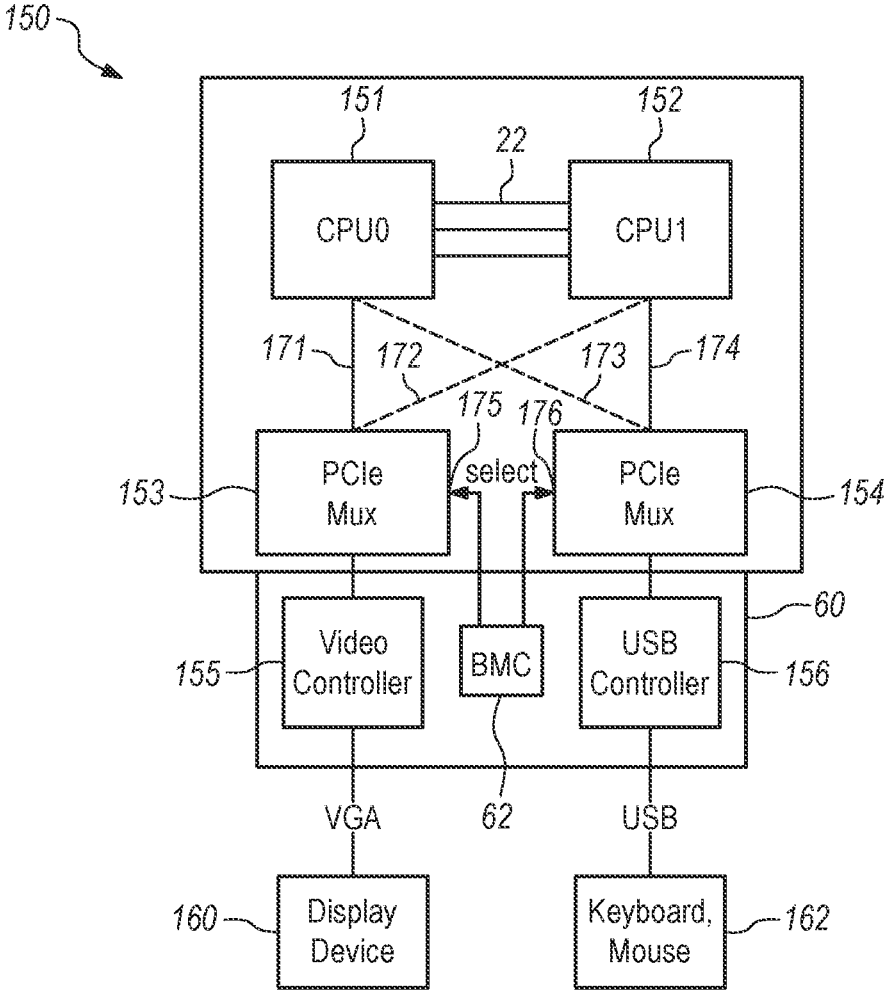
FIG. 7 is a diagram of a multi-processor system having PCIe multiplexers that enable a single video controller and a single USB controller to provide a keyboard, video and mouse (KVM) connection to the central processing unit of either a first partitioned node or a second partitioned node.

FIG. 7 is a diagram of a multi-processor system 150 having PCIe multiplexers 153, 154 that enable a single video controller 155 and a single USB controller 156 to provide a keyboard, video and mouse (KVM) connection to the central processing unit of either a first partitioned node or a second partitioned node. The multi-processor system 150 includes first and second central processing units 151, 152 connected by a processor interconnect 22, a single baseboard management controller 62 for managing operation of the first and second central processing units 151, 152. The first and second central processing units 151, 152 are operable as a single unified node with a single keyboard, video and mouse connection, wherein the single keyboard, video and mouse connection includes a video controller 155 and a USB controller 156.

The multi-processor system 150 includes a first PCIe multiplexer 153 connected to the video controller 155 and having a selectable PCIe connection 171 to the first central processing unit 151 and a selectable PCIe connection 172 to the second central processing unit 152. Either PCIe connection 171, 172 may be selected via a selection signal received directly from the BMC 62 or indirectly from the BMC 62 via the integrated circuit 24 (see FIG. 1). The multi-processor system 150 further includes a second PCIe multiplexer 154 connected to the USB controller 156 and having a selectable PCIe connection 173 to the first central processing unit 151 and a selectable PCIe connection 174 to the second central processing unit 152. Either PCIe connection 173, 174 may be selected via a selection signal received directly from the BMC 62 or indirectly from the BMC 62 via the integrated circuit 24 (see FIG. 1).

A display device 160 may be connected to the video controller 155, and a keyboard and/or a mouse 162 may be connected to the USB controller 156. Accordingly, a user may interface with either partition via the single KVM connection 155, 156 by using the display device 160 and the keyboard and/or mouse 162. However, the baseboard management controller may control the selection signal to the first and second select line inputs 175, 176 to provide the first central processing unit 151 with access to the single keyboard, video and mouse connection or to provide the second central processing unit 152 with access to the single keyboard, video and mouse connection. The video controller 155 and the USB controller 156 may be hot swapped between the first and the second central processing units in response to a change in the selection signal received by the first and second select line inputs 175, 176. In one option, the selection signal or a change in the selection signal may be sent to the first and second select line inputs in response to user input to a user interface for the baseboard management controller. In another option, the baseboard management controller may automatically send the selection signal to the first and second select line inputs in response to detecting a predetermined operating condition of the first partition and/or the second partition.

Figure 8:
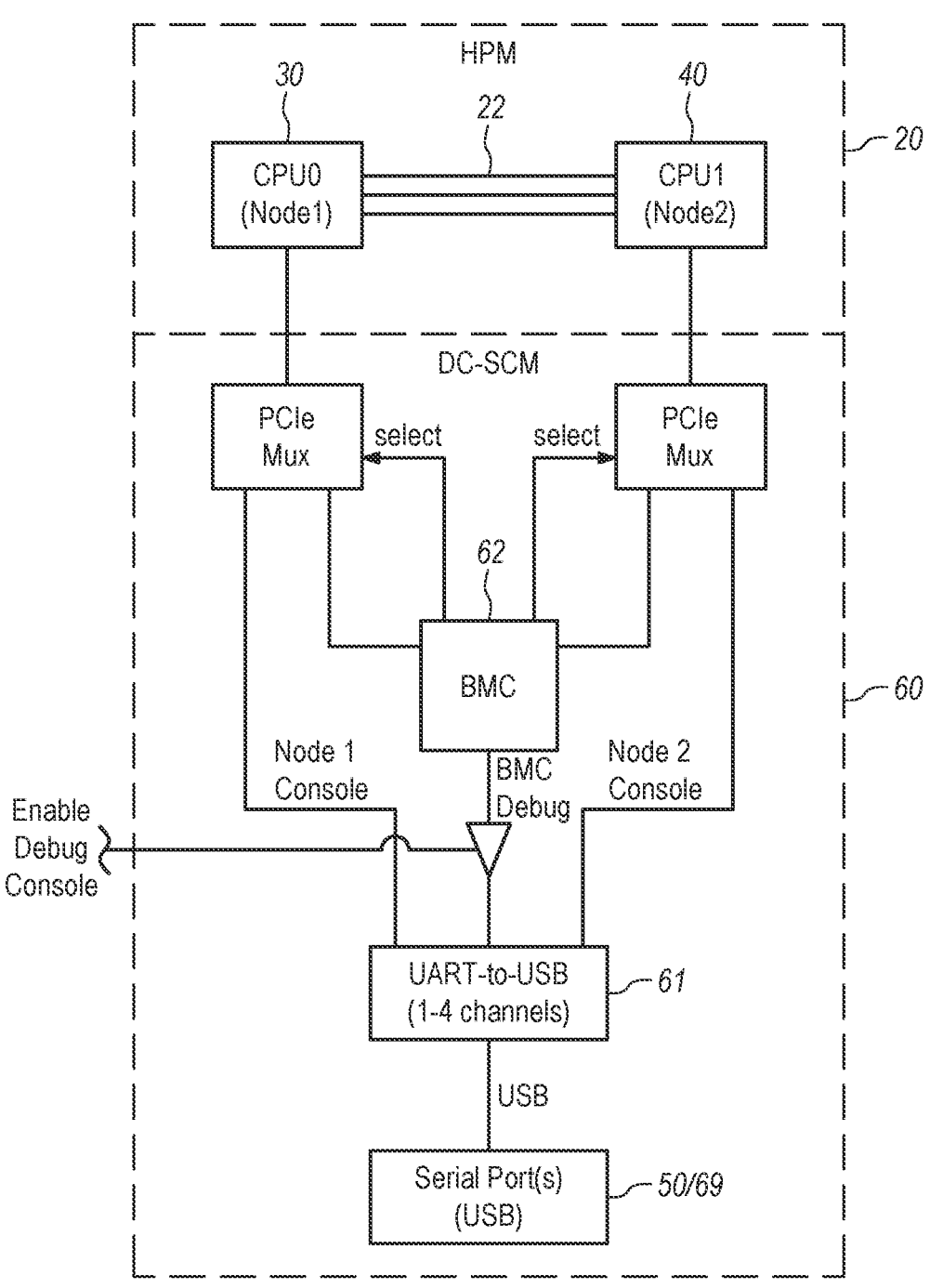
FIG. 8 is a diagram of first and second central processing units in a multi-processor system each having a connection to a UART-to-USB device.

FIG. 8 is a diagram of the first and second central processing units 30, 40 each having a connection to a UART-to-USB device (universal asynchronous receiver-transmitter to universal serial bus device). Serial over LAN may be used to support the use of multiple consoles. Specifically, only one of the two partitions may have a Video/USB connection (KVM) at any point in time and the other partition may have a serial console via the baseboard management controller Serial over LAN capability. When the baseboard management controller selects to use Serial over Lan for one of the central processing units, then the path through the PCIe Mux from the central processing unit to the BMC is selected. Otherwise, the baseboard management controller causes the Mux to select the path through the Mux from the central processing unit to the UART-to-USB device.

It should be appreciated that FIG. 7 discloses an embodiment for "sharing" video and USB controllers between the two partitioned nodes. In this embodiment, only one partitioned node may utilize the controllers at a particular point in time and their use of the controller is exclusive until the other partitioned node is allowed exclusive use of the controllers. By contrast, FIG. 8 discloses an embodiment for each partitioned node to egress the system for serial data (not the VGA/Keyboard/mouse). Each partitioned node has dedicated signals for a serial port that can collect at the UART-USB (in place of separate 9-pin connector) or to the BMC based upon the switch of the multiplexer.

Figure 9:
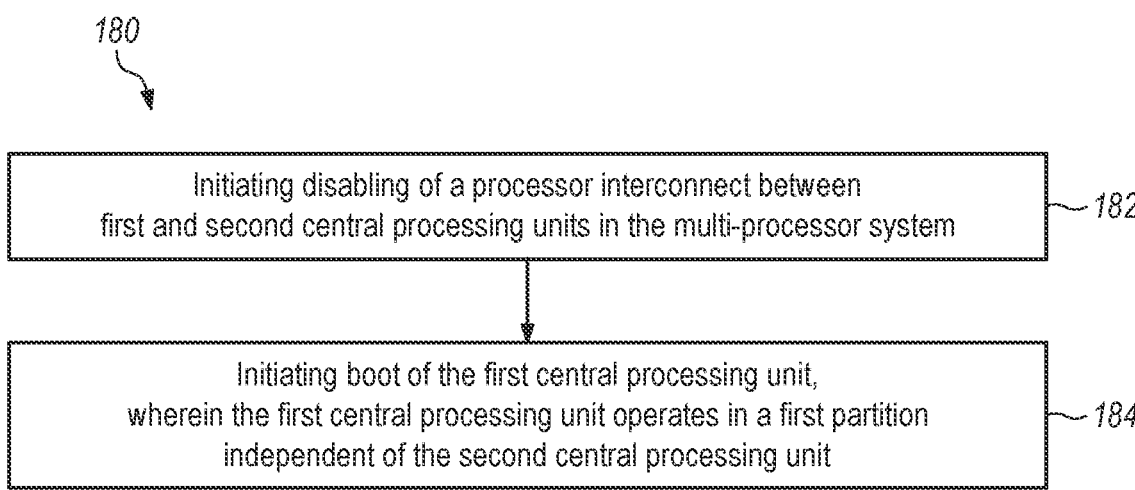

FIG. 9 is a flowchart of operations 180 for a baseboard management controller according to some embodiments. Operation 182 includes initiating disabling of a processor interconnect between first and second central processing units in the multi-processor system. Operation 184 includes initiating boot of the first central processing unit, wherein the first central processing unit operates in a first partition independent of the second central processing unit.

Figure 10:
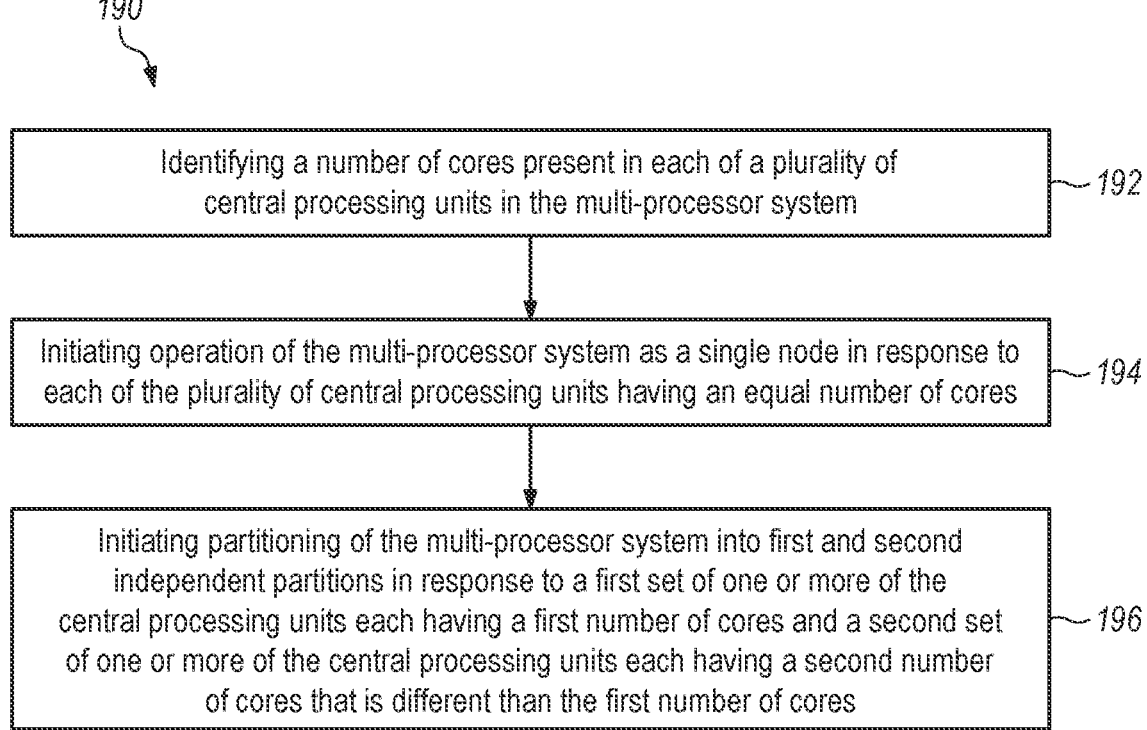

FIG. 10 is a flowchart of operations 190 for a baseboard management controller according to some embodiments. Operation 192 includes identifying a number of cores present in each of a plurality of central processing units in the multi-processor system. Operation 194 includes initiating operation of the multi-processor system as a single unified node in response to each of the plurality of central processing units having an equal number of cores. Operation 196 includes initiating partitioning of the multi-processor system into first and second independent partitions in response to a first set of one or more of the central processing units each having a first number of cores and a second set of one or more of the central processing units each having a second number of cores that is different than the first number of cores.

FIG. 11 is a flowchart of operations 200 for a baseboard management controller according to some embodiments. Operation 202 includes detecting a number of memory modules connected to each of a plurality of central processing units in the multi-processor system during boot. Operation 204 includes initiating operation of the multi-processor system as a single unified node in response to each of the plurality of central processing units being connected to an equal number of memory modules. Operation 206 includes initiating partitioning of the multi-processor system into a first partition and a second partition in response to a first set of one or more of the central processing units each being connected to a first number of memory modules and a second set of one or more of the central processing units each being connected to a second number of memory modules that is different than the first number of memory modules.

FIG. 12 is a flowchart of operations 210 for a baseboard management controller according to some embodiments. Operation 212 includes initiating partitioning of the multi-processor system into a first partition including a first central processing unit of the multi-processor system and a second partition including a second central processing unit of the multi-processor system. Operation 214 includes sending a selection signal to a first select line input to a first PCIe multiplexer and to a second select line input to a second PCIe multiplexer, wherein the first PCIe multiplexer is connected to a video controller and has a selectable PCIe connection to either the first central processing unit or the second central processing unit, and wherein the second PCIe multiplexer is connected to a USB controller and has a selectable PCIe connection to either the first central processing unit or the second central processing unit.

BMC Interface in a Partitionable System

Embodiments provides, as previously discussed, a multi-processor system including at least first and second central processing units and a single baseboard management controller (BMC) to monitor and manage the system. The baseboard management controller may be integrated on a motherboard that also supports the central processing units or the baseboard management controller may be supported on a separate control module having a card edge connector coupled to a host processor module (HPM) that supports the central processing units. For example, the control module may be a Datacenter Secure Control Module (DC-SCM) that connects to the host processor module through a Datacenter Secure Control Interface (DC-SCI). Embodiments of the multi-processor system are made to be partitionable, meaning that the multi-processor system may be operated as a single unified node or as multiple partitioned nodes that operate independent of each other partitioned node. It is a technical advantage that multiple independent partitioned nodes can be managed without requiring a separate baseboard management controller or control module for each partitioned node.

In some embodiments, the multi-processor system includes a single baseboard management controller that manages first and second partitioned nodes, wherein the single baseboard management controller is provided with all of the host interfaces that the single baseboard management controller needs to separately manage both of the partitioned nodes. Expanding the host interfaces provides additional connections that the single baseboard management controller may use to independently monitor and manage each partitioned node in the partitionable multi-processor system. For example, if the baseboard management controller requires a first set of host interface connections to manage the single unified node or a first partitioned node, then the baseboard management controller may use a second set of host interface connection, such as a duplicate of the first set of host interface connection, to further manage a second partitioned node. For the baseboard management controller to support the additional host interfaces, up to and including a full duplicate set of host interface connections, the baseboard management controller itself may have additional resources, such as a second set of hardware and software interface connections. Furthermore, the baseboard management controller may run additional processes to handle both sets of host interface connections. However, if the baseboard management controller runs first and second processes to monitor and manage first and second partitioned nodes via the first and second sets of host interface connections, respectively, the additional processes may include first and second processes that are substantially similar. In one option, a shim may be used to parse I/O to first and second threads. The term "shim" refers to logic that transparently intercepts application programming interface (API) calls and either changes the arguments passed or redirects the operation. In this example, a shim could intercept the communications to and from one set of the host interfaces and identify or direct the communications to the correct thread.

The host interface may include both hardware interfaces and software interfaces. Non-limiting examples of the hardware interfaces may include one or more of the Peripheral Component Interconnect Express (PCIe) standard, Universal Serial Bus (USB) standard, Enhanced Serial Peripheral Interface Bus (eSPI) specification, Serial Peripheral Interface (SPI) specification, Universal Asynchronous Receiver-Transmitter (UART), Inter-Integrated Circuit (I2C) bus, Improved Inter-Integrated Circuit (I3C) bus, Joint Test Action Group (JTAG) and General Purpose Input Output (GPIO) pin. Non-limiting examples of the management software interfaces may include one or more instances of Intelligent Platform Management Interface (IPMI) and the Management Component Transport Protocol (MCTP).

Embodiments of the host interface may further include connections that are not associated with a particular partitioned node and are not duplicated for each partitioned node. Accordingly, the host interface may include and utilize additional connections (not shown) that are common to managing system-wide components regardless of operation in the partitioned state or unified state, such as fans and a front panel. Components such as fans and the front panel may be controlled by the baseboard management controller and/or the integrated circuit (i.e., FPGA) and may be necessary to control the multi-processor system for the benefit of the individual partitioned nodes yet are not assigned to any one partitioned node. For example, the fans may be managed by the integrated circuit and/or the baseboard management controller with inputs from the hardware devices within the individual partitioned nodes, such as central processing unit (CPU) thermal sensors, memory module thermal sensors, voltage regulator module (VRM) thermal sensors and the like, where the baseboard management controller and/or the integrated circuit use those inputs to drive a cooling response, such as fan speed control. However, such a cooling response may be similar to the cooling response that typically occurs under the multiprocessor configuration regardless of the partitioning mode of the system.

When the multi-processor system is being operated as a single unified node, the baseboard management controller will preferably use only one set of the host interface connections. Either set of the host interface connections could be used during operation as a single unified node, but one set of the host interface connections is preferably predefined for use when the system is operating in the unified stated so that the baseboard management controller and the host system both use the same host interface connections.

Each instance of systems management software running on the individual partitioned nodes, such as the firmware interface and/or the operating system for a given partitioned node, will interface with the single BMC through the respective sets of host interface connections as if the single BMC were two separate BMCs where one BMC is dedicated to each partitioned node. External interfaces, such as video, USB and network interfaces, may be shared by the partitioned nodes under user control.

Figure 13:
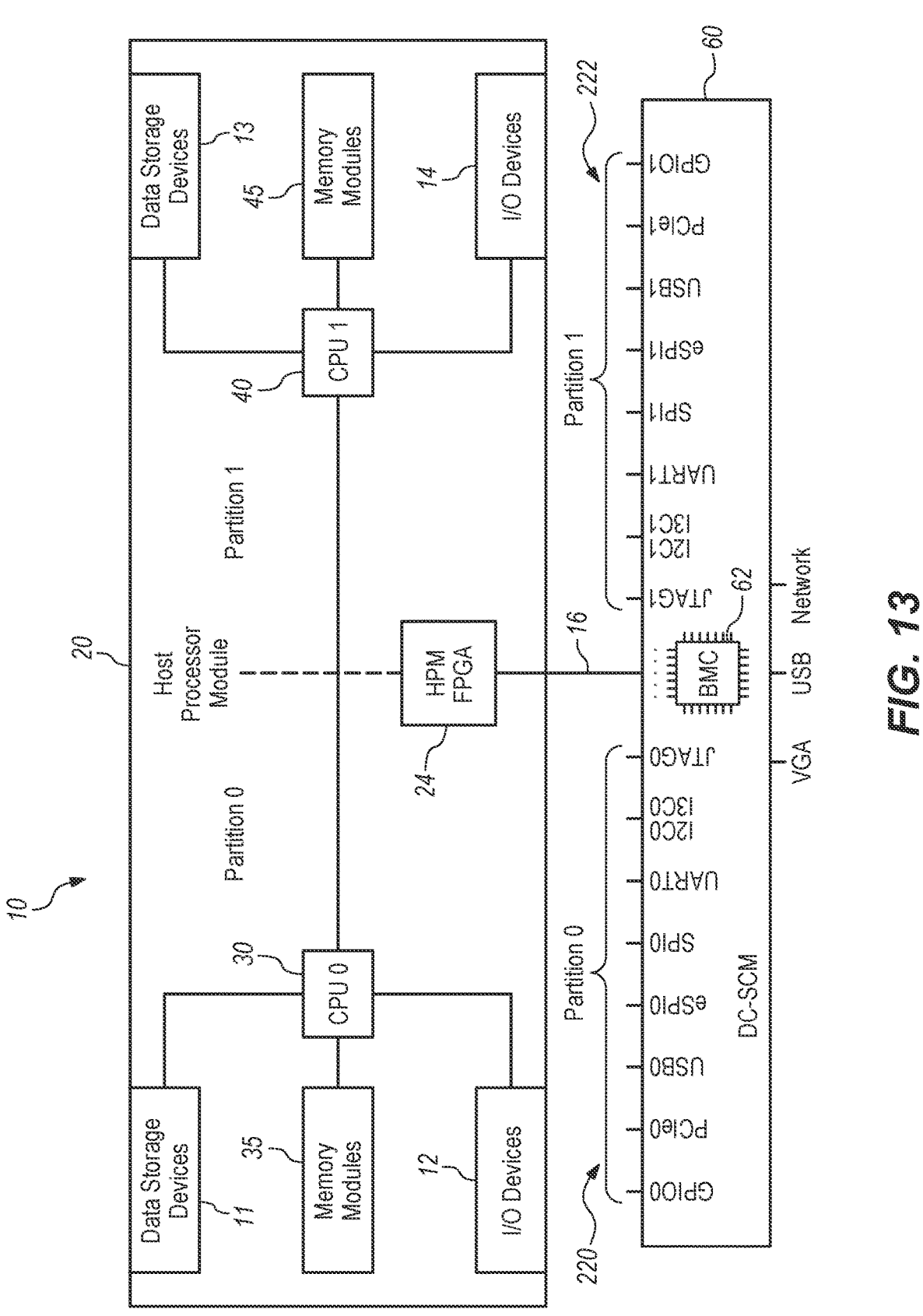
FIG. 13 is a diagram of a system management interface having separate sets of interfaces for each partitioned node.

FIG. 13 is a simplified diagram of the multi-processor system 10 including a host processor module 20 and a control module 60 connected to the host processor module 20. However, the same architecture could be implemented on a single motherboard. As shown in FIG. 1, the system 10 includes a first central processing unit 30, memory modules 35, data storage devices 11, and I/O devices 12 (illustrated on the lefthand side), as well as a second central processing unit 40, memory modules 45, data storage devices 13, and I/O devices 14 (illustrated on the righthand side). Although the resources on the lefthand side may form a first partitioned node (Partition 0) and the resources on the righthand side may form a second partitioned node (Partition 1), the embodiments are not limited to such a configuration as described herein.

In this example, the control module 60 includes a first set of host interface connections 220 and a second set of host interface connections 222. Additional host interface connections may also be included to support functions that are common to both partitioned nodes, such as fans, a front panel and the connection 16 between the control module 60 and the integrated circuit (HPM FPGA) 24. The baseboard management controller 62 may utilize the first set of host interface connections 220 to communicate with hardware devices in the first partitioned node and a second set of interface connections 222 to communicate with hardware devices in the second partitioned node. Accordingly, the first central processing unit 30 in the first partitioned node will view the baseboard management controller 62 through the first set of host interface connections 220 as being dedicated to the first partitioned node. Similarly, the second central processing unit 40 in the second partitioned node will view the baseboard management controller 62 through the second set of host interface connections 222 as being dedicated to the second partitioned node.

The first and second sets of host interface connections 220, 222 are illustrated to include a GPIO (general-purpose input/output), PCIe (peripheral component interconnect express), USB (universal serial bus), eSPI (enhanced serial peripheral interface), SPI (serial peripheral interface), UART (universal asynchronous receiver-transmitter), I2C/I3C (inter-integrated circuit/improved inter-integrated circuit) and JTAG (joint test action group) connections, but these are not limited or required examples. The individual connections with these sets of host interface connections 220, 222 connect with hardware devices, such as those devices shown and other devices that are not shown, on the host processor module 20 that are included in the first and second partitioned nodes, respectively. The baseboard management controller 62 identifies input signals and communications received through the first set of host interface connections 220 as coming from the first partitioned node and directs communications and control signals to the first partitioned node through the first set of host interface connections 220. Similarly, the baseboard management controller 62 identifies input signals and communications received through the second set of host interface connections 222 as coming from the second partitioned node and directs communications and control signals to the second partitioned node through the second set of host interface connections 222. The central processing unit and other components within the respective partitioned nodes interact with the baseboard management controller 62 in a normal manner unaware that the baseboard management controller is managing two partitioned nodes.

Multiple Firmware Levels in a Partitionable Multi-Processor System

Some embodiments provide a computer program product comprising a non-volatile computer readable medium and non-transitory program instructions embodied therein, the program instructions being configured to be executable by a processor of a baseboard management controller in a multi-processor system to cause the processor to perform various operations. The operations may comprise identifying a partitioning mode to be implemented on the multi-processor system having first and second central processing units located on a single motherboard, wherein the partitioning mode may be a partitioned state or a unified state. The operations may further comprise accessing, in response to identifying that the partitioned state is to be implemented, a first partitioned node configuration for a first partitioned node and a second partitioned node configuration for a second partitioned node, wherein the first partitioned node configuration identifies a first firmware interface level and a first operating system to be used by the first partitioned node, and wherein the second partition configuration identifies a second firmware interface level and a second operating system to be used by the second partitioned node. Still further, the operations may comprise causing the first central processing unit to load a first firmware interface having the identified first firmware interface level identified in the first partitioned node configuration and causing the second central processing unit to load a second firmware interface having the second firmware interface level identified in the second partitioned node configuration. Optionally, the first firmware interface level may be different than the second firmware interface level.

In some embodiments, the computer program product may further include the operations of causing the first central processing unit to load the first operating system and causing the second central processing unit to load the second operating system. Optionally, the first operating system may be different than the second operating system. If a partitioned node has multiple operating systems, the BootOrder determines which one of the operating systems will be booted. In effect, each partition may have one default operating system that will be booted unless some action is taken, such as a change in the BootOrder.

Each operating system may necessitate a particular firmware level, such as a unified extensible firmware interface (UEFI) or a basic input output system (BIOS), and/or a different baseboard management controller level for the system to stay within the scope of support, generally known as a best recipe. However, since the multi-processor system has a single baseboard management controller that is shared between all partitions within the multi-processor system, the best recipe would be for a particular firmware interface level (UEFI/BIOS). Still, the operating system in each partition may require specific host side settings for the baseboard management controller in addition to a different firmware level.

Some embodiments assign and boot different firmware levels or versions for each partition. For example, a user configuration for each partition may specify a particular operating system and a compatible firmware level. A user may provide a configuration to be used during operation of the multi-processor system as a single unified node and may provide partition definitions or configurations to be used by each partitioned node independent of the other partitioned nodes when the multi-processor system is being operated in a partitioned state. The configuration for each partitioned node may specify an operating system and a firmware level that meets the specific requirements of the specified operating system. The baseboard management controller may then use these configurations to set separate firmware levels for use by each partitioned node when the multi-processor system is used in a partitioned state.

In some embodiments of the computer program product, the operations may further comprise accessing, in response to identifying that the unified state is to be implemented, a single unified node configuration that identifies a third firmware interface level and a third operating system to be used for operation of the multi-processor system as a single unified node, and causing the first and/or second central processing units to load a third firmware interface having the third firmware interface level identified in the single unified node configuration. The system may include a separate firmware flash storage device for each partition and the firmware level that is needed by the operating system for each partition may be stored in the corresponding firmware flash storage device. Still further, the operations may comprise causing the first and/or second central processing units to load the third operating system.

In some embodiments, the operations of the computer program product may further comprise receiving the first and second partitioned node configurations from a user through a firmware management interface to the baseboard management controller and storing the first and second partitioned node configurations in a data storage device accessible to the baseboard management controller.

In some embodiments, the first partitioned node configuration may include a first firmware interface setting for use by the first firmware interface and the second partitioned node configuration may include a second firmware interface setting for use by the second firmware interface. The operations may further comprise causing the first firmware interface to use the first firmware interface setting and causing the second central processing unit to use the second firmware interface setting.

In some embodiments, the operations may further comprise storing multiple firmware interfaces having different firmware interface levels, wherein the multiple firmware interfaces include the first firmware interface and the second firmware interface. Specifically, the baseboard management controller may have access to a data storage device storing multiple firmware levels. Accordingly, the BMC may identify the user-provided configuration to be used by each partition, then access the appropriate firmware level(s) in the data storage and load those appropriate firmware levels in the firmware flash devices for each partition. The BMC may cause a first firmware level specified by a user-configuration for a first partition to be loaded into a first firmware flash device for use by the first partition and may cause a second firmware level specified by a user-configuration for a second partition to be loaded into a second firmware flash device for use by the second partition. Furthermore, the BMC may keep track of which firmware level is installed for each partition. Still further, the BMC may store and load one or more setting for each partition.

In some embodiments, the first and second firmware interfaces may be selected from a Basic Input Output System (BIOS) and a Unified Extensible Firmware Interface (UEFI). For example, a partitioned node may have a legacy boot mode associated with use of a Basic Input Output System (BIOS) or a UEFI boot mode associated with the use of a Unified Extensible Firmware Interface (UEFI).

In some embodiments, the operation of identifying the partitioning mode to be implemented on the multi-processor system may include receiving user input identifying the partitioning mode to be implemented on the multi-processor system. For example, the baseboard management controller may implement a partitioned state in response to a user instruction. Accordingly, the baseboard management controller may implement the partitioned state by loading, if not already loaded, the firmware flash devices with the firmware images with the previously specified firmware levels and configuration settings for each partition at boot. The baseboard management controller preferably stores the firmware levels and configuration settings for each partition for subsequent reboots. Alternatively, in some embodiments, the operation of identifying the partitioning mode to be implemented on the multi-processor system may include detecting one or more aspect of a hardware configuration of the multi-processor system and automatically identifying the partitioning mode based on a predetermined association with the one or more aspect of the hardware configuration.

In some embodiments, the operation of causing the first central processing unit of the multi-processor system to load the first firmware interface includes loading the first firmware interface on a first flash storage device designated for storage of a firmware interface for the first partitioned node, and the operation of causing the second central processing unit of the multi-processor system to load the second firmware interface includes loading the second firmware interface on a second flash storage device designated for storage of a firmware interface for the second partitioned node.

Some embodiments may select a baseboard management controller firmware level based on compatibility with the first and second firmware levels and the first and second operating systems. The selected baseboard management controller firmware level may be set to be loaded during a subsequent boot of the baseboard management controller and then causing the baseboard management controller to reboot. Although the system may include two BMC flash devices, these devices may continue to store a primary (active) image and a backup (trusted) image for use by the single baseboard management controller. Optionally, the operations may further comprise implementing one or more predetermined host side settings for the baseboard management controller based on the first firmware interface level, the second firmware interface level, the first operating system, and/or the second operating system.

Embodiments may have a single instance of the BMC firmware for the single BMC that manages the multiple partitioned nodes. However, the BMC firmware level may be selected based on compatibility with the operating systems and firmware levels being utilized for the multiple partitions. If there are multiple BMC flash devices, the BMC flash device may store a primary copy and a backup copy of the BMC firmware.

A particular firmware interface image, such as a UEFI or BIOS image, may be assigned to a specific partition by providing an instruction to the BMC. The firmware interface image assignment instruction may be provided to the BMC through a system management interface in the BMC. The system management interface may be accessed using a local console or accessed by entering an Internet Protocol (IP) address for the BMC into a web browser.

In some embodiments, the BMC may also have two flash devices that may have been previously used for storing a primary (active) firmware interface image and a backup (trusted) firmware interface image for use by the multi-processor system. However, embodiments may repurpose these two firmware flash devices to store independent firmware interface images for the respective partitioned nodes.

In some embodiments, the BMC may further store other user-selected configuration settings for each partition. One example of such configuration settings may include a setting to enable secure boot for the partition, which may be limited to partitions in which the operating system is signed by a key already in the secure boot database. Another example of such configuration settings may include a setting to enable VMWare fast boot, which requires UEFI to hide the Trusted Platform Module (TPM) from the operating system. Yet another example of such configuration settings may include a setting to limit physical address and virtual addresses (PA/VA) to 46/48 bits for a WS19 Hyper-V virtualization environment.

In some embodiments, the boot timing for the multiple partitioned nodes may be at the same time or at different times. In other words, the partitioned node in a multi-processor system may be booted at the same time, but there is no requirement to boot every partitioned node at the same time. In fact, a first partitioned node may be booted without any requirement to boot a second partitioned node in the same multi-processor system.

Figure 14:
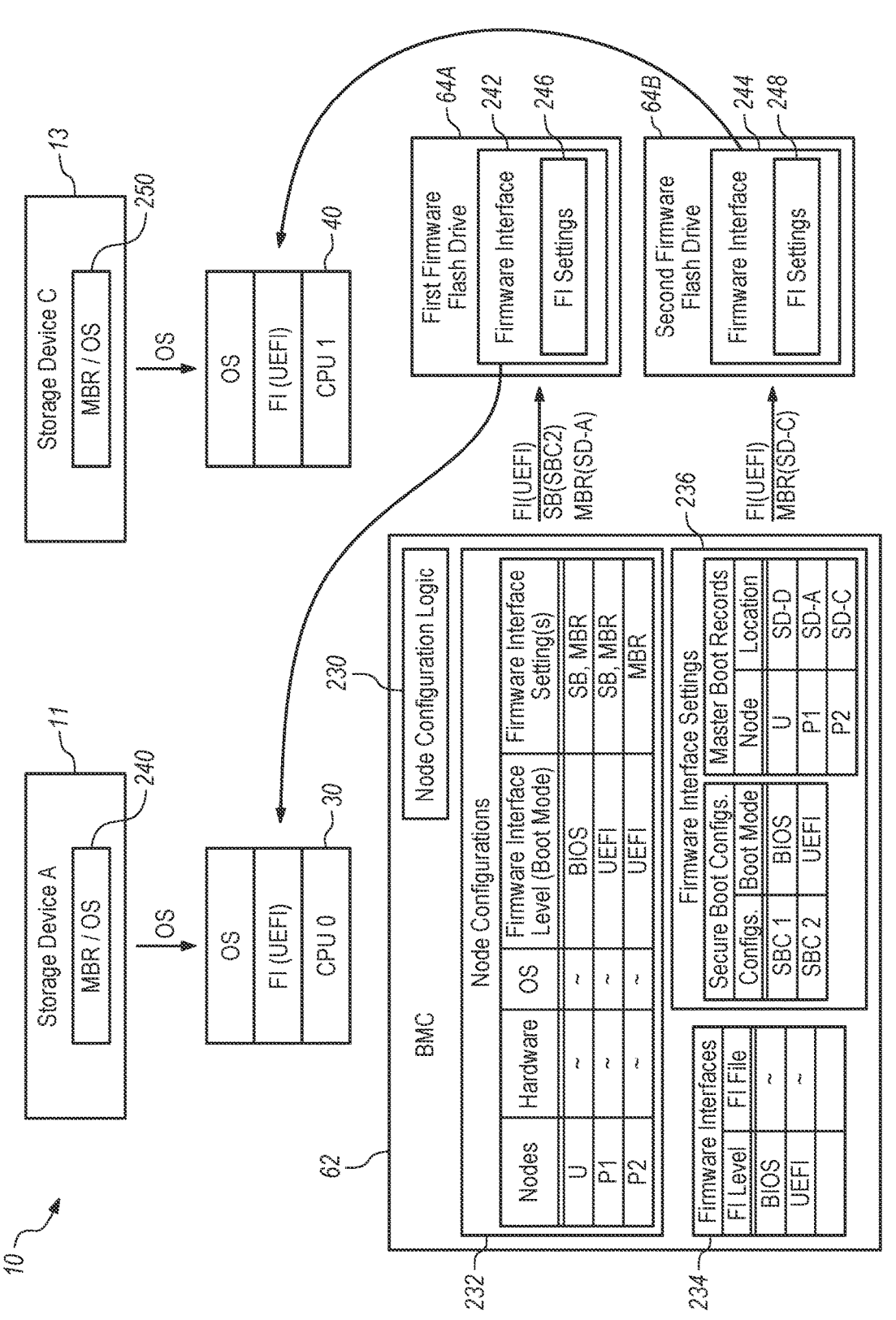
FIG. 14 is a diagram of a multi-processor system highlighting the node configuration logic used by the baseboard management controller to implement a firmware interface and firmware settings for first and second portioned nodes.

FIG. 14 is a diagram of selected components of the multi-processor system 10 highlighting node configuration logic 230 used by the baseboard management controller 62 to implement a firmware interface, firmware interface settings, and an operating system for first and second portioned nodes. In addition to the baseboard management controller 62, FIG. 14 shows first and second firmware flash devices 64A, 64B, first and second central processing units 30, 40, and first and second storage devices 11, 13. The first storage device 11 stores a first master boot record (MBR) and operating system 240 and the second storage device 13 stores a second master boot record (MBR) and operating system 250.

The baseboard management controller 62 stores the node configuration logic 230, node configurations 232, firmware interfaces 234, and firmware interface settings 236. The node configuration logic 230 may include program instructions enabling the baseboard management controller 62 to receiving and store the node configurations 232, firmware interfaces 234, and firmware interface settings 236, as well as to use and implement the same.

In one example, a user may provide the node configurations 232 to the baseboard management controller 62. The node configurations 232 are illustrated, without limitation, at a table having three node configurations represented by three rows of the table. Node configurations are provided for a single unified node (U), a first partitioned node (P1) and a second partitioned node (P2). Each node configuration may include identification of hardware assigned to the node, an operating system to be used with the node, a firmware interface level (boot mode) to be used with the operating system, and any firmware interface settings to be used by the firmware interface having the identified firmware interface level.

The node configuration logic 230 may identify a partitioning mode that is to be implemented on the system 10 and use the corresponding node configurations 232 to implement the partitioning mode. For example, if the baseboard management controller 62 is instructed to implement a partitioned state including the first partitioned node (P1) and the second partitioned node (P2), then the baseboard management controller 62 may access the node configurations 232 to identify that the firmware interface to be used by both the first partitioned node (P1) and the second partitioned node (P2) is a UEFI. Accordingly, the baseboard management controller 62 may access the stored firmware interfaces 234 and cause the UEFI firmware interface 242 to be stored in the first firmware flash device 64A for the first partitioned node (including the first central processing unit 30) and also cause the UEFI firmware interface 244 to be stored in the second firmware flash device 64B for the second partitioned node (including the central processing unit 40).

The node configuration logic 230 may also use the node configurations 232 to identify that the first partitioned node (P1) should use certain firmware interface settings, such as secure boot (SB) and the location of the master boot record (MBR) for the first partitioned node. Similarly, the node configuration logic 230 may also use the node configurations 232 to identify that the second partitioned node (P2) should use certain firmware interface settings, such as the location of the master boot record (MBR) for the second partitioned node. Accordingly, the baseboard management controller 62 may access the firmware interface settings 236, which store a secure boot configuration (SBC) for use with either boot mode (UEFI/BIOS) and store the locations of the master boot record (MBR) for each node. Specifically, the node configuration logic 230 may cause the baseboard management controller 62 to store the second secure boot configuration (SBC2) associated with a UEFI and the master boot record location (SD-A) associated with the first partitioned node (P1) to the firmware interface settings 246 in the first firmware flash device 64A for the first partitioned node. In addition, the node configuration logic 230 may cause the baseboard management controller 62 to store the second secure boot configuration (SBC2) associated with a UEFI and the master boot record location (SD-C) associated with the second partitioned node (P1) to the firmware interface settings 248 in the second firmware flash device 64B for the second partitioned node.

During boot, the first central processing unit 30 will load the firmware interface 242 and use the firmware interface settings 246 that are both stored in the first firmware flash device 64A. Similarly, during boot, the second central processing unit 40 will load the firmware interface 244 and use the firmware interface settings 248 that are both stored in the second firmware flash device 64B. However, the first and second central processing units are independently controlled in the partitioned state, so they may boot at different times, if at all.

Once the first central processing unit 30 has loaded the firmware interface 242, the firmware interface settings 246 implement the secure boot configuration (SBC2) and point the first central processing unit 30 to the location of the master boot record in the storage device A (SD-A). Accordingly, the first central processing unit 30 may then access the storage device A 11 to use/load the master boot record and operating system 240. Similarly, once the second central processing unit 40 has loaded the firmware interface 244, the firmware interface settings 248 implement the secure boot configuration (SBC2) and point the second central processing unit 40 to the location of the master boot record in the storage device C (SD-C). Accordingly, the second central processing unit 40 may then access the storage device A 13 to use/load the master boot record and operating system 250. Future changes to the node configurations 232, the firmware interfaces 234, and/or the firmware interface settings 236 may be automatically reflect in the first and/or second partitioned nodes during boot.

It should also be recognized that a change in the partitioning mode, for example from the previously described partitioned state to the unified state, may be automatically implemented during a subsequent boot of the system 10. For example, the baseboard management controller 62 may use the node configuration logic 230 to receive an instruction to operate in the unified state, then access the node configurations 232 to identify the hardware, operating system, firmware interface level, and firmware interface settings for the single unified node (first row of the node configuration table). The identified firmware interface and firmware interface settings may then loaded/stored in a designated firmware flash device, such as a selected one of the first or second firmware flash device 64A, 64B or an additional (third) similar firmware flash device. During boot of the system 10 in the unified state, one or both of the central processing units will load the firmware interface and firmware interface settings from the designated firmware flash device, and subsequently use and load a master boot record and operating system stored in a storage device D (SD-D; not shown).

Secure Boot Stage Switching Between System Partitions

In some embodiments, the operations may comprise storing multiple secure boot configurations, identifying a first boot mode associated with the first partitioned node, and selecting a first one of the multiple secure boot configurations that is compatible with the first boot mode, wherein the first boot mode is selected from a Basic Input Output System and a Unified Extensible Firmware Interface. The operations may further comprise providing, in response to identifying that the partitioned state is to be implemented, the first secure boot configuration to the first firmware interface for the first partitioned node. In addition, the operations may further comprise causing a secure boot of the first partitioned node with the first firmware interface using the first secure boot configuration.

Some embodiments further comprise identifying a second boot mode associated with the second partitioned node, wherein the second boot mode is selected from a Basic Input Output System and a Unified Extensible Firmware Interface; selecting a second one of the multiple secure boot configurations that is compatible with the second boot mode; providing, in response to identifying that the partitioned state is to be implemented, the second secure boot configuration to the second firmware interface for the second partitioned node; and causing a secure boot of the second partitioned node with the second firmware interface using the second secure boot configuration.

Similarly, some embodiments may further comprise identifying a third boot mode associated with the single unified node, wherein the third boot mode is selected from a Basic Input Output System and a Unified Extensible Firmware Interface; selecting a third one of the multiple secure boot configurations that is compatible with the third boot mode; providing, in response to identifying that the unified state is to be implemented, the third secure boot configuration to the firmware interface for the single unified node; and causing a secure boot of the single unified node with the third firmware interface using the third secure boot configuration.

In some embodiments, identifying the partitioning mode to be implemented on the multi-processor system may include receiving user input identifying the partitioning mode to be implemented on the multi-processor system. In other embodiments, identifying the partitioning mode to be implemented on the multi-processor system may include detecting one or more aspect of a hardware configuration of the multi-processor system and automatically identifying the partitioning mode based on a predetermined association with the one or more aspect of the hardware configuration.

In one option, a user may copy the firmware interface settings from one partition definition to another. The ability to copy the firmware interface settings, such as UEFI settings, from one partition to another may be helpful if both partitions have the same boot mode or to get similar initial settings that may then be customized for each partition.

Since the BMC stores the firmware interface settings and receives any user changes to a partition configuration, the BMC may automatically apply the corresponding firmware interface settings to the firmware interface for each partition.

In one example, Partition A (a single unified node), containing node 0 and node 1, uses settings stored for the Partition A. If the system is being split into Partition B containing node 0 and Partition C containing node 1, the BMC may automatically implement the firmware interface settings for Partitions B and C, respectively, then reboot the system. If Partitions B and C are merged/unified back together for operation as a single unified node, the BMC may automatically implement the firmware interface settings for Partition A and then reboot the system.

A user may prepare the firmware interface settings for any or all node definitions (i.e., single unified node definition, first partitioned node definition, and second partitioned node definition) in advance of any implementation of those node definitions. For example, a user may access the baseboard management controller using an out-of-band interface that does not require the host operating system to be functional, such as a web interface, Redfish, Intelligent Platform Management Interface (IPMI), and the like. The user may then provide the firmware interface settings for each node definition for storage and use by the BMC. Without limitation, the firmware interface settings for each node may indicate wherein to implement secure boot, the location of a Master Boot Record (MBR) and the operating system (OS) that is to be used by the particular node.

Generating Partition-Dependent Log Output

Some embodiments provide a computer program product comprising a non-volatile computer readable medium and non-transitory program instructions embodied therein, the program instructions being configured to be executable by a processor of a baseboard management controller in a partitionable multi-processor system to cause the processor to perform various operations. The operations may comprise receiving a plurality of event notifications from the partitionable multi-processor system including one or more event notifications from a first partitioned node including a first subset of hardware devices of the multi-processor system and one or more event notifications from a second partitioned node including a second subset of the hardware devices of the multi-processor system, wherein each event notification identifies an event and a specific one of the hardware devices that experienced the event. The operations may further comprise storing the plurality of the event notifications in a unified event log, receiving a request to generate an event log for the first partitioned node of the multi-processor system, determining, for each event notification stored in the unified event log, whether the specific hardware device identified in the event notification is included in the first partitioned node, and generating the requested event log for the first partitioned node including only those of the plurality of event notifications that are determined to identify a specific hardware device that is included in the first partitioned node.

In some embodiments, the system collects log data for the entire multi-processor system, but then may create a separate log for a specific partitioned node in response to a user request. So, when a user requests a log for a given partitioned node, the components assigned to that partitioned node are identified, such as using node configuration data or partition assignment table. The log for the given partitioned node may then be prepared by filtering the system log data for only those log entries that are associated with the components identified as being assigned to the partitioned node.

In some embodiments, the events notifications may identify events that are system events, application events, setup events and/or security events. In one option, the event notifications may include predictive failure alerts for data storage devices. In another option, the event notifications may include correctable and uncorrectable system and memory errors. In a further option, one or more of the event notifications may include a severity level.

In some embodiments, the events notifications may identify events such as a power regulator or voltage regulator module (VRM) fault. Whether the event of a VRM fault is to be includes in an event log for the first partitioned node, an event log for the second partitioned node, or event logs for both the first and second partitioned nodes may depend upon whether the power regulator or voltage regulator module is dedicated to one of the first and second partitioned nodes or is shared between the first and second partitioned nodes. In former case of a power regulator dedicated to, for example, the first partitioned node, then the fault (event) would be included in the event log only for the first partitioned node. However, in the latter case of a power regulator that is shared by both the first and second partitioned nodes, the fault (event) would be included in event logs for each of the first and second partitioned nodes.

In some embodiments, the operation of determining, for each event notification stored in the unified event log, whether the specific hardware device identified in the event notification is included in the first partitioned node may include accessing node configuration data that identifies each of the components of the multi-processor system and, for each of the components, whether the component is assigned to the first partitioned node or the second partitioned node.

Some embodiments provide a computer program product comprising a non-volatile computer readable medium and non-transitory program instructions embodied therein, the program instructions being configured to be executable by a processor of a baseboard management controller in a partitionable multi-processor system to cause the processor to perform various operations. The operations may comprise receiving a plurality of event notifications from the partitionable multi-processor system including one or more event notifications from a first partitioned node including a first subset of hardware devices of the multi-processor system and one or more event notifications from a second partitioned node including a second subset of the hardware devices of the multi-processor system, wherein each event notification identifies an event and a specific one of the hardware devices that experienced the event. The operations may further comprise determining, for each of the plurality of event notifications, whether the specific hardware device identified in the event notification is included in the first partitioned node or the second partitioned node; storing, in a first partition event log, each of the event notifications in which the specific hardware device is included in the first partitioned node; and storing, in a second partition event log, those of the plurality of event notifications that are determined to identify a specific hardware device that is included in the second partitioned node. Accordingly, the system may receive events as they occur, identify the components from which the events are received, identify the partition in which the identified component is assigned, then assign the event to a log associated with the identified partition. For example, any event coming from a first subset of components assigned to a first partition, such as PCIe devices, disk drives, memory, and a central processing unit, are assigned to a first event log specific to the first partition. Similarly, any event coming from a second subset of components assigned to a second partition, such as PCIe devices, disk drives, memory, and a central processing unit, are assigned to a second event log specific to the second partition. A user may then access either event log upon request.

In a partitionable multi-processor system having a single shared baseboard management controller (BMC), each partition may operate independent of the other partition(s) and each partition may experience events independent of the other partition(s). For example, either partition may experience an event, such as an error, warning or other notification, that is reported to, or detected by, the baseboard management controller. Non-limiting examples of hardware events may include predictive failure alerts for drives, and both correctable and uncorrectable system and memory errors. Unfortunately, the event log output in the baseboard management controller can become very large and the event log data can be difficult to transfer to a support group for analysis.

In some embodiments, the baseboard management controller may generate a service log and/or event log for each individual partition of the multi-processor system, where the logs for each individual partition include entries that are unique to the devices assigned to the partition. One type of event log is known as First Failure Data Capture (FFDC) which includes information about events and conditions that led to a failure. Optionally, the request to generate an event log for the first partitioned node may include a request for a First Failure Data Capture log.

FIG. 15 is a flowchart of operations 260 for generating an event log for a particular partitioned node according to a first embodiment. Step 261 includes receiving a plurality of event notifications from the partitionable multi-processor system including one or more event notifications from a first partitioned node including a first subset of hardware devices of the multi-processor system and one or more event notifications from a second partitioned node including a second subset of the hardware devices of the multi-processor system, wherein each event notification identifies an event and a specific one of the hardware devices that experienced the event. Step 262 includes storing the plurality of the event notifications in a unified event log. Step 263 includes receiving a request to generate an event log for the first partitioned node of the multi-processor system. Step 264 include determining, for each event notification stored in the unified event log, whether the specific hardware device identified in the event notification is included in the first partitioned node. Step 265 includes generating the requested event log for the first partitioned node including only those of the plurality of event notifications that are determined to identify a specific hardware device that is included in the first partitioned node.

FIG. 16 is a flowchart of operations 270 for generating an event log for a particular partitioned node according to a first embodiment. Step 271 includes receiving a plurality of event notifications from the partitionable multi-processor system including one or more event notifications from a first partitioned node including a first subset of hardware devices of the multi-processor system and one or more event notifications from a second partitioned node including a second subset of the hardware devices of the multi-processor system, wherein each event notification identifies an event and a specific one of the hardware devices that experienced the event. Step 272 includes determining, for each of the plurality of event notifications, whether the specific hardware device identified in the event notification is included in the first partitioned node or the second partitioned node. Step 273 includes storing, in a first partition event log, each of the event notifications in which the specific hardware device is included in the first partitioned node. Step 274 includes storing, in a second partition event log, those of the plurality of event notifications that are determined to identify a specific hardware device that is included in the second partitioned node.

Handling of Predictive Fault Alerts in a Partitionable Multi-Processor System A partitionable multi-processor system may be operated in a partitioned state with a first partitioned node including a first subset of hardware devices of the multi-processor system and a second partitioned node including a second subset of hardware devices of the multi-processor system. The first and second partitioned nodes are hosted by the same motherboard but operate as independent and isolated nodes. However, a predictive fault alert (PFA) that occurs while the multi-processor system is operating in a partitioned state should be handled within a single partitioned node without impacting the operation of any other partitioned node.

In some embodiments, a predictive fault alert may be handled in a partitionable multi-processor system where the predictive fault alert is filtered and reported per the selected configuration. The system control unit (SCU), also referred to herein as the integrated circuit on the host processor module or motherboard (for example, a FPGA (Field-Programmable Gate Array), CPLD (Complex Programmable Logic Device), PSoC (Programmable System-on-Chip), etc.), may receive the predictive fault alert from a hardware device in either the first partitioned node, the second partitioned node or the single unified node and forward the predictive fault alert to be handled by a reporting entity within the associated node. For example, if a PFA is received from a hardware device within a first partitioned node, then the SCU forwards the predictive fault alert to the central processing unit or other reporting entity of the first partitioned node so that a proper responsive action may be taken within the first partitioned node. The other partitioned node (s) may be maintained in its current state without any notice of the PFA (i.e., the PFA in a first partition is fenced off from the second partition). If the multi-processor system is being operated as a single unified node, then the PFA from any/all of the components in the system may be forwarded to a reporting entity of the system as a whole. Optionally, the reporting entities may include, without limitation, central processing units, memory, disk drives, input/output devices, network and drive controllers, and power supplies.

In some embodiments, the integrated circuit, which may be referred to as a system control unit (SCU), may be involved in assigning some components of the multi-processor system to one partitioned node or another partitioned node, and the firmware interface may be involved in assigning other components of the same multi-processor system to one partitioned node or another. However, for each component of the multi-processor system, the SCU needs to be aware of the partitioned node to which the component has been assigned, even if the SCU was not involved in partitioning of that component into the partitioned node (such as a PCIe port that the firmware interface disabled). Specifically, the SCU needs to be aware of the components in each partitioned node in order to forward a given PFA to the appropriate reporting entity within the corresponding partitioned node.

In some embodiments, devices within the system that are selectable per partition (i.e., device that are capable of being assigned to either partition) may be assigned a partition identifier (ID) in configuration data that is stored by the SCU. The partition ID indicates whether the component is assigned to operate within a particular partitioned node. A baseboard management controller for the multi-processor system may make the original assignment of each component (hardware device) to a given partitioned node, but the SCU may be involved in implementing that assignment and the SCU may also store a table or list of devices associated with a partition ID for a particular partition. Furthermore, the baseboard management controller may determine whether to operate the multi-processor system as a single unified node or as multiple partitioned nodes. The baseboard management controller may then notify the SCU of the partitioning mode (i.e., partitioned state or unified state) selection.

Any predictive fault alert that is generated within the multi-processor system is intercepted by the SCU. The SCU must then determine what reporting entity should receive and handle the PFA. If the multi-processor system is being operated in a partitioned state when the SCU receives a PFA, then the SCU will identify the hardware device that is the source of the PFA or identified in the PFA. The identity of the hardware device is then used to identify the partitioned node (partition ID) that includes the identified hardware device. The appropriate reporting entity may be determined by reading stored information identifying a reporting entity for each partitioned node (partition ID) and the single unified node. Accordingly, the SCU will forward the PFA to the identified reporting entity. For example, the SCU may store a first table that associates each hardware device of the multi-processor system with a partition ID and may store a second table that associates each partition ID with a reporting entity. The PFA is preferably not forwarded to the reporting entity of any other partitioned node. Furthermore, any actions that the reporting entity should take responsive to the PFA are preferably asserted only within that partitioned node (and not reported to the other partitioned node). If the multi-processor system is being operated as a single unified node when the SCU receives a PFA, then the SCU will identify the appropriate reporting entity within the system and forward the PFA to the identified reporting entity for the system.

Some embodiments provide an integrated circuit to control operations in a partitionable multi-processor system. The operations of the integrated circuit may comprise receiving a predictive fault alert identifying a hardware device of the multi-processor system, determining whether the multi-processor system is operating in a unified state as a single unified node or in a partitioned state including a first partitioned node and a second partitioned node, and determining, in response to determining that the multi-processor system is operating in the partitioned state, whether the identified hardware device is included in the first partitioned node or the second partitioned node. The operations may further comprise forwarding, in response to the multi-processor system operating in the partitioned state and the identified hardware device being included in the first partitioned node, the predictive fault alert to a first designated reporting entity included in the first partitioned node; and forwarding, in response to the multi-processor system operating in the partitioned state and the identified hardware device being included in the second partitioned node, the predictive fault alert to a second designated reporting entity included in the second partitioned node.

In some embodiments, the first designated reporting entity may be a first central processing unit included in the first partitioned node and the second designated reporting entity may be a second central processing unit included in the second partitioned node.

In some embodiments, the integrated circuit is located on a motherboard, or host processor module, that also supports the first designated reporting entity and the second designated reporting entity. Without limitation, the integrated circuit may be a field-programmable gate array, a complex programmable logic device, programmable system-on-chip, or application specific integrated circuit.

In some embodiments, the operations of the integrated circuit may further comprise forwarding, in response to the multi-processor system operating in the unified state as a single unified node, the predictive fault alert to a third designated reporting entity included in the single unified node. For example, the third designated reporting entity may be the first central processing unit or the second central processing unit.

In some embodiments, the operations of the integrated circuit may further comprise storing a first partition definition designating the hardware devices included in the first partitioned node and a second partition definition designating the hardware devices included in the second partitioned node, wherein determining whether the identified hardware device is included in the first partitioned node or the second partitioned node includes reading the stored first and/or second partition definitions.

In some embodiments, the operations of the integrated circuit may further comprise storing a partitioning mode for the multi-processor system, wherein the partitioning mode is the unified state or the partitioned state, wherein determining whether the multi-processor system is operating in a unified state as a single unified node or in a partitioned state including a first partitioned node and a second partitioned node includes reading the stored partitioning mode.

Some embodiments provide a method for handling predictive fault alerts in a partitionable multi-processor system. The method includes an integrated circuit located within the multi-processor system receiving a predictive fault alert identifying a hardware device of the multi-processor system; determining whether the multi-processor system is operating in a unified state as a single unified node or in a partitioned state including a first partitioned node and a second partitioned node; determining, in response to determining that the multi-processor system is operating in the partitioned state, whether the identified hardware device is included in the first partitioned node or the second partitioned node; forwarding, in response to the multi-processor system operating in the partitioned state and the identified hardware device being included in the first partitioned node, the predictive fault alert to a first designated reporting entity included in the first partitioned node; and forwarding, in response to the multi-processor system operating in the partitioned state and the identified hardware device being included in the second partitioned node, the predictive fault alert to a second designated reporting entity included in the second partitioned node. Optionally, the method may further comprise any one or more of the operations of the foregoing integrated circuit.

Figure 17:
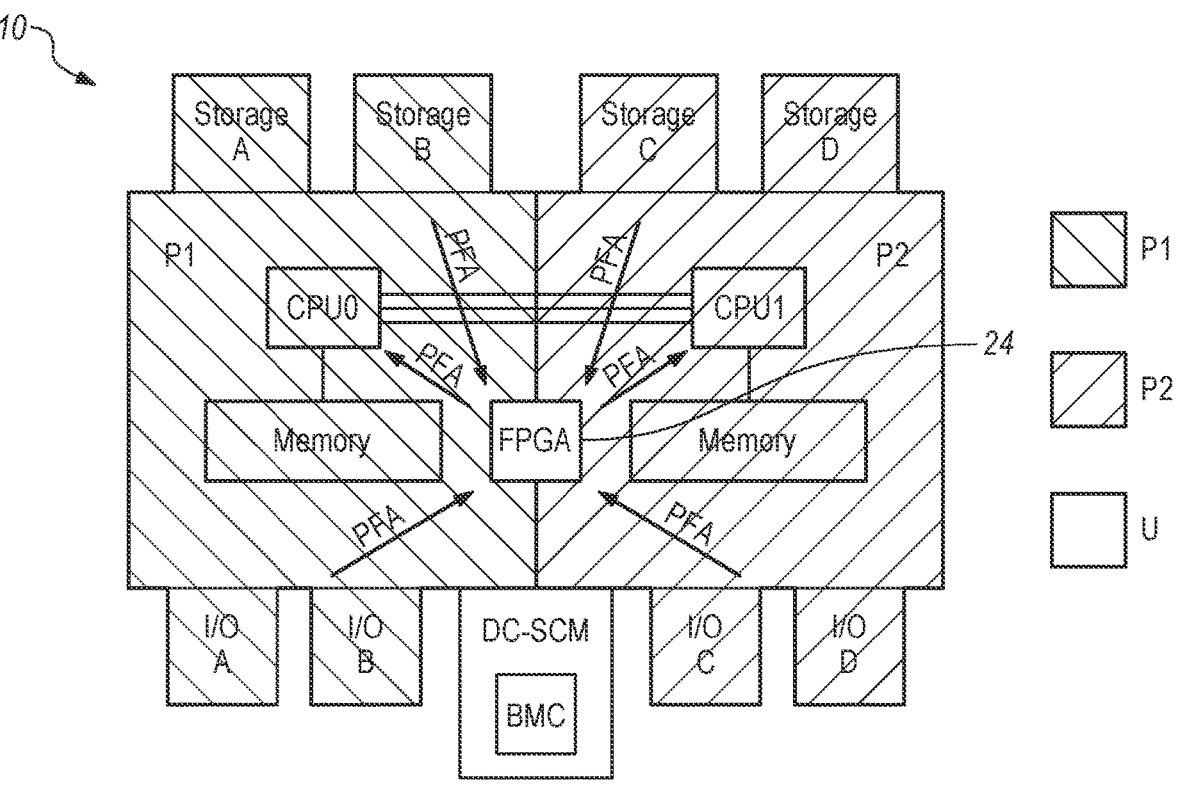
FIG. 17 is a diagram of a partitionable multi-processor system illustrating how an integrated circuit may receive and forward predictive fault alerts for each partitioned node.

FIG. 17 is a diagram of a partitionable multi-processor system 10 illustrating how an integrated circuit 24 may receive and forward predictive fault alerts (PFAs) for each partitioned node (P1 and P2). In the partitioned state as illustrated, the multi-processor system 10 operates a first partitioned node (P1; shown on the lefthand side) and a second partitioned node (P2; shown on the righthand side). While other node configurations are possible without limitation, the illustrated first partitioned node (P1) includes a first central processing unit (CPU0), memory, a first data storage device (Storage A), a second data storage device (Storage B), a first input/output device (I/O A) and a second input/output device (I/O B). Similarly, the illustrated second partitioned node (P2) includes a second central processing unit (CPU1), memory, a first data storage device (Storage C), a second data storage device (Storage D), a first input/output device (I/O C) and a second input/output device (I/O D). Predictive fault alerts (PFAs) originating from any hardware device in the multi-processor system 10 are sent to the integrated circuit ("FPGA") 24. Each PFA will identify the hardware device that sent the PFA. The integrated circuit may then use stored node configuration data to determine, for each PFA, whether the PFA originated from a hardware device in the first partitioned node (P1) or originated from a hardware device in the second partitioned node (P2). PFAs that are determined to originate from a hardware device in the first partitioned node (P1) are forwarded to a designated reporting entity, such as the first central processing unit (CPU0), for the first partitioned node. Conversely, PFAs that are determined to originate from a hardware device in the second partitioned node (P2) are forwarded to a designated reporting entity, such as the second central processing unit (CPU1), for the second partitioned node.

FIG. 18 is a flowchart of a method 280 for handling predictive fault alerts in a partitionable multi-processor system. Step 281 includes an integrated circuit located within the multi-processor system receiving a predictive fault alert identifying a hardware device of the multi-processor system. Step 282 includes determining whether the multi-processor system is operating in a unified state as a single unified node or in a partitioned state including a first partitioned node and a second partitioned node. Step 283 includes determining, in response to determining that the multi-processor system is operating in the partitioned state, whether the identified hardware device is included in the first partitioned node or the second partitioned node. Step 284 includes forwarding, in response to the multi-processor system operating in the partitioned state and the identified hardware device being included in the first partitioned node, the predictive fault alert to a first designated reporting entity included in the first partitioned node. Step 285 includes forwarding, in response to the multi-processor system operating in the partitioned state and the identified hardware device being included in the second partitioned node, the predictive fault alert to a second designated reporting entity included in the second partitioned Protecting Persistent Aspects of a Partition Some embodiments provide a computer program product comprising a non-volatile computer readable medium and non-transitory program instructions embodied therein, the program instructions being configured to be executable by a processor of a baseboard management controller in a multi-processor system to cause the processor to perform various operations. The operations may comprise causing, during a first time period, the multi-processor system to operate in a partitioned state with a first partitioned node including a first subset of components of the multi-processor system and a second partitioned node including a second subset of components of the multi-processor system, wherein the first and second partitioned nodes are independently operable nodes having their own operating systems, and wherein the first partitioned node boots from a first boot drive that is included in the first subset of components. The operations may further comprise causing, during a second time period, the multi-processor system to operate in a unified state with a single unified node including components from both the first and second subsets of components of the multi-processor system, wherein the single unified node has its own operating system. Still further, the operations may comprise causing the first boot drive to be inaccessible to the second partitioned node and the single unified node.

In some embodiments, the second partitioned node may boot from a second boot drive that is included in the second subset of components, and the operations may further comprise causing the second boot drive to be inaccessible to the first partitioned node and the single unified node.

In some embodiments, the single unified node may boot from a third boot drive in the multi-processor system, and the operations may further comprise causing the third boot drive to be inaccessible to the first partitioned node and the second partitioned node.

In some embodiments, the operations may further comprise storing a plurality of node definitions including a first node definition identifying the first subset of components included in the first partitioned node, a second node definition identifying the second subset of components included in the second partitioned node, and a third node definition identifying the components included in the single unified node. The operations may further comprise providing the plurality of node definitions to an integrated circuit within the multi-processor system and instructing the integrated circuit to configure the multi-processor system in either the partitioned state using the first and second node definitions or the unified state using the third node definition.

In one embodiment, the operation of causing the first boot drive to be inaccessible to the second partitioned node and the single unified node may include preventing and/or removing the first boot drive from being included in either the second node definition or the third node definition. Optionally, the baseboard management controller may store, in the plurality of node definitions, an entry associated with the first boot drive, wherein the entry indicates that the first boot drive is to be inaccessible to any node other than the first partition.

In another embodiment, the second partitioned node may boot from a second boot drive that is included in the second subset of components and the single unified node may boot from a third boot drive in the multi-processor system. Accordingly, the operations may further comprise causing the second boot drive to be inaccessible to the first partitioned node and the single unified node by preventing and/or removing the second boot drive from being included in either the first node definition or the third node definition, and causing the third boot drive to be inaccessible to the first partitioned node and the second partitioned node by preventing and/or removing the third boot drive from being included in either the first node definition or the second node definition.

In some embodiments, the plurality of node definitions may be user-configurable through a management interface to the baseboard management controller. Optionally, the baseboard management controller may receive user input establishing or modifying one or more of the node definitions. In a further option, the baseboard management controller may receive user input designating one or more components in the first subset that are to be inaccessible to the second partitioned node and the single unified node. Still further, the baseboard management controller may perform an inventory of components installed in the multi-processor system and populate a node definition table with the inventory of components.

In some embodiments, the operations may further comprise identifying the first boot drive by reading firmware interface settings for the first partition. In one example, the first boot drive may be a non-volatile data storage device storing the first operating system.

In some embodiments, the first partitioned node may include a distributed processing unit, and the operations may further comprise causing the distributed processing unit to be inaccessible to the second partitioned node and the single unified node. In one example, the distributed processing unit may be a smart network interface controller that stores and runs its own operating system.

Some embodiments provide a method performed by a baseboard management controller in a multi-processor system, comprising: causing, during a first time period, the multi-processor system to operate in a partitioned state with a first partitioned node including a first subset of components of the multi-processor system and a second partitioned node including a second subset of components of the multi-processor system, wherein the first and second partitioned nodes are independently operable nodes having their own operating systems, and wherein the first partitioned node boots from a first boot drive that is included in the first subset of components; causing, during a second time period, the multi-processor system to operate in a unified state with a single unified node including components from both the first and second subsets of components of the multi-processor system, wherein the single unified node has its own operating system; and causing the first boot drive to be inaccessible to the second partitioned node and the single unified node. Optionally, the method may further include any of the operations of the foregoing computer program product.

In a partitionable multi-processor system, each of the multiple partitions may install their own operating system (OS). With the multi-processor system having a given set of components, switching between a unified configuration, such as a single node having two processor sockets ("1× 2S"), and a partitioned configuration, such as two independent partitions that each have one processor socket ("2× 1S"), may damage data stored on certain data storage devices. For example, changing the multi-processor system from a single unified node configuration to a partitioned node configuration, or vice versa, could allow the systems run by the latter configuration to write data over some or all of an operating system boot drive and/or data drive used by the former configuration.

Embodiments may protect one or more "core components" of a partition. A core component may be a persistent (non-volatile) data storage device that has been assigned to a partition, such as storage drives (SAS/SATA/NVMe) and persistent memory that store critical data for the assigned partition. Non-limiting examples of critical data for a partition include applications such as the operating system. A core component may also be a distributed processing unit (DPU), such as a smartNIC which can store and run its own operating system. Any of the one core devices or components of a partition may have been, at some time, assigned to multiple partition definitions. In one example, a user may identify devices or components of the multi-processor system which may participate in multiple partition definitions. In another example, one or more devices or components which may participate in multiple partition definitions may be inferentially identified to include the persistent devices being assigned to each partitioned node.

In some embodiments, the baseboard management controller may cause the multi-processor system to switch between partitioning modes without impacting the core components of a partition definition. Specifically, one or more of the core components of a first partition may be protected against being included or used in a second partition. In other words, the user may designate one or more core component that is reserved or dedicated to a particular partitioned node or the single unified node. With the core component dedicated to a particular partitioned node or the single unified node, the core component does not become a component of any other node. In the example of an operating system stored on a non-volatile data storage device, dedicating the non-volatile data storage device for exclusive use of a particular partitioned node or the single unified node means that no other node has the opportunity to overwrite any of the operating system or critical data.

In some embodiments, the baseboard management controller may store data, such as node configuration data, identifying various components of the multi-processor system, including the component type (i.e., persistent or not persistent) and the partition, if any, to which the component is assigned. For example, the components may include central processing units, memory, PCIe devices, disk drives, and the like. The identification of the components may be provided by a user through a management interface to the baseboard management controller, or the identification of the components may be obtained by the baseboard management controller performing an inventory of components installed in the multi-processor system. Furthermore, a user may assign components to a particular partition via a management interface. Data identifying the components assigned to each partition may be referred to as a partition definition.

In some embodiments, the baseboard management controller may determine whether one or more component has in fact been used by one of the partitioned nodes in a particular manner. For example, where the component is a non-volatile memory express (NVMe) drive assigned to a first partition, the baseboard management controller may determine whether an operating system or settings have been stored on the NVMe drive. If no operating system or settings are stored on the NVMe drive within the first partitioned node, then the NVMe drive may be made available for use by another partition definition, such as the unified system. However, if the operating system or settings for the first partition have been stored on the NVMe drive, then the NVMe drive may be protected (i.e., locked, dedicated or reserved) for the exclusive use of the first partition. The baseboard management controller may make the same determinations for the second partitioned node and/or the single unified node. In a partitionable multi-processor system that may operate in a unified state or in a partitioned state with first and second partitioned nodes, it possible to have a first dedicated drive for a first operating system and settings for a first partitioned node, a second dedicated drive for a second operating system and settings for a second partitioned node, and a third dedicated drive for a third operating system and settings for the single unified node.

Specific devices that are assigned to a partition definition and protected for exclusive use by the assigned partition definition may or may not be in use depending upon, or in response to a change in, a currently selected partitioning mode (i.e., unified state or partitioned state) for the multi-processor system. For example, a data storage device that is being protected for the exclusive use by a specific partition definition may be unlocked (accessible to the particular partition) for use when the current partitioning mode of the system causes the specific partition definition to be active and may be locked (inaccessible) when the current partitioning mode of the system causes the specific partition definition to be inactive.

In some embodiments, a user may identify the components of the multi-processor system that should be protected for the exclusive use by a specific partition definition. For example, the user may identify a first data storage device that should store the operating system and settings to be used by a first partition and a second data storage device that should store the operating system and settings for use by a second partition. Accordingly, the user may further indicate that the first data storage device should be protected for the exclusive use by the first partition definition and may indicate that the second data storage device should be protected for the exclusive use only by the second partition definition. Alternatively, the baseboard management controller may automatically identify a data storage device to be protected for exclusive use by a given partition definition in response to the UEFI or BIOS settings for that partition definition identifying the data storage device as the location storing the Master Boot Record, operating system and/or settings for the given partition definition.

In one example, the protected device may be a data storage device that is dedicated to a particular partition definition, so that the operating system and/or settings stored in the protected data storage device are available when the particular partition definition is booted to implement a partitioning mode that causes the particular partition definition to be active. Accordingly, while many of the devices in the same partition as the protected device may also be assigned to (and used in) another partition definition (such as the unified system) when the partitioning mode is changed, the protected device may be prevented from being used by any other partition definition (including the unified system). Non-limiting examples of components that may be protected for the exclusive use of a particular partition definition (i.e., prevented from being part of another partition definition) include persistent memory and a distributed processing unit (DPU).

The term "partition definition" or "node definition" refers to data identifying components that are assigned to a particular partitioned node or assigned to the single unified node. The partition definition will change when a component is added or removed from the partition. Accordingly, when a device becomes protected for the exclusive use of a particular partition definition, that device is effectively removed from all other partition definitions.

The baseboard management controller may maintain an inventory of components within the multi-processor system and a record for each component may identify whether or not the device is to be protected for the exclusive use of a particular partition definition. For a device that has been identified as protected, the BMC may subsequently identify the device to be unprotected if the purpose for protecting the device is no longer relevant, such as if the operating system for the particular partition definition is no longer stored on the device.

In some embodiments, a first partitioned node may have a first storage device/area storing a first operating system, a second partitioned node may have a second storage device/area storing a second operating system, and the single unified node (the unpartitioned system) may have a third storage device/area storing a third operating system for use by the single unified node. Accordingly, the first storage device/area may be protected for the exclusive use of the first partition, the second storage device/area may be protected for the exclusive use of the second partition, and the third storage device/area may be protected for the exclusive use of the non-partitioned (unified) system.

Specifically, the unified system and any intended partition definition may each store certain persistent data on a specific data storage device/area that is protected so that the persistent data is maintained for the exclusive use of the corresponding system or partition when that corresponding system or partition is active. For example, a multi-processor system having a number "n" central processing units may maintain a persistent storage device/area for each of the potential "n" partitions as well as for the unified system and any sub-combinations of central processing units that may form a multi-processor partition definition.

Optionally, rather than protecting an entire device for the exclusive use of a particular partition definition, the baseboard management controller may protect a specific storage area of the device for the exclusive use of the particular partition definition. Accordingly, the protected storage area is only accessible to the particular partition definition to which the storage device is assigned and is only accessible to the particular partition definition during periods that the particular partition definition is active (i.e., the partitioning mode that is in effect causes operation of the particular partition definition as an independent node/partition).

Figure 19:
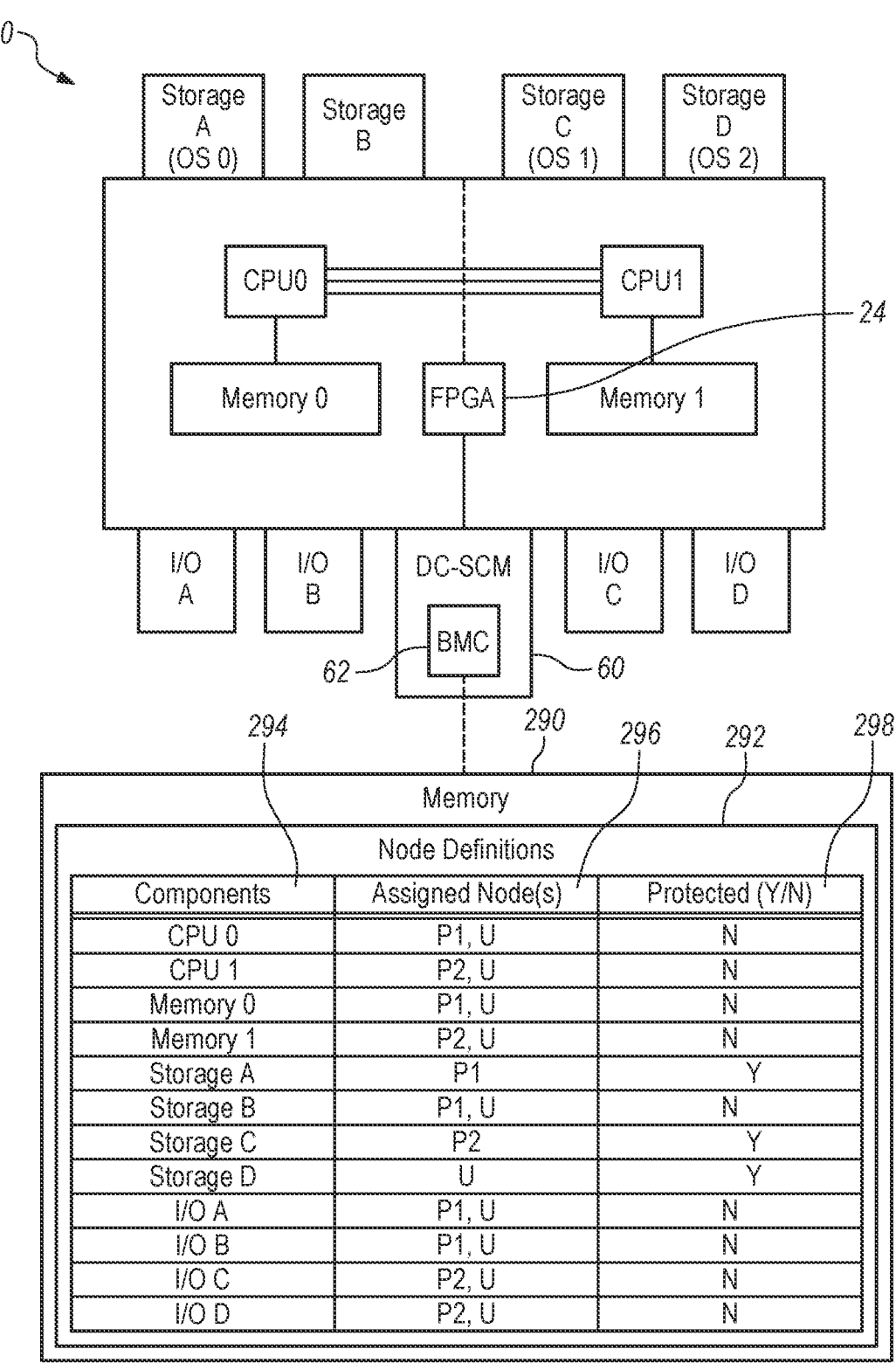
FIG. 19 is a diagram of a multi-processor system including a baseboard management controller that stores a plurality of node definitions.

FIG. 19 is a diagram of a multi-processor system 10 including a baseboard management controller 62 that stores a plurality of node definitions 292 in a non-volatile memory 290. The node definitions 292 may identify various components of the multi-processor system 10, such as the illustrated first central processing unit (CPU0), second central processing unit (CPU1), first memory (Memory 0), second memory (Memory 1), first data storage device (Storage A), second data storage device (Storage B), third data storage device (Storage C), fourth data storage device (Storage D), first input/output device (I/O A), second input/output device (I/O B), third input/output device (I/O C) and fourth input/output device (I/O D). These components may, for example, be identified by the baseboard management controller taking an inventory of the system 10. The components are listed in a first column 294 of the node definitions 292 illustrated as a table, although other data structures may be used. For each component listed in column 294, a second column 296 identifies the node(s) to which the component is assigned. For example, the first central processing unit (CPU 0) is assigned to the first partitioned node (P1) but may also be operated by the single unified node (U). This assignment to two nodes is possible because the first partitioned node (P1) and the single unified node (U) will never operate at the same time and also because the first central processing unit (CPU 0) is not a "protected" (No) or core component as shown in column 298. However, the first storage device (Storage A) is assigned to the first partitioned node (P1) (see column 296) and is shown in column 298 to be "protected" (Yes). As shown at the top of the diagram, Storage A is shown to store the first operating system (OS 0) and has been "protected" for the exclusive use of the first partitioned node (P1). Therefore, when the baseboard management controller 62 takes steps to implement a partitioning mode, the node definitions 292 guide or control how the multi-processor system 10 is configured. For example, all PCIe connections to the Storage A may be disabled when the system is in the unified state and a PCIe connection between the second central processing unit (CPU1) and Storage A may be disabled when the system is in the partitioned state (although the PCIe connection between the first central processing unit (CPU0) and Storage A would be enabled). The node definitions 292 are applicable to FIGS. 20 and 21 discussed below.

Figure 20:
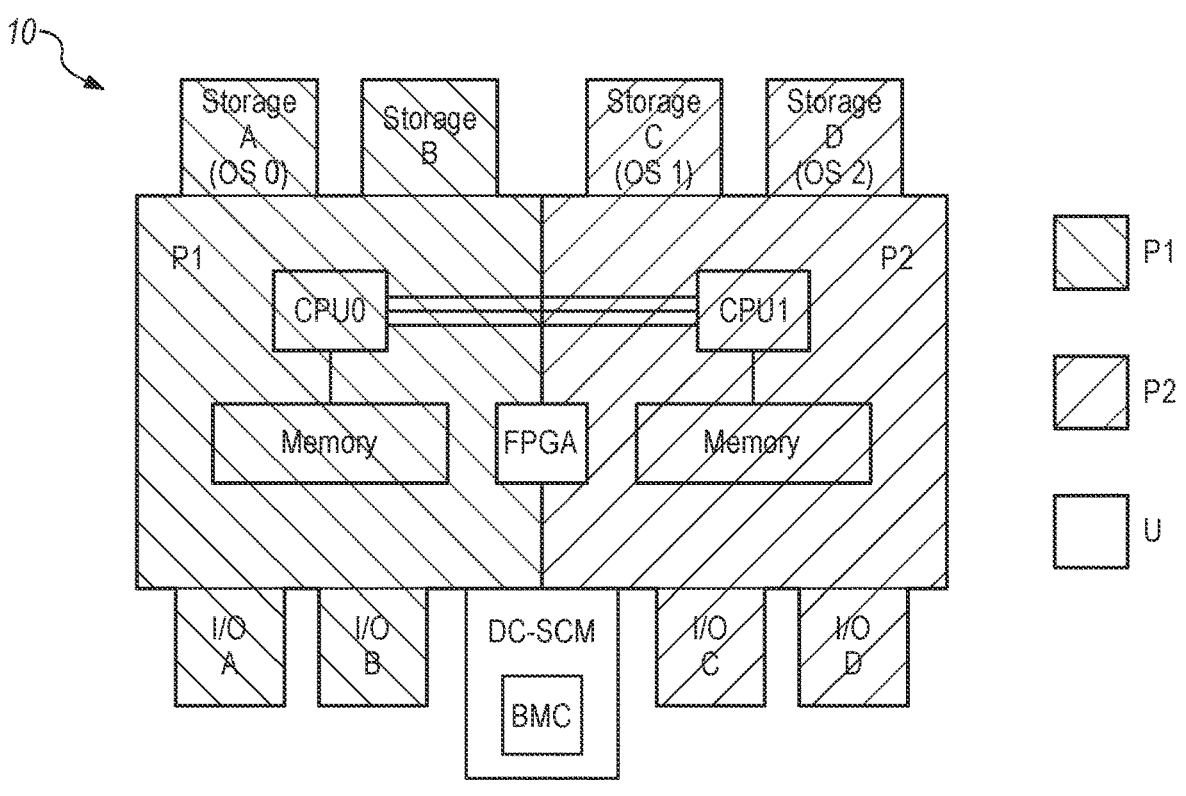
FIG. 20 is a diagram of the multi-processor system of FIG. 19 in a partitioned state hosting a first partitioned node (P1) and a second partitioned node (P2) that is independently operable from the first partition.

FIG. 20 is a diagram of the multi-processor system 10 of FIG. 19 in a partitioned state hosting a first partitioned node (P1; illustrated with first cross-hatching) and a second partitioned node (P2; illustrated with second cross-hatching) that is independently operable from the first partitioned node. Note that the first operating system (OS 0) is accessible to the first central processing unit (CPU 0) with the first partitioned node (P1) because the node definitions 292 (see FIG. 19) have assigned the first storage device (Storage A) to the first partition (P1). Similarly, the second operating system (OS 1) is accessible to the second central processing unit (CPU 1) with the second partitioned node (P2) because the second operating system (OS 1) is stored on the third storage device (Storage C) and the node definitions 292 (see FIG. 19) have assigned the third storage device (Storage C) to the second partition (P2). However, note that the fourth storage device (Storage D) is inaccessible to either the first partitioned node (P1) or the second partitioned node (P2), because the node definitions 292 (see FIG. 19) have assigned the fourth storage device (Storage D) to the single unified node (U; illustrated with no cross-hatching) and designated the device to be "protected" (Y) for the exclusive use of the single unified node (U).

Figure 21:
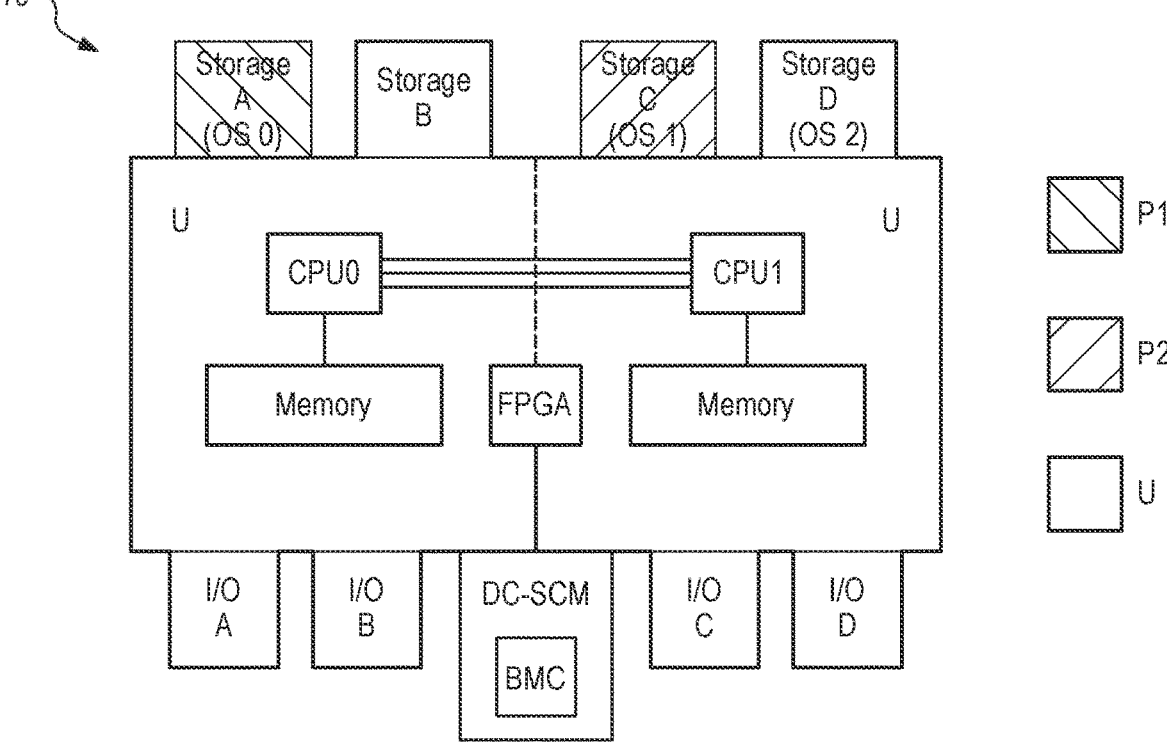
FIG. 21 is a diagram of the multi-processor system of FIG. 19 in a unified state hosting a single unified node (U) including components from both the first partitioned node and the second partition.

FIG. 21 is a diagram of the multi-processor system 10 of FIG. 19 in a unified state hosting a single unified node (U; illustrated with no cross-hatching) including components that were also used in the first partitioned node and the second partitioned node (see FIG. 20). The third operating system (OS 2) is accessible to the first and/or second central processing units (CPU 0 and/or CPU 1) with the single unified node (U) because the node definitions 292 (see FIG. 19) have assigned the fourth storage device (Storage D) to the single unified node (U) as well as the first and/or second central processing units. However, note that the first and third storage devices (Storage A and Storage C) are inaccessible to the single unified node (U), because the node definitions 292 (see FIG. 19) have assigned the first storage device (Storage A; illustrated with first cross-hatching) to the first partitioned node (P1) and designated the device to be "protected" (Y) for the exclusive use of the first partitioned node (P1) and have also assigned the third storage device (Storage C; illustrated with second cross-hatching) to the second partitioned node (P2) and designated the device to be "protected" (Y) for the exclusive use of the second partitioned node (P2). Note that the second storage device (Storage B) is used by the first partitioned node (P1) in the partitioned state shown in FIG. 20 and also used by the single unified node (U) in the unified state shown in FIG. 21. This is possible, because the second storage device is not "protected" (N) and may be used non-exclusively my various nodes. In fact, the second storage device could also be shared with, or reassigned to, the second partitioned node.

Button Press Gestures on a Single Power Button to Power Sequence a Selected Partitioned Node Some embodiments provide a method, such as a method of using button press gestures on a single power button to power sequence a selection one or a plurality of partitioned nodes. The method may comprise detecting first and second button press gestures performed sequentially by a user on a single power button of a multi-processor system, determining whether the detected first button press gesture matches a first button press gesture definition stored in association with identification of a first partitioned node of the multi-processor system or matches a second button press gesture definition stored in association with identification of a second partitioned node of the multi-processor system, and determining whether the detected second button press gesture matches a third button press gesture definition stored in association with an instruction to sequence power. The method may further comprise initiating power sequencing of the first partitioned node in response to the detected first button press gesture matching the first button press definition and the detected second button press gesture matching the third button press gesture definition. Still further, the method may comprise initiating power sequencing of the second partitioned node in response to the detected first button press gesture matching the second button press definition and the detected second button press gesture matching the third button press gesture definition.

In some embodiments, the first button press gesture definition may specify a first button press and hold gesture having a first button press duration, and wherein the second button press gesture definition specifies a second button press and hold gesture having a second button press duration that is different than the first button press duration. Optionally, the third button press gesture definition may specify a third button press and hold gesture having a third button press duration. In a further option, any button press duration referred to herein may be defined as a button press duration range, such that a button press having a duration within the button press duration range is effective to cause the associated node selection and/or node power sequencing. For example, the first button press gesture definition may specify that the first button press duration is a first button press duration range and the second button press gesture definition may specify that the second button press duration is a second button press duration range, wherein the detected first button press gesture is determined to match the first button press gesture definition in response to the determining that the detected first button press gesture is a press and hold gesture having a measured press duration that is within the first button press duration range, and wherein the detected first button press gesture is determined to match the second button press gesture definition in response to the determining that the detected first button press gesture is a press and hold gesture having a measured press duration that is within the second button press duration range.

In some embodiments, the first button press gesture definition may be a first button press pattern gesture having a first number of consecutive button presses, and the second button press gesture definition may be a second button pattern gesture having a second number of consecutive button presses that is different than the first number of consecutive button presses. Optionally, the third button press gesture definition may be a button press and hold gesture having a predetermined button press duration. Accordingly, a button press pattern may be used to select between the first and second partitioned nodes, and a button press duration may be used to initiate power sequencing of the selected partitioned node.

In some embodiments, initiating power sequencing to the first partitioned node may include sending a sequencing signal to a voltage regulator having an output power rail connected to deliver power to the first partitioned node. However, in other embodiments, initiating power sequencing to the first partitioned node includes sending a sequencing signal to a first power state device, such as a first advanced configuration and power interface device, for the first partitioned node, wherein the first power state device stores a current power state for the first partitioned node.

In some embodiments, the single power button is a momentary switch that only generates an output signal while a user is pressing the single power button, and wherein the first and second button press gestures performed sequentially by the user on the single power button of the multi-processor system are detected by receiving the output signal from the single power button.

Some embodiments may further comprise a baseboard management controller receiving a user command through a remote system management interface, wherein the user command requests power sequencing of the first partition. The baseboard management controller may then instruct an integrated circuit on the motherboard to initiate power sequencing of the first partition.

Some embodiments provide a system comprising a partitionable multi-processor motherboard that supports multiple central processing units, wherein the multi-processor motherboard may be configured to operate as a single unified node or configured to operate as multiple independent partitioned nodes. The system further comprises a single power button that is accessible to a user, wherein the single power button generates an output signal while being pressed, and an integrated circuit installed on the motherboard and connected to receive the output signal from the power button, wherein the integrated circuit stores a first button press gesture definition associated with selection of a first partitioned node, a second button press gesture definition associated with selection of a second partitioned node, and a third button press gesture definition associated with sequencing power to the selected one of the first or second partitioned nodes.

In some embodiments, the system may further comprise a first power state device, such as a first advanced configuration and power interface device, for the first partitioned node connected to the integrated circuit, wherein the integrated circuit sends a first power sequencing signal to the first power state device in response to the output signal received from the single power button indicating that the user has pressed the single power button to sequentially enter a first button press gesture matching the first button press gesture definition followed by a second button press gesture matching the third button press gesture definition, and wherein the first power sequencing signal causes the first power state device to update a stored power state of the first partition and instruct the integrated circuit whether to power on or power off the first partitioned node. Similarly, the system may further comprise a second power state device, such as a second advanced configuration and power interface device, for the second partitioned node connected to the integrated circuit, wherein the integrated circuit sends a second power sequencing signal to the second power state device in response to the output signal received from the single power button indicating that the user has pressed the single power button to sequentially enter a first button press gesture matching the first button press gesture definition followed by a second button press gesture matching the third button press gesture definition, and wherein the second power sequencing signal causes the second power state device to update a stored power state of the second partitioned node and instruct the integrated circuit whether to power on or power off the second partitioned node.

Embodiments of the system may further comprise a first voltage regulator connected to supply power to components of the first partitioned node, wherein the integrated circuit asserts a power control signal to an enable input of the first voltage regulator in response to the integrated circuit being instructed to power on the first partitioned node and deasserts the power control signal to the enable input of the first voltage regulator in response to the integrated circuit being instructed to power off the first partitioned node. Similarly, the system may further comprise a second voltage regulator connected to supply power to components of the second partitioned node, wherein the integrated circuit asserts a power control signal to an enable input of the second voltage regulator in response to the integrated circuit being instructed to power on the second partitioned node and deasserts the power control signal to the enable input of the second voltage regulator in response to the integrated circuit being instructed to power off the second partitioned node. Optionally, if the first partition is powered off, toggling the signal to the enable input of the first voltage regulator may cause the first partition to boot and, if the second partition is powered off, toggling the signal to the enable input of the second voltage regulator may cause the second partition to boot.

In some embodiments of the system, the multiple central processing units may include a first central processing unit assigned to the first partitioned node and a second central processing unit assigned to the second partitioned node, wherein the first central processing unit runs a first operating system in communication with the first power state device for sequencing a power state of the first partitioned node, and wherein the second central processing unit runs a second operating system in communication with the second power state device for sequencing a power state of the second partitioned node. Using the first and second power state devices allows both the operating system and the integrated circuit the ability to sequence power to a particular partitioned node.

In some embodiments, the integrated circuit may store the first button press gesture until a subsequent output signal is received from the single power button or until expiration of a timeout period.

In some embodiments, the single power button is a momentary switch that only generates the output signal while a user is pressing the single power button.

In some embodiments, the system may further comprise a case containing the motherboard, wherein the single power button is secured to the case. For example, the single power button should be easily accessible to a user that is present near the case.

In some embodiments, the system may further comprise a baseboard management controller in communication with the integrated circuit, wherein the first and second button press gesture definitions are user-configurable through a system management interface to the baseboard management controller, and wherein the baseboard management controller causes the first and second button press gesture definitions to be stored in the integrated circuit.

Embodiments provide a system and method to alter physical power-on behavior using unique power button press gestures, such as button press patterns and durations. For example, a single power button pattern may be used to physically power on any one of a plurality of partitions with a multi-processor system. The ability to control power to a particular partition of the multi-processor system may be useful in various scenarios, such as performing service or testing on a single partition without interrupting another partition within the same multi-processor system. Some embodiments of the system may be configured to perform any of the operations of the methods described herein.

Figure 22:
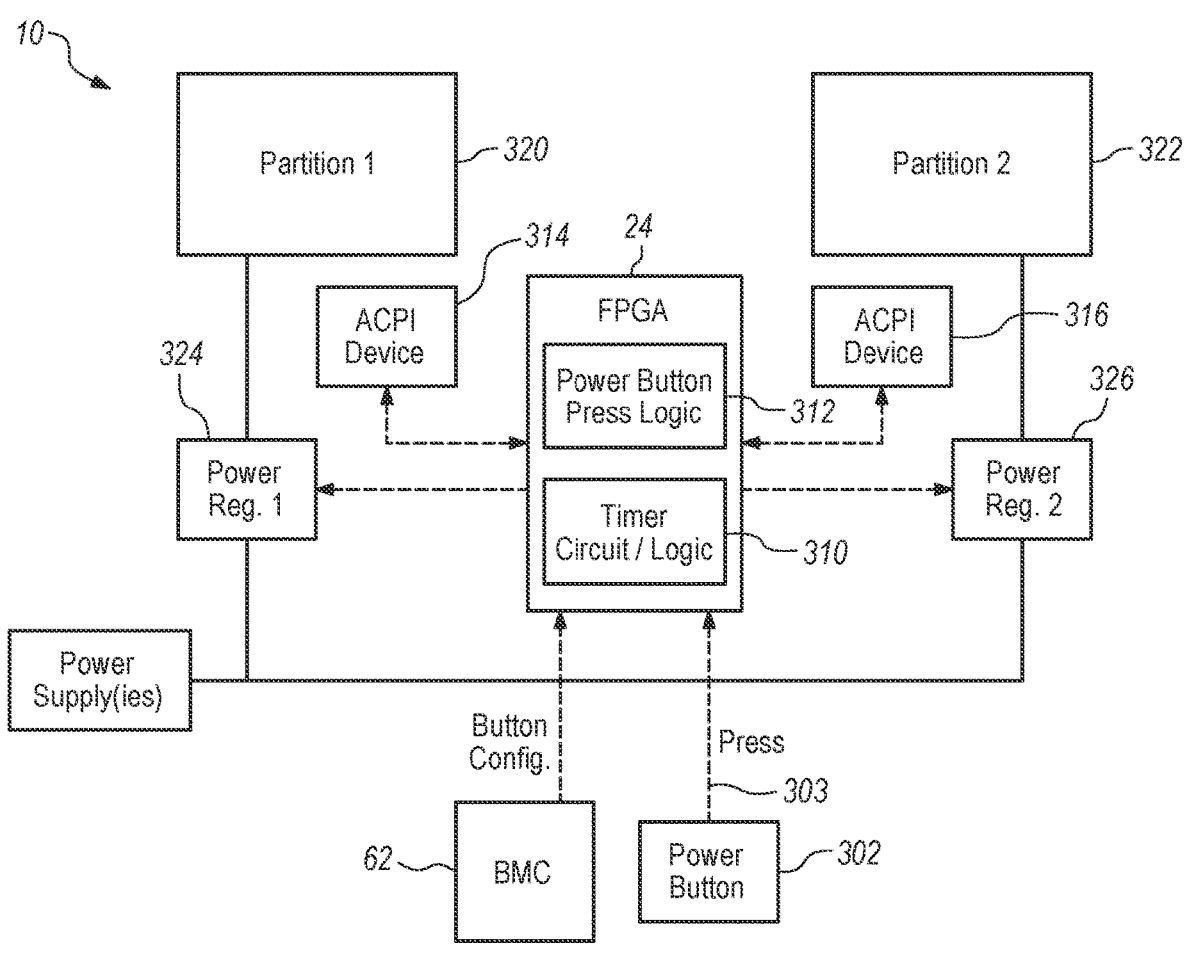
FIG. 22 is a diagram of a multi-processor system having a single power button that is connected to an integrated circuit, such as a FPGA, CPLD, ASIC, etc., to communicate an output signal that corresponds to a button press gesture performed by a user.

FIG. 22 is a diagram of a multi-processor system 10 having a single power button 302 that is connected to an integrated circuit 24, such as a field-programmable gate array (FPGA), to communicate an output signal 303 that corresponds to a button press gesture performed by a user. The integrated circuit 24 may include an internal timer circuit or logic 310 that performs a timing function, perhaps timing a press duration and/or tracking a timeout period for resetting previously entered button press gestures. The integrated circuit 24 also stores power button press logic 312, which enables the integrated circuit to distinguish various button press gestures. For example, the integrated circuit 24 may detect or receive an output signal 303 from the single power button 302 and the power button press logic 312 may then determine whether the output signal is representative of a user having entered a power button press gesture that matches a power button press gesture definition. In particular, the integrated circuit 24 may receive a sequence of first and second button press gestures, wherein the first button press gesture identifies selection of a partition, such as the first partition or the second partition, and the second button press gesture indicates that an instruction to power sequence the selected partition.

Some embodiments include a first and second power state devices 314, 316, such as Advanced Configuration and Power Interface (ACPI) devices, for each of first and partitioned nodes (Partition 1 and Partition 2) 320, 322. Each power state device 314, 316, stores a power state for a corresponding one of the partitioned nodes 320, 322. So, after the integrated circuit 24 determines that a given partitioned node is to be power sequenced, a power sequencing signal is provided to the power state device associated with the given partitioned node. The power state device may then change the stored power state for the partitioned node and instruct the integrated circuit 24 to implement the new power state by either powering on a corresponding voltage regulator 324, 326 to the given partitioned node or powering off the voltage regulator 324, 326 to the given partitioned node. Each power state device 314, 316 may also accept power sequencing instructions from an operating system running on the given one of the partitioned nodes 320, 322. So, to coordinate power sequencing that may be from initiated from either the operating system or the integrated circuit 24, the integrated circuit 24 may report power sequencing to the power state device for the given partitioned node and receive power sequencing instructions from the power state device before sending any control signals to a voltage (power) regulator for the given partitioned node.

Figure 23:
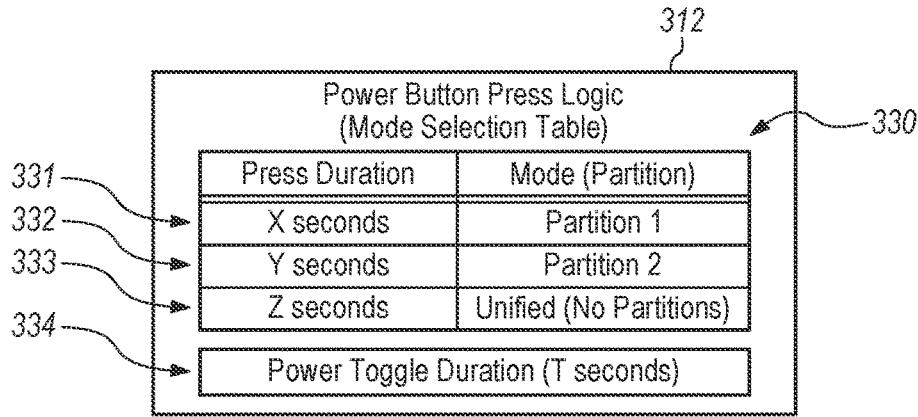
FIG. 23 is a table of button press gesture definitions, including button press gesture definitions that are associated with selection of a different partition, selection of a unified system (no partitions), and an instruction to power sequence a selected one of the partitions or unified system.

FIG. 23 is a diagram illustrating power button press logic 312 to be used by the integrated circuit 24 as shown in FIG. 22. The power button press logic 312 may include a mode selection table 330 that includes various button press gesture definitions. For example, the button press gesture definitions may include a first button press gesture definition 331 that is associated with selection of a first partitioned node (Partition 1), a second button press gesture definition 332 that is associated with selection of a second partitioned node (Partition 2), and a third button press gesture definition 333 that is associated with selection of a single unified node (U). The power button press logic 312 may also store a button press gesture definition 334 for power sequencing a selected one of the partitioned nodes or the single unified node. Note that the press durations may be a press duration range.

In a multi-processor system that is operating in a partitioned state, the power to a selected partitioned node may be power sequenced on/off by pressing the sole power button for a duration (press duration) that is associated with the selected partitioned node or using a pattern of presses (press pattern) that is associated with the selected partition. In one example implementing a press duration, pressing the power button for a duration of X seconds (perhaps 2 seconds) could select physical power control to a first partitioned node, while pressing the power button for a duration of Y seconds (perhaps 4 seconds) could selection physical power control to a second partitioned node. In another example implementing a press pattern, the power button may be used to select power control to a first partition by double tapping (i.e., two quick presses) the power button or to select power control to a second partition by triple tapping (i.e., three quick presses) the power button. Optionally, a further press duration (Z seconds; perhaps 6 seconds) or press pattern (i.e., four quick presses) may be defined for the power button to select power control to a single unified node. In each example, after using the power button to select power control to a particular partitioned node or the single unified node, a subsequent press and hold for a predetermined duration of T seconds (perhaps 8 seconds) may be used to power sequence (on or off) the selected partitioned node or single unified node.

In some embodiments, the power to a particular partition or to the unified system may be controlled by providing a remote power command to the baseboard management controller. For example, a user may input a remote power command to the baseboard management controller through a remote management interface, such as OneCLI or Redfish. In this embodiment, the power button press duration or press pattern is bypassed by providing a power control command directly to the baseboard management controller. Specifically, OneCLI is a collection of command line applications where, for example, the power to a second partition may be powered on using a command such as "OneCLI.exe multiospower <turnon> <partition=2>." A similar command could be used to turn the power on or off to any partitioned node or to the single unified node.

In some embodiments, a press duration or press pattern may be used to sequence power (on or off) to a particular partition or the unified system without a prior partition/system selection. For this embodiment, a single press duration or single press pattern may be used to identify the partition/system selection and also to sequence power to the identified partition/system. In one example, a first press duration (for example, 2 seconds) may identify a first partition and cause toggling of power to the first partition, while a second press duration (for example, 4 seconds) may identify a second partition and cause toggling of power to the second partition.

In some embodiments, in order to distinguish a first press duration from a second press duration, any action to be triggered by the press duration must be delayed until after the full press duration of the power button, such as by detecting release of the power button. In this manner, a timer may commence timing a press duration upon detecting a power button press but continues timing the press duration until detecting a power button release. The integrated circuit may then use the full press duration to identify the selected partitioned node/unified node.

Power Control for Unified/Partitioned System with Power Redundancy

Some embodiments provide a partitionable multi-processor system comprising a first plurality of components of the multi-processor system forming a first partitioned node, a second plurality of components of the multi-processor system forming a second partitioned node that is operable independent of the first partitioned node. The system further comprises at least one power supply delivering power to the multi-processor system at a first voltage level, a first power switch connected between the at least one power supply and a first power rail distributing power to one or more components of the first partition at the first voltage, a second power switch connected between the at least one power supply and a second power rail distributing power to one or more components of the second partition at the first voltage, and a system controller that selectively enables the first power switch to supply power to the first power rail and independently selectively enables the second power switch to supply power to the second power rail. In one example, the system controller may be an integrated circuit, such as the same integrated circuit that is involved in partitioning of the multi-processor system.

In some embodiments, the system further comprises a first power regulator having a first power input connected to the at least one power supply and a first power output supplying power at a second voltage level. The system may still further comprise a third power switch connected between the first power output of the first power regulator and a third power rail distributing power to one or more components of the first partition at the second voltage, and a fourth power switch connected between the first power output of the first power regulator and a fourth power rail distributing power to one or more components of the second partition at the second voltage, wherein the system controller independently selectively enables the first power regulator to supply power to either of first and second partitions, enables the third power switch to supply power to the third power rail and/or enables the fourth power switch to supply power to the fourth power rail.

In some embodiments, the system will also comprise a second power regulator having a first power input connected to the at least one power supply and a second power output supplying power on a fifth power rail distributing power to one or more component of the first partition at a third voltage level, and a third power regulator having a third power input connected to the at least one power supply and a third power output supplying power on a sixth power rail distributing power to the one or more components of the second partition at a fourth voltage level, wherein the system controller independently selectively enables the second power regulator to supply power to the fifth power rail and the third power regulator to supply power to the sixth power rail.

In some embodiments, the first voltage may be approximately 12 Volts and the second voltage may be approximately 3.3 Volts. In an independent option, the third and fourth voltage levels may be the same voltage level, such as approximately 1.2 Volts to approximately 1.4 Volts. For example, the second power regulator may supply power to a first specific type of component in the first partitioned node, wherein the third voltage level is variable based on a load on the first specific type of component in the first partitioned node, wherein the third power regulator supplies power to a second specific type of component in the second partitioned node, and wherein the fourth voltage level is variable based on a load on the second specific type of component in the second partitioned node. Without limitation, the first and second specific types of components may be independently selected from central processing units and memory modules.

In some embodiments, the at least one power supply provides the main power source for the multi-processor system and includes first and second redundant power supplies that are connected to supply power to the multi-processor system at the first voltage, wherein the first power supply automatically fails over to the second power supply. Accordingly, the benefits of redundant power supplies are available in both the partitioned state and the unified state. If the power supplies are not already turned on, the system controller may selectively enable the at least one power supply so long as either of the first and second partitioned nodes is turned on.

In some embodiments, the system further comprises a baseboard management controller in communication with the system controller. The baseboard management controller may provide the integrated circuit with a partitioning mode instruction and one or more power status instructions, wherein the partitioning mode instruction identifies either a partitioned state or a unified state to be implemented on the multi-processor system, and wherein the one or more power status instructions identifies, for the unified state, a power state for the multi-processor system as a single unified node or identifies, for the partitioned state, a power state for the first partitioned node and/or the second partitioned node.

In some embodiments, the system controller may power on the first partitioned node when the system is in a partitioned state by enabling the first power switch to provide power to the first power rail at the first voltage, enabling the first power regulator and the second power switch to provide power to the third power rail at the second voltage, and enabling the second power regulator to provide power to the fifth power rail at the third voltage. By contrast, the system controller may power on the single unified node when the system is in the unified state by enabling the first, second and third power regulators and enabling the first, second, third and fourth power switches.

In some embodiments, the system controller may power off the first partitioned node, while maintaining power on to the second partitioned node, by disabling the first and second power switches and the second power regulator.

In some embodiments, the system controller may be connected to the at least one power supply to receive auxiliary power independent of the first partitioned node and/or second partitioned node being powered on.

In some embodiments, some components of each partitioned node may receive power from the power supply via a power regulator that provides power at a second voltage level. In one option, each partitioned node may have its own power regulator that supplies power to a power rail that is exclusive to the respective partitioned node. In another option, the partitioned nodes may share a power regulator that supplies power at a third voltage level. The power output from a shared power regulator may supply power to the components of either or both of the partitioned nodes, where a first power switch may be used to control power from the shared power regulator to a first power rail connected to components of the first partitioned and where a second power switch may be used to control power from the shared power regulator to a second power rail connected to components of the second partitioned node. A shared power regulator that supplies power to multiple partitioned nodes may be enabled (switched on) when either of the partitioned nodes are powered on.

In some embodiments, an integrated circuit on the host processor module or motherboard may perform the control functions that selectively enable the power regulators and the power switches (FETs). Accordingly, the integrated circuit may be referred to herein as the "system controller". Optionally, the integrated circuit (aka "system control unit", "system controller" or "power controller") may perform other partitioning functions described herein and may be, for example, a field-programmable gate array (FPGA), complex programmable logic device (CPLD) or Application Specific Integrated Circuit (ASIC). In one option, the system controller may also selectively enable the at least one power supply.

The system controller may sequence the power regulators and power switches to enable a partition configuration in accordance with a partition instruction received from the baseboard management controller. For example, the system controller may receive a partition instruction from the baseboard management controller identifying a partitioning mode (i.e., partitioned state/unified state) and whether to turn on/off power to one or more of the partitioned nodes or the single unified node. If a first partitioned node is to be powered on/off, then the system controller may enable/disable one or more of the power regulators and power switches to turn the power on/off to the first partitioned node while maintaining the current power on/off state of the second partitioned node, and vice versa. In other words, the power control system allows independent power control to each partitioned node. Furthermore, if the full complement of central processing units are to be operated as a single unified node, then the system controller may enable each of the power regulators and power switches simultaneously to implement the architecture requirements of the single unified node.

Upon receiving an instruction to turn on power to a selected partitioned node, the system controller may enable (turn on) the power regulators and power switches that are needed to deliver power to the components of the selected partitioned node. These power regulators and power switches may be configurable based on the components that are included in a partition definition for the selected partitioned node. If another partitioned node was already powered on, then it is expected that the power supplies and any shared power regulator will already be turned on and should remain turned on.

Upon receiving an instruction to turn on power to the unified system, the system controller may enable the power regulators and power switches that are needed to deliver power to the components of the unified system. These power regulators and power switches may be configurable based on the components that are included in unified system definition. Optionally, the system controller may enable all of the power regulators and power switches in the multi-processor system, or the power regulators and power switches for both partitioned nodes, without considering a unified system definition.

Upon receiving an instruction to turn off power to a selected partitioned node, the system controller may disable (turn off) the power regulators and power switches that are needed to deliver power to the components of the selected partitioned node. These power regulators and power switches may be configurable based on the components that are included in a partition definition for the selected partitioned node. However, it is should be emphasized that any power regulator that is shared by multiple partitioned nodes should remain on unless both the partitioned nodes should have their power turned off.

Upon receiving an instruction to turn off power to the unified system, the system controller may disable the power regulators and power switches that deliver power to the components of the unified system. These power regulators and power switches may be configurable based on the components that are included in unified system definition. Optionally, the system controller may disable all of the power regulators and power switches in the multi-processor system, or the power regulators and power switches for both partitioned nodes, without considering a unified system definition.

As used herein, the terms "enable" and "enabling" include asserting a signal that enables a component and the terms "disable" and "disabling" include deasserting the signal (i.e., removing or no longer providing the signal) that enabled the component.

In some embodiments, the power supply may provide only 12V power to the system board and the system board includes power regulators to obtain any other voltage level that is needed by the components on the system board. A multi-processor system receiving power from this type of power supply may require more power regulators than a power supply that has multiple outputs at different voltages. Optionally, the multi-processor system may include power regulators selected from three configuration of power distribution that may be used to supply power to the various components of the system, such as central processing units, chipsets, memory and other components. A first configuration supplies power (perhaps 12V) directly from the power supplies (or possibly from an external source) and is gated via a field-effect transistor (FET) to certain the system board components under the control of an integrated circuit (i.e., a FPGA). A second configuration supplies power (perhaps 3.3V) through a common or shared power regulator that is controlled (turned on/off) by the integrated circuit. The integrated circuit further controls additional FETs to turn power on/off from the shared power regulator to the individual partitioned nodes. A third configuration provides a power regulator that supplies power (perhaps 1.2-1.4V) to a specific partitioned node and/or a specific component like CPU, Memory, etc. in a specific partitioned node under the control of the integrated circuit. Some power regulators may supply a variable output voltage depending upon a load being performed by the specific components. Since there may be different loads placed on each partitioned node, such load-variable power regulators preferably supply power to only a single partitioned node.

Figure 24:
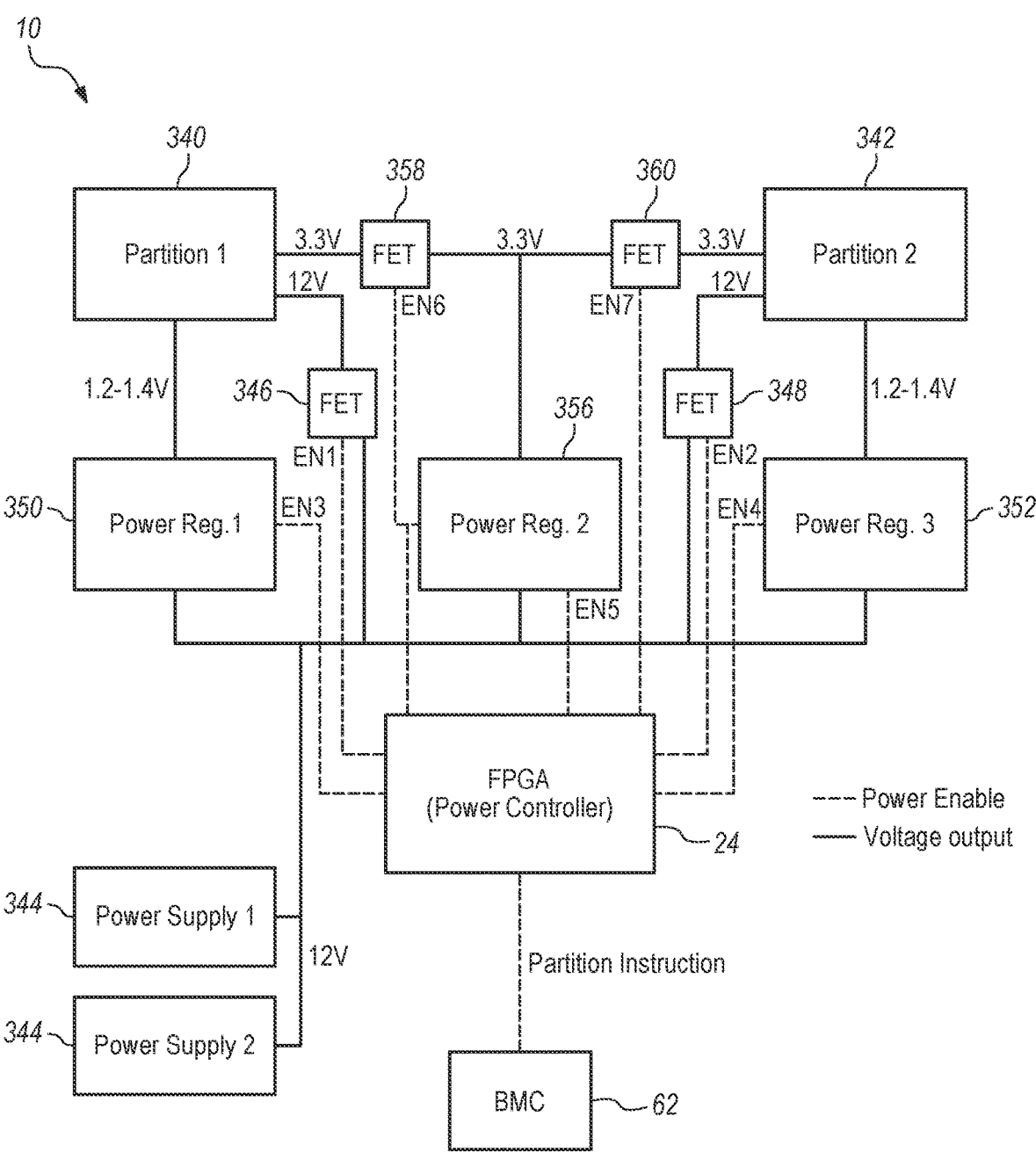
FIG. 24 is a diagram of a power distribution system for a partitionable multi-processor system.

FIG. 24 is a diagram of a power distribution system for a partitionable multi-processor system 10. The system includes a first plurality of components of the multi-processor system forming a first partitioned node 340, and a second plurality of components of the multi-processor system forming a second partitioned node 342 that is operable independent of the first partitioned node 340. The system further comprises at least one power supply 344 delivering power to the multi-processor system at a first voltage level (here, 12V), a first power switch 346 connected between the at least one power supply 344 and a first power rail distributing power to one or more components of the first partition 340 at the first voltage, a second power switch 348 connected between the at least one power supply 344 and a second power rail distributing power to one or more components of the second partitioned node 342 at the first voltage, and a system controller or power controller 24 that selectively enables (via signal EN1) the first power switch 346 to supply power to the first power rail and independently selectively enables (via signal EN2) the second power switch 348 to supply power to the second power rail. In one example, the power controller 24 may be an integrated circuit, such as the same integrated circuit that is involved in partitioning of the multi-processor system.

The system 10 further includes a first power regulator 350 having a first power input connected to the at least one power supply 344 and a first power output supplying power on a third power rail distributing power to the one or more components of the first partitioned node 340 at a second voltage level (here, 1.2-1.4V). Similarly, the system may also include a third power regulator 352 having a third power input connected to the at least one power supply 344 and a third power output supplying power on a fourth power rail distributing power to the one or more components of the second partition 342 at a fourth voltage level (here, 1.2-1.4V). The power controller may enable (via signal EN3) the first power regulator 350 to supply power to the third power rail and independently selectively enable (via signal EN4) the third power regulator 352 to supply power to the fourth power rail. The reference to the power rails, or other components or elements, as being "first", "second", "third" and "fourth" is intended to distinguish separate instances of a component or element and not to indicate any sort of order or sequence, or any limitation on the number of instances of a component or element. The foregoing examples illustrate various power distribution configurations that may be implemented by any number of instances of the components and/or configurations.

The system may still further comprise a second power regulator 356 having a second power input connected to the at least one power supply 344 and a second power output for supplying power on a fifth power rail distributing power to one or more component of the first partitioned node 340 at a third voltage level (here, 3.3V) as well as a sixth power rail distributing power to one or more components of the second partitioned node 342 at the third voltage level. A third power switch 358 is connected between the second power output of the second power regulator 356 and the first power rail, and a fourth power switch 360 is connected between the second power output of the second power regulator and the sixth power rail. The power controller may independently selectively enable (via signal EN5) the second power regulator 356 to supply power to either of first and second partitions 340, 342, enable (via signal EN6) the third power switch 358 to supply power to the third power rail to the first partitioned node 340 and/or enables (via signal EN7) the fourth power switch 360 to supply power to the fourth power rail to the second partitioned node 342.

The power controller 24 implements control over the power regulators and power switches in FIG. 24, but the baseboard management controller 62 provides the partitioning and power control instructions that are implemented by the power controller 24. Accordingly, the baseboard management controller 62 may initiate certain actions, or cause certain actions to occur, by sending instructions to the power controller.

Clocking and Reset Control in a Partitionable Multi-Processor System

Some embodiments provide a partitionable multi-processor system comprising a first plurality of components of the multi-processor system forming a first partitioned node and a second plurality of components of the multi-processor system forming a second partitioned node that is operable independent of the first partitioned node. The system further comprises a source clock generator having a first clock output connected to the first plurality of components forming the first partitioned node and a second clock output connected to the second plurality of components forming the second partitioned node, and a system control unit in communication with the source clock generator for independently selectively enabling the first clock output and the second clock output.

In some embodiments of the system, the system control unit may be in further communication with reset inputs of one or more of the components forming the first partitioned node and reset inputs of one or more of the components forming the second partitioned node for independently selectively asserting a reset signal to the one or more of the components forming the first partitioned node and/or a reset signal to the one or more of the components forming the second partitioned node.

In some embodiments, the system may further comprise a baseboard management controller in communication with the system control unit. The baseboard management controller may provide the system control unit with a partitioning mode instruction and one or more power status instructions. For example, the partitioning mode instruction may identify either a partitioned state or a unified state to be implemented on the multi-processor system, and the one or more power status instructions may identify, for the unified state, a power state for the multi-processor system as a single unified node or identify, for the partitioned state, a power state for the first partitioned node and/or the second partitioned node. In one option, the system control unit, in response to receiving a partitioning mode instruction to implement the unified state and a power status instruction to implement a powered on state for the unified system, may enable the first and second clock outputs and release reset to the reset inputs to the one or more of the components forming the first partitioned node and the reset inputs of the one or more of the components forming the second partitioned node. In another option, the system control unit, in response to receiving a partitioning mode instruction to implement the partitioned state and a power status instruction to implement a powered on state for the first partitioned node, may enable the first clock output and releases reset to the reset inputs to one or more of the components forming the first partitioned node. The system control unit may also store an inventory of components in the multi-processor system and, for each component in the inventory, a partition identifier associated with the component. The partition identifier may indicate whether the associated component is included in the first partitioned node or the second partitioned node, and the system control unit may release reset to the reset inputs to the one or more of the components that are identified in the inventory to be associated with a first partition identifier that identifies the first partitioned node.

In some embodiments, the system may include a source clock generator having a first clock output connected to a first subset of the first plurality of components, a second clock output connected to a second subset of the first plurality of components, a third clock output connected to a first subset of the second plurality of components, and a fourth clock output connected to a second subset of the second plurality of components. Furthermore, the system control unit may be in communication with the source clock generator for independently selectively enabling the first, second, third and fourth clock outputs. For example, the first clock output may be connected to the first subset of the first plurality of components through a clock fanout buffer that distributes a clock signal from the first clock output to each of a plurality of components in the first subset. In one option, the plurality of components in the first subset are input/output devices and/or non-volatile data storage devices.

The clocking and reset structure in a partitionable multi-processor system may operate to support independent partitioned nodes or a single unified node where the subsystems clocking from a common clock source are selectively enabled in accordance with the selected partitioning mode (i.e., partitioned state or unified state). The system control unit (SCU), also referred to herein as an integrated circuit or power controller, may control the assertion of clock enable signals and component reset signals to one or more selected components or subsystems of the multi-processor system to support operation of one or more partitioned nodes or the single unified node. That is, if a first partitioned node is entering the working or runtime state (S0 runtime power state) then the SCU may enable the source clock generator, enable the clock outputs to particular components within the first partitioned node, and release resets (i.e., deasserts the reset) to the components of the first partitioned node to implement the configuration identified by the partitioning instruction. A second partitioned node may be maintained in its current state enabled/disabled and vice versa (i.e., fence off enable/disable clocks and reset changes to the other partitioned node). Furthermore, if the multi-processor system is to be operated as a single unified node, then the SCU may enable the clocks and drive the resets inactive (i.e., deassert the reset signals) to any or all components to meet the architecture requirements of the single unified node. In an input/output subsystem, the appropriate clock enable and reset signals may be asserted/deasserted for the partitioned node that is entering/exiting the working state per the selected partitioned node in which the input/output device has been assigned. If runtime power is turned off to the multi-processor system (the S5 standby power state), either when all partitioned nodes or the single unified node are turned off, auxiliary power is preferably still provided to the system control unit (SCU) and the baseboard management controller (BMC) so that the SCU and BMC may remain active.

In some embodiments, a partitionable multi-processor system may provide for sharing clocking sources to multiple partitioned nodes on a single motherboard. For example, a source clock generator may have a first output for providing a first clock signal to a first partitioned node and a second clock output for providing a second clock signal to a second partitioned node. One or more additional clock outputs from the source clock generator and/or one or more clock fanout buffers coupled to the clock outputs may also be provided for each partitioned node. In one option, the source clock generator, the individual clock outputs, and/or clock fanout buffers may receive enable signals asserted and deasserted by a system control unit (SCU). The source clock generator is a resource that may be shared between partitioned nodes such that the enable signal to the source clock generator should not be deasserted by the SCU unless all of the partitioned nodes are being turned off.

In some embodiments, the multi-processor system may have a zone or subsystem with a clock output that is enabled by the system control unit (SCU) so that clocking to the components in the zone are output controlled. Non-limiting examples of the zones include a set of input/output devices, such as PCIe devices of NVMe hard drives, that need a reference clock. Optionally, one or more clock fanout buffers may be used to facilitate distribution of clock output to multiple devices within a single partitioned node or zone of a partitioned node.

In some embodiments, the partitionable multi-processor system may provide for independent control of reset to a plurality of devices in the system. The system control unit (SCU) may assert and deassert rest signals to any of the one or more devices in the system. The system control unit may also be programmed or configured to keep track of which devices in the system are to be included in a first partitioned node, which devices in the system are to be included in a second partitioned node, and which devices in the system are to be included in a single unified node. For example, the system control unit may have access to memory for storing a table or other data structure that identifies each hardware component or device and a partition identifier (ID) associated with each component. The partition identifier may be used to identify the partitioned node to which the component is assigned during operation of the system in a partitioned state. In one option, the assignment of components to a given partitioned node may be user-configured and/or predetermined. For example, a user may provide input to a baseboard management controller through a management interface assigning components to each partitioned node, then the baseboard management controller may cause the partition assignment for each component to be stored by the system control unit. The system control unit may use the stored data (i.e., a node definition assigning components to one of the partitioned nodes) to identify which components are in which partitioned node and may implement a partition instruction accordingly.

Upon receiving a partition instruction identifying a partitioning mode from the baseboard management controller, the system control unit may implement the partitioning mode using the partition identifiers to determine which components are to be included in a given partitioned node. The system control unit may assert an enable signal to each clock output that is directed to components within a partitioned node that is being turned on and may deassert an enable signal to each clock output that is directed to components within a partitioned node that is not being turned on. Similarly, the system control unit may assert a reset signal to each component within a partitioned node that is not being turned on and may deassert a rest signal to each component within a partitioned node that is being turned on.

The system control unit (SCU) may receive a partition instruction that instructs the SCU to implement a partitioned state, with each partitioned node independently turned on or off, or to implement a single unified node that may be turned on or off.

If the SCU receives an instruction to turn on runtime power (enter ACPI S0 power state) to a particular partitioned node (or both partitioned nodes), the SCU may enable one or more source clock generators, if not already enabled from the start of other partitioned nodes, in order to operate the particular partitioned node(s). The SCU may further enable the clock output(s) needed for the components of the particular partitioned node and release reset to the components of the particular partitioned node. The SCU may store a table that identifies components within the multi-processor system and may associated each component with a partition identifier that indicates the partitioned node to which the component is assigned. Accordingly, the SCU may turn on the clock signals and release reset signals to the components that are associated with the particular partitioned node to be turned on, including input/output devices to be included in the partitioned node.

If the SCU receives an instruction to turn on runtime power (enter ACPI S0 power state) to the single unified node, the SCU may enable one or more additional source clock generators, if not already enabled from the start of other partitioned nodes, in order to operate the single unified node. The SCU may also enable the clock output(s) needed for the components of the single unified node, and release reset to the components of the single unified node. In some embodiments, the SCU may implement the single unified node in the multi-processor system by enabling all source clock generators of each partitioned node, enabling all clock outputs of each partitioned node, and releasing reset to all components. However, in some embodiments there may be certain components that are not enabled or made accessible to the single unified node.

Conversely, if the SCU receives an instruction to turn off runtime power (enter ACPI S5 power state) to the single unified node, the SCU may disable one or more source clock generators, if not already disabled, may disable the clock output(s) to all components of the single unified node, and may assert reset to all of the components of the single unified node.

If the SCU receives an instruction to turn off runtime power (enter ACPI S5 power state) to a particular partitioned node (or both partitioned nodes), the SCU may disable one or more source clock generators that are not shared by any other partitioned node(s), may disable the clock output(s) directed to the components of the particular partitioned node, and may assert reset to the components of the particular partitioned node. The SCU may store a table that identifies components within the multi-processor system and may associated each component with a partition identifier that indicates the partitioned node to which the component is assigned. Accordingly, the SCU may turn off the clock signals and assert reset signals to the components that are associated with the particular partitioned node being turned off, including input/output devices to be included in the partitioned node, and that are not shared with any other partitioned node that should remain in operation. Any clock sources that are no longer providing any downstream clock signals to a component are preferably disabled.

Figure 25:
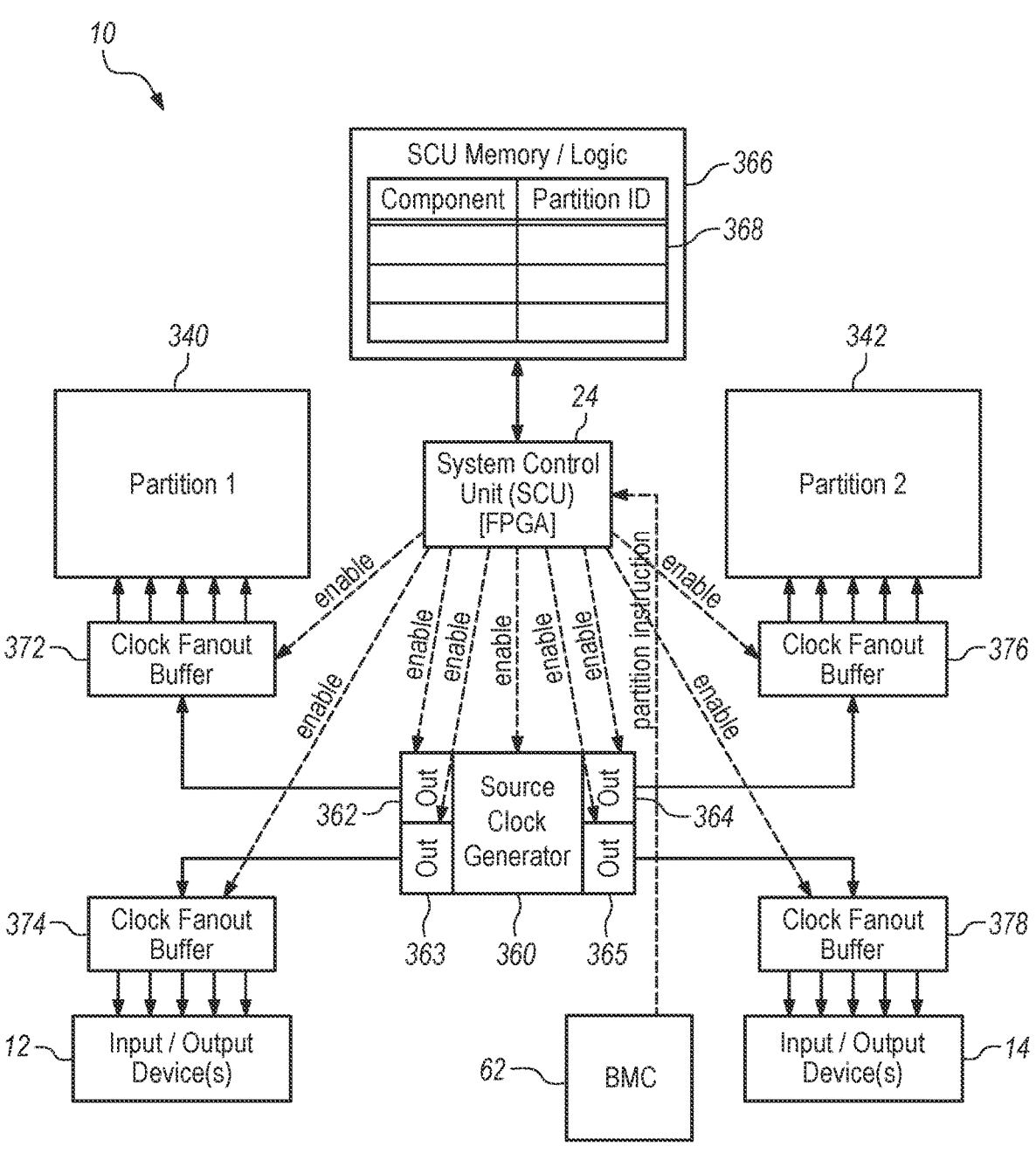
FIG. 25 is a diagram of a clock subsystem for a partitionable multi-processor system.

FIG. 25 is a diagram of a clock subsystem for a partitionable multi-processor system 10. The partitionable multiprocessor system 10 includes a first plurality of components of the multi-processor system forming a first partitioned node 340 and a second plurality of components of the multi-processor system forming a second partitioned node 342 that is operable independent of the first partitioned node 340. The system further comprises a source clock generator 360 having a first clock output 362 connected to the first plurality of components forming the first partitioned node 340 and a second clock output 364 connected to the second plurality of components forming the second partitioned node 342, and a system control unit 24 in communication with the source clock generator 360 for independently selectively enabling the first clock output 362 and the second clock output 364.

A baseboard management controller 62 is in communication with the system control unit 24 and provides a partitioning mode instruction and one or more power status instructions to the system control unit 24. For example, the partitioning mode instruction may identify either a partitioned state or a unified state to be implemented on the multi-processor system 10, and the one or more power status instructions may identify, for the unified state, a power state for the multi-processor system as a single unified node or identify, for the partitioned state, a power state for the first partitioned node and/or the second partitioned node.

The system control unit may have memory 366 that stores various node definitions 368 that identify an inventory of components in the multi-processor system and, for each component in the inventory, a partition identifier indicating whether the associated component is included in the first partitioned node or the second partitioned node. The system control unit, in response to receiving a partitioning mode instruction to implement the unified state and a power status instruction to implement a powered on state for the unified system, use the node definitions to determine which clock outputs to enable in order to implement the partitioning mode and power status instructions.

In this example, the source clock generator 360 has the first clock output 362 connected to a first subset of components in the first partition 340 through a clock fanout buffer 372 and a third clock output 363 connected to input/output devices 12 through a clock fanout buffer 374. The source clock generator 360 also has the second clock output 364 connected to a first subset of components in the second partition 342 through a clock fanout buffer 376 and a fourth clock output 365 connected to input/output devices 14 through a clock fanout buffer 378. Accordingly, the system control unit 24, such as a FPGA, may selectively enable clock signals to any one or more groups of components in the system 10 to implement a desired configuration as instructed by the baseboard management controller. It should be recognized that the granularity of control over clock signals to components of each partitioned node may vary by providing more or fewer of the clock outputs and/or using more or fewer clock fanout buffers. Optionally, the source clock generator could provide a separate clock output to each component or certain individual components.

Figure 26:
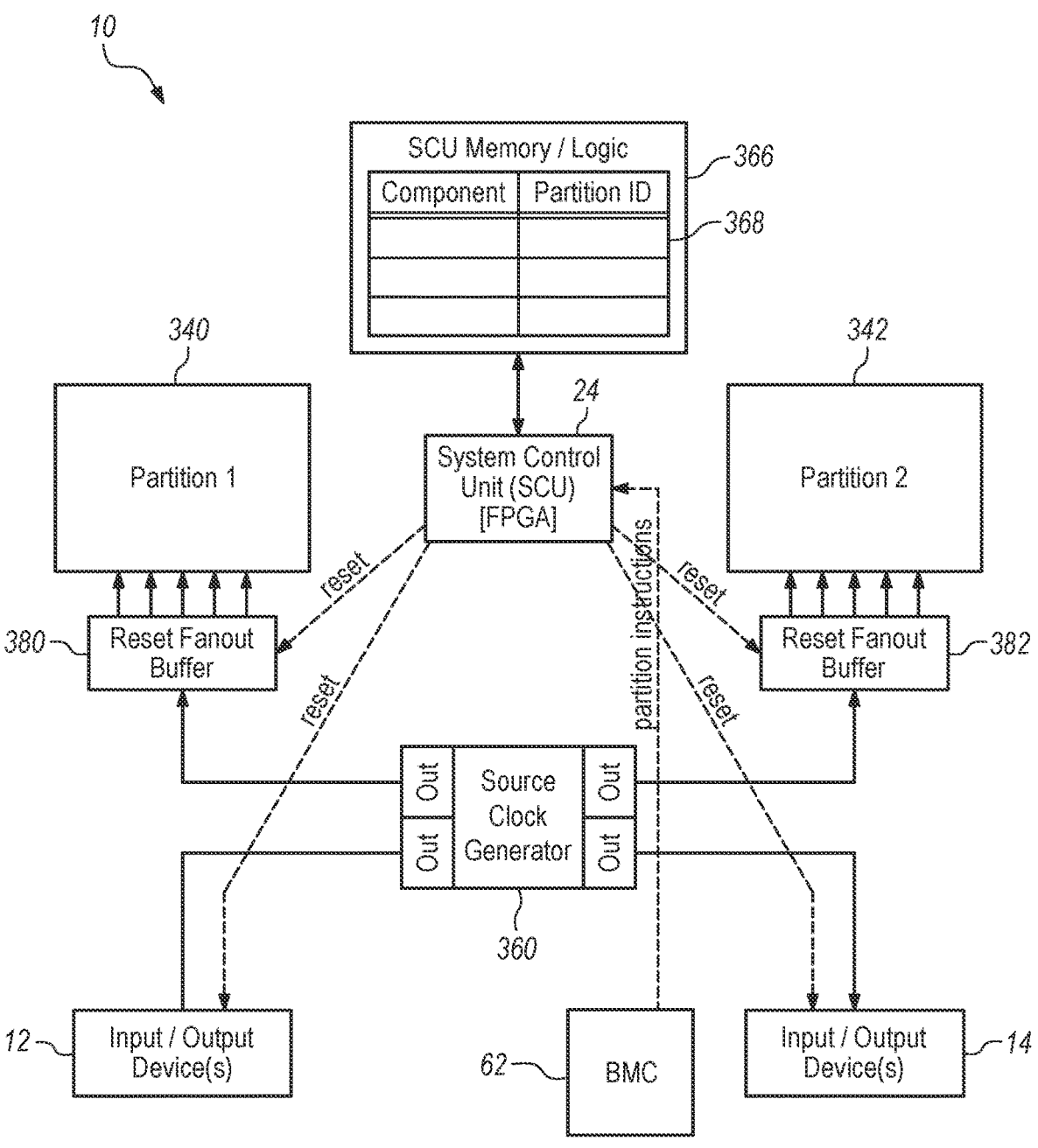
FIG. 26 is a diagram of a reset subsystem for a partitionable multi-processor system.

FIG. 26 is a diagram of a reset subsystem for the partitionable multi-processor system 10. The system control 24 unit is in communication with the baseboard management controller 62 for receiving instructions, as previously disclosed, and stores node definitions to assist in implementing partitioning instructions and power status instructions. However, the system control unit 24 is in further communication with reset inputs of one or more of the components forming the first partitioned node 340 and reset inputs of one or more of the components forming the second partitioned node 342 for independently selectively asserting a reset signal to the one or more of the components forming the first partitioned node 340 and/or a reset signal to the one or more of the components forming the second partitioned node 342.

In the example system, the system control unit 24 has four reset outputs, including a first reset output to a reset fanout buffer 380 to the first partitioned node 340 and a second reset output to a reset fanout buffer 382 to the second partitioned node 342. Accordingly, these two reset outputs will assert or deassert reset to multiple components in the respective partitioned nodes. The reset outputs from the system control unit 24 further include a third reset output to one or more input/output devices 12 and a fourth reset output to one or more input/output devices 14. Accordingly, the system control unit 24 may assert and/or deassert reset signals to various components of the system 10 in order to implement partitioning instructions and power status instructions received from the baseboard management controller 62. It should be recognized that the granularity of control over reset signals to components of each partitioned node may vary by providing more or fewer of the reset outputs and/or using more or fewer reset fanout buffers. Optionally, the system control unit 24 could provide a separate reset output to each component or certain individual components.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flow-chart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-transitory computer-readable medium and program instructions embodied therein, the program instructions being configured to be executable by a processor of a baseboard management controller in a multi-processor system to cause the processor to perform operations comprising:

identifying a number of cores present in each of a plurality of central processing units in the multi-processor system;

initiating operation of the multi-processor system as a single unified node in response to each of the plurality of central processing units having an equal number of cores; and initiating partitioning of the multi-processor system into first and second independent partitioned nodes in response to a first set of one or more of the central processing units each having a first number of cores and a second set of one or more of the central processing units each having a second number of cores that is different than the first number of cores.

2. The computer program product of claim 1, the operations further comprising:

obtaining an inventory of one or more resource types in the multi-processor system before a firmware interface boots, wherein the one or more resource types includes memory modules, data storage devices and/or input/output devices; and initiating partitioning of resources of the one or more resource type between the first and second independent partitioned nodes.

3. The computer program product of claim 2, the operations further comprising:

identifying, for the one or more resource types, an amount of the resources within the multi-processor system that are of the same resource type;

determining a processor ratio that is a ratio of a number of the central processing units in the first partitioned node to a number of the central processing units in the second partitioned node; and assigning, for the one or more resource types, the identified amount of the resources between the first partitioned node and the second partitioned node to approximate the processor ratio.

4. The computer program product of claim 3, wherein assigning, for the one or more resource types, the identified amount of the resources between the first partitioned node and the second partitioned node to approximate the processor ratio includes assigning a first group of resources of the multi-processor system to the first partitioned node and assigning a second group of resources of the multi-processor system to the second partitioned node, wherein the first and second groups include at least one data storage device and at least one input/output device.

5. The computer program product of claim 1, wherein initiating partitioning of the multi-processor system into first and second independent partitioned nodes includes instructing a firmware interface to disable one or more processor interconnects between the first set of central processing units and the second set of central processing units, and wherein the first set of central processing units is operable as a first independent partitioned node and the second set of central processing units is operable as a second independent partitioned node.

6. The computer program product of claim 5, wherein the one or more processor interconnects are coherent links.

7. The computer program product of claim 5, wherein the firmware interface is a unified extensible firmware interface.

8. The computer program product of claim 5, wherein the number of cores present in each of the plurality of central processing units is identified before booting the firmware interface.

9. The computer program product of claim 5, wherein instructing the firmware interface to disable the one or more processor interconnects between the first set of central processing units and the second set of central processing units includes instructing the firmware interface to not initialize the one or more processor interconnects between the first set of central processing units and the second set of central processing units during boot.

10. The computer program product of claim 5, the operations further comprising:
    initiating independent control of power to the first and second central processing units in the multi-processor system.

11. The computer program product of claim 10, wherein initiating independent control of power to the first and second central processing units in the multi-processor system includes instructing an integrated circuit in the multi-processor system to independently control a first power regulator connected to the first central processing unit and a second power regulator connected to the second central processing unit.

12. The computer program product of claim 11, wherein instructing the integrated circuit in the multi-processor system to independently control the first power regulator connected to the first central processing unit and the second power regulator connected to the second central processing unit includes instructing the integrated circuit to enforce one of a plurality of predetermined partitioning modes, wherein each partitioning mode causes the multi-processor system to operate with a different configuration of one or more partitioned nodes.

13. The computer program product of claim 11, wherein the multi-processor system includes a host processor module and a system management module, wherein the first set of central processing units and the second set of central processing units are installed on the host processor module, and the baseboard management controller is installed on a system management module that is connected to the host processor module, and wherein the operations further comprise:
    managing operation of the host processor module.

14. The computer program product of claim 1, the operations further comprising:
    identifying a number of memory modules that are connected to the central processing units within the first partitioned node and a number of memory modules that are connected to the central processing units within the second partitioned node;
    determining a processor ratio that is a ratio of a number of central processing units in the first partitioned node to a number of central processing units in the second partitioned node; and
    assigning, to the first partitioned node, one or more of the memory modules connected to the central processing units within the second partitioned node or assigning, to the second partitioned node, one or more of the memory modules connected to the central processing units within the first partitioned node so that a ratio of a first number of memory modules that are directly connected to the central processing units within the first partitioned node or assigned to the first partitioned node and a second number of memory modules that are directly connected to the central processing units within the second partitioned node or assigned to the second partitioned node is closer to the processor ratio than without assigning the one or more memory modules.

15. The computer program product of claim 1, the operations further comprising:
    identifying a number of memory modules that are directly connected to the central processing units within the first partitioned node and a number of memory modules that are connected to the central processing units within the first partitioned node through a Compute Express Link device;
    identifying a number of memory modules that are directly connected to the central processing units within the second partitioned node and a number of memory modules that are connected to the central processing units within the second partitioned node through a Compute Express Link device;
    determining a processor ratio that is a ratio of a number of central processing unit in the first partitioned node to a number of central processing units in the second partitioned node; and
    assigning, to the first partitioned node, one or more memory modules that are connected to the central processing units within the second partitioned node through a Compute Express Link device or assigning, to the second partitioned node, one or more memory modules that are connected to the central processing units within the first partitioned node through a Compute Express Link device so that a ratio of a first number of memory modules that are directly connected to the central processing units within the first partitioned node or assigned to the first partitioned node and a second number of memory modules that are directly connected to the central processing units within the second partitioned node or assigned to the second partitioned node is closer to the processor ratio than without assigning the one or more memory modules.

16. The computer program product of claim 15, wherein the Compute Express Link device in the first partitioned node supports fractional assignment of the memory modules connected through the Compute Express Link device.

17. The computer program product of claim 15, wherein the Compute Express Link device in the first partitioned node requires that all of the memory modules connected through the Compute Express Link device to be assigned to the same partitioned node.

18. A method comprising:

identifying a number of cores present in each of a plurality of central processing units in a multi-processor system;

initiating operation of the multi-processor system as a single unified node in response to each of the plurality of central processing units having an equal number of cores; and initiating partitioning of the multi-processor system into first and second independent partitioned nodes in response to a first set of one or more of the central processing units each having a first number of cores and a second set of one or more of the central processing units each having a second number of cores that is different than the first number of cores.

19. The method of claim 18, further comprising:

obtaining an inventory of one or more resource types in the multi-processor system before the firmware interface boots, wherein the one or more resource types includes memory modules, data storage devices and/or input/output devices; and initiating partitioning of resources of the one or more resource type between the first and second independent nodes.

20. The method of claim 19, further comprising:

identifying, for the one or more resource types, an amount of resources within the multi-processor system that are of the same resource type;

determining a processor ratio that is a ratio of a number of central processing units in the first partitioned node to a number of central processing units in the second partitioned node; and assigning, for the one or more resource types, the identified amount of the resource between the first partitioned node and the second partitioned node to approximate the processor ratio.

* * * * *